(12) United States Patent
Schmeichel et al.

(10) Patent No.: US 9,387,888 B2
(45) Date of Patent: Jul. 12, 2016

(54) MUD FLAP ASSEMBLY HAVING ENLARGED FLAP PANELS

(71) Applicant: Agri-Cover, Inc., Jamestown, ND (US)

(72) Inventors: Charles M. Schmeichel, Jamestown, ND (US); Christopher D. Althoff, Jamestown, ND (US); Shawn J. Wock, Buchanan, ND (US)

(73) Assignee: Agri-Cover, Inc., Jamestown, ND (US)

( * ) Notice: Subject to any disclaimer, the term of this patent is extended or adjusted under 35 U.S.C. 154(b) by 0 days.

(21) Appl. No.: 14/989,460

(22) Filed: Jan. 6, 2016

(65) Prior Publication Data

US 2016/0114835 A1    Apr. 28, 2016

Related U.S. Application Data

(63) Continuation-in-part of application No. 14/322,379, filed on Jul. 2, 2014.

(51) Int. Cl.
  *B62D 25/18* (2006.01)
(52) U.S. Cl.
  CPC ................... *B62D 25/182* (2013.01)
(58) Field of Classification Search
  CPC .. B62D 25/182; B62D 25/188; B62D 25/168; B62D 25/161; B60D 1/60
  See application file for complete search history.

(56) References Cited

U.S. PATENT DOCUMENTS

| | | | |
|---|---|---|---|
| 5,026,094 A | 6/1991 | Haddox | |
| 5,121,944 A | 6/1992 | Haddox | |
| D328,447 S | 8/1992 | Ahleen | |
| 5,727,805 A | 3/1998 | La Roque | |
| 5,833,254 A | 11/1998 | Bucho | |
| 5,938,222 A | 8/1999 | Huang | |
| 6,076,842 A | 6/2000 | Knoer | |
| 6,179,311 B1 * | 1/2001 | Larkin | B62D 25/188 280/154 |
| 6,375,223 B1 | 4/2002 | Kirckof | |
| 6,485,059 B2 | 11/2002 | Burnstein | |
| 6,942,252 B2 | 9/2005 | Buuck et al. | |
| 7,407,194 B1 | 8/2008 | Alley | |
| 7,607,698 B2 | 10/2009 | Cicansky | |
| 7,931,302 B2 | 4/2011 | Vaughn | |
| 2002/0185853 A1 | 12/2002 | Gaudet | |
| 2006/0048993 A1 * | 3/2006 | Karube | B62K 5/01 180/296 |
| 2009/0194967 A1 * | 8/2009 | Vaughn | B62D 25/188 280/154 |

OTHER PUBLICATIONS

United States Patent and Trademark Office, Prosecution History of U.S. Appl. No. 14/322,379.

* cited by examiner

*Primary Examiner* — Bryan Evans
(74) *Attorney, Agent, or Firm* — Moore & Hansen, PLLC; Robert C. Freed

(57) ABSTRACT

Mud flap assemblies including a frame, a securing assembly and mud flap panels; the securing assembly enabling the frame to be secured to a hitch assembly having a shaft, for further attachment to a hitch receiver secured to a vehicle; the frame having a rear plate that includes a hitch opening for receiving the shaft of the hitch assembly. The frame is preferably configured to rest on a portion of a bumper of the vehicle to minimize vibration of the frame during use. The mud flap assembly preferably including a pair of stops that are preferably adjustable and are constructed and arranged to rest against the bumper. The mud flap assembly preferably includes enlarged mud flap panels and mud flap support members for additional support of the enlarged mud flap panels. Methods of installing mud flap assemblies are also disclosed.

38 Claims, 51 Drawing Sheets

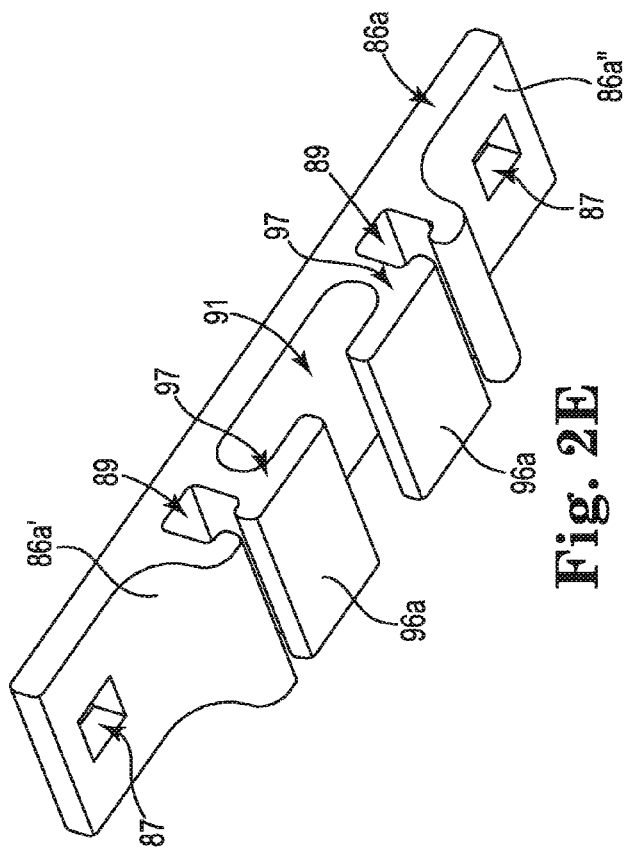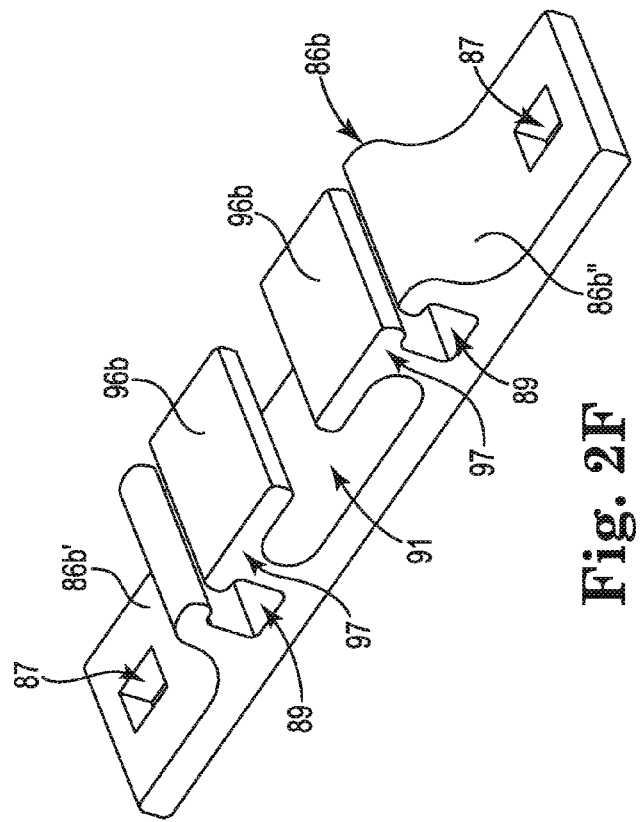

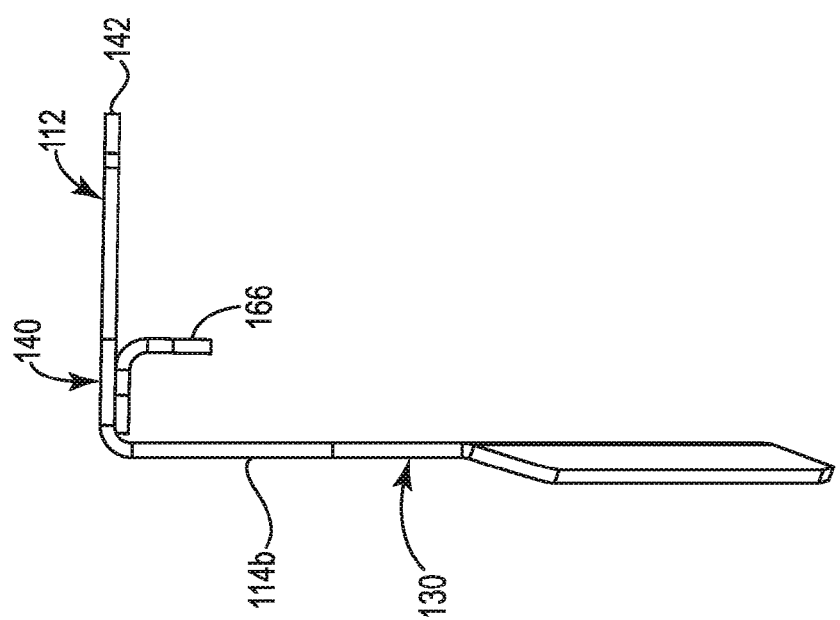

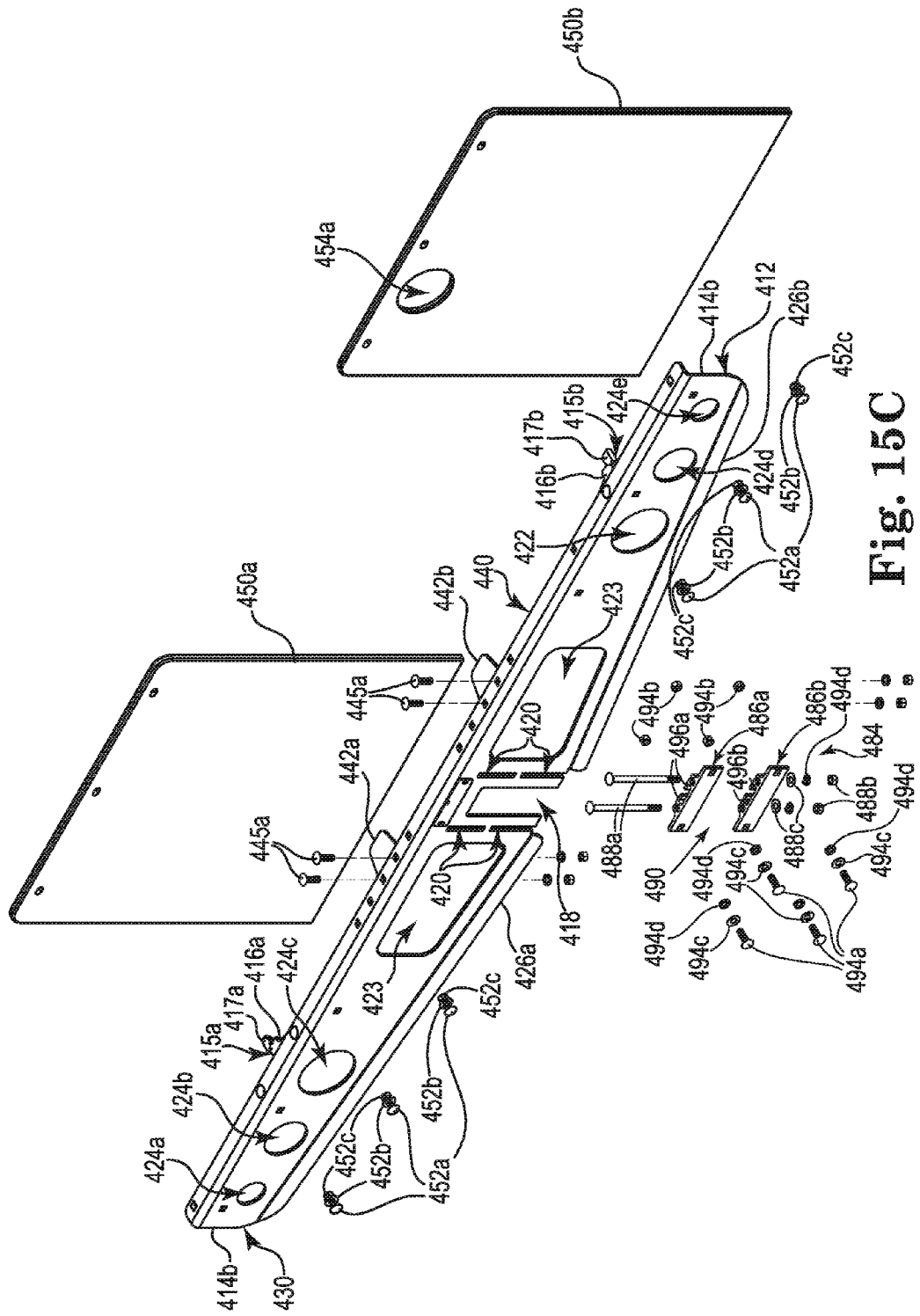

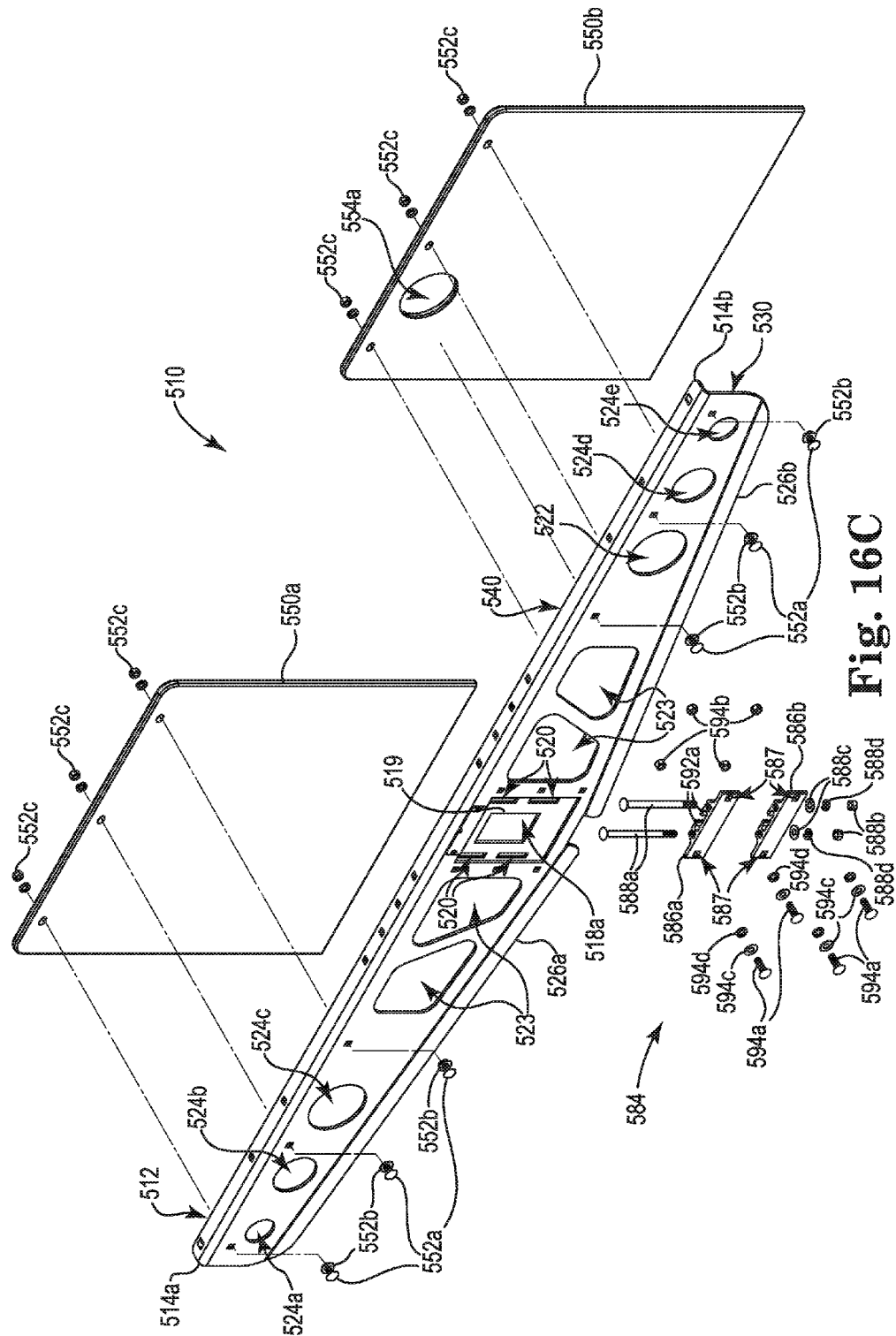

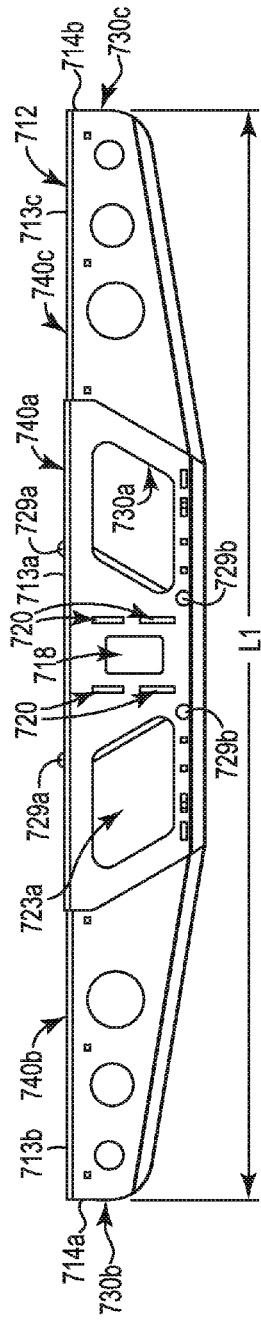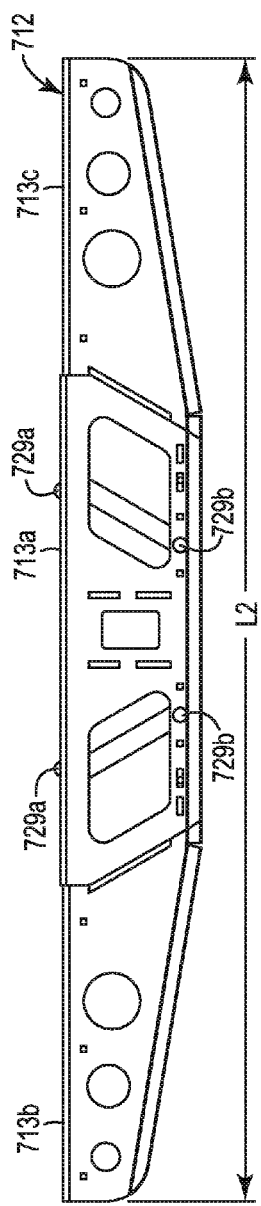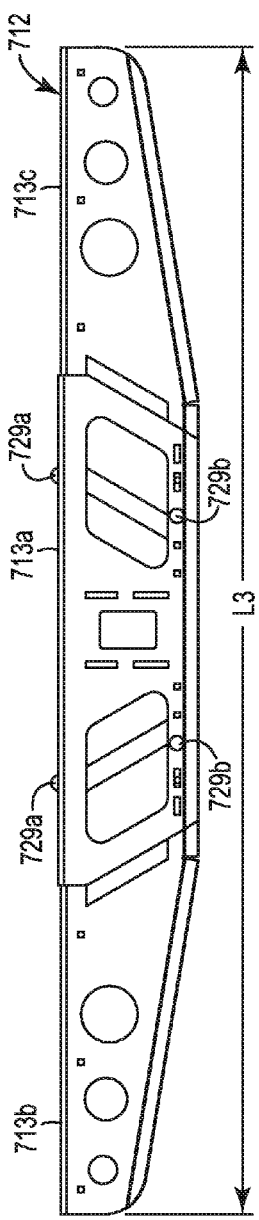

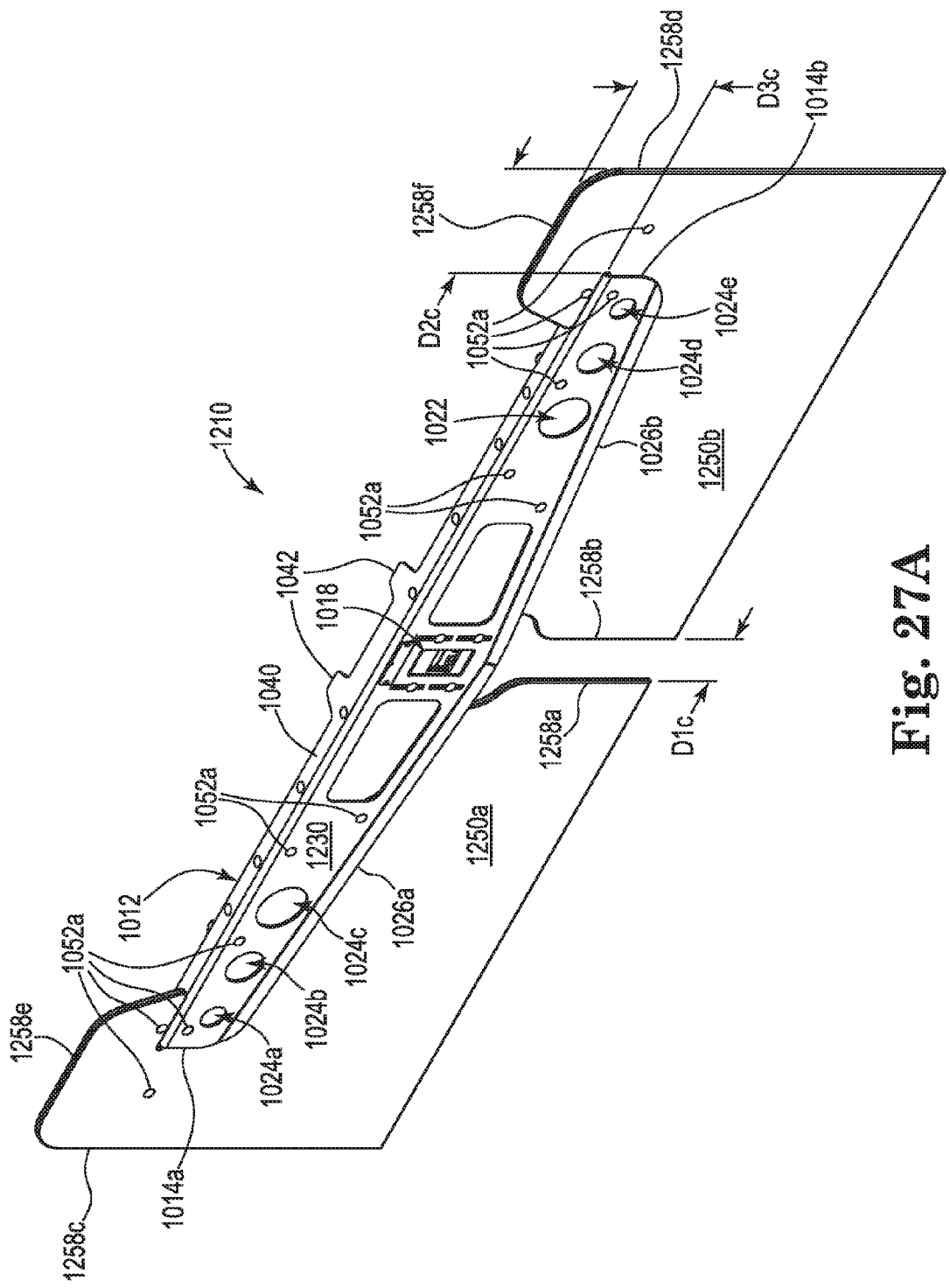

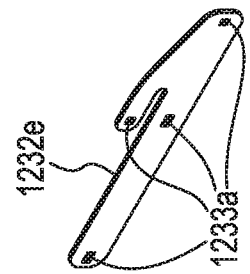
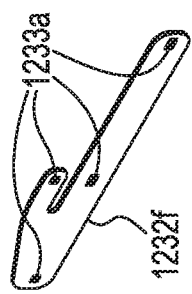
Fig. 28

MUD FLAP ASSEMBLY HAVING ENLARGED FLAP PANELS

RELATED APPLICATIONS

The present application is a continuation-in-part of U.S. patent application Ser. No. 14/322,379, filed Jul. 2, 2014, which is hereby incorporated herein by reference.

FIELD OF THE INVENTION

Mud flap assemblies, particularly, hitch-mounted mud flap assemblies including a frame interconnected to a hitch assembly that can be interconnected to a hitch receiver proximate a bumper of a vehicle. The preferred frame is designed to rest on a portion of the bumper to minimize vibration of the frame while in use on a vehicle. In preferred embodiments, the frame includes a pair of stop assemblies. The stop assemblies are preferably adjustable and are preferably constructed and arranged to rest against the bumper when the mud flap assembly is secured to the hitch assembly and the combination mud flap assembly and hitch assembly is attached to the hitch receiver. The hitch receiver is attached to the vehicle proximate the vehicle's bumper. The mud flap assemblies may also include exhaust ventilation apertures and/or protective heat shields. Methods of installing mud flap assemblies are also disclosed.

DESCRIPTION OF THE RELATED ART

Trucks and other vehicles are frequently used to haul trailers that transport boats, snow mobiles, four wheelers, motorcycles, golf carts and the like. Significant investments are made in such recreational equipment and the owners generally strive to protect their investment in this equipment by preventing any damage to such equipment that might occur during transport. Mud flaps are frequently used to prevent mud, gravel and other debris from being kicked up by the rear tires of the hauling vehicle that could otherwise damage or soil the trailer and the equipment being transported.

Typical mud flap assemblies often include a laterally extending beam positioned along the rear of the vehicle and two mud flap panels extending downward therefrom proximate the rear tires. Frequently, such mud flap assemblies are mounted to a hitch receiver of the vehicle. See, for example, U.S. Pat. No. 6,076,842 (Knoer); U.S. Pat. No. 6,179,311 (Larkin); U.S. Pat. No. 6,375,223 (Kirckof); and U.S. Pat. No. 7,931,302 (Vaughn).

The present invention provides improvements that address limitations associated with the prior art.

SUMMARY OF THE INVENTION

Preferred mud flap assemblies for attachment to hitch assemblies will preferably include a frame, a securing assembly, and two flap panels. The frame will preferably include a rear plate, a top plate and two longitudinal ends. The top plate is generally perpendicular to the rear plate and the rear plate having a hitch opening, wherein a shaft or interceptor portion of the ball mount of the hitch assembly, also called a hitch tongue, can be threaded through the hitch opening and secured to the frame with the securing assembly. Each of the respective flap panels can be separately secured to the frame proximate one of the respective longitudinal ends of the frame. Enlarged flap panels are preferably provided to mud flap assemblies to enhanced protection for trailers pulled behind these assemblies from rocks and debris flying up behind vehicles to which the trailers are attached. The hitch assembly will preferably be a commercially available hitch assembly including a ball mount interconnected with a shaft or hitch tongue that is securable within a hitch receiver to attach the mud flap assembly to a vehicle proximate a rear bumper of the vehicle; the rear bumper preferably having a top surface and a rear surface. The frame will preferably include a pair of stop assemblies, one of which is located proximate each of the respective longitudinal ends of the frame. When the mud flap assembly is operatively secured to the vehicle, the respective stop assemblies will preferably be engaged with the rear surface of the bumper. The mud flap assembly may also include a protective piece that can have an adhesive back or the like to allow it to be secured to the bumper proximate the position where the respective stop assembly bumper cap is projected to engage the bumper. The protective piece can be positioned such that one of the respective stop assemblies will contact the protective piece when the mud flap assembly is operatively secured to the vehicle such that the protective piece minimizes abrasions to the bumper caused by the respective stop assembly.

Preferred mud flap assembly embodiments are configured for attachment to a hitch assembly, and the hitch assembly is preferably configured for attachment to a hitch receiver proximate a bumper of a vehicle, wherein the bumper has a top surface and a rear surface and the hitch assembly has a shaft for engagement with the hitch receiver. Further preferred mud flap assemblies include a frame, a securing assembly and two mud flap panels. The frame has two longitudinal ends, a rear plate and a top plate, wherein the top plate is generally perpendicular to the rear plate and the top plate includes a support flange that can engage the top surface of the bumper. Each of the respective mud flap panels is secured to the frame proximate the respective longitudinal ends. The hitch assembly is preferably adjustably secured to the frame by the securing assembly such that when the shaft is engaged with the hitch receiver to create a first point of contact between the mud flap assembly and the vehicle, there will also be a second point of contact between the mud flap assembly and the vehicle. This second point of contact is preferably between the support flange or support flange elements and the top surface of the bumper of the vehicle. In further preferred embodiments, mud flap assemblies described and claimed herein will have additional points of contact between the mud flap assembly and the vehicle when the respective stop assemblies come into contact with the rear surface of the bumper. These points of contact help to stabilize the respective mud flap assemblies with respect to the vehicle so as to minimize the degree to which the frames of the respective mud flap assemblies vibrate and move independently of the vehicle.

The present invention includes mud flap assemblies, particularly, hitch-mounted mud flap assemblies including a frame, which can be interconnected to a hitch assembly that can be interconnected to a hitch receiver proximate a bumper of a vehicle. Various preferred mud flap assemblies include a frame, a securing assembly and two mud flap panels; the frame having two longitudinal ends and a rear plate, the rear plate including a hitch opening, spaced between the respective longitudinal ends, for receiving the shaft of the hitch assembly. One preferred frame is designed to rest on a portion of the bumper to minimize vibration of the frame and movement of the frame independent of the vehicle to which it is secured, while in use on the vehicle. Such a frame will preferably include a top plate including at least one support flange, the top plate being generally perpendicular to the rear plate. The mud flap assembly will preferably include a pair of stops or stop assemblies positioned proximate the respective longitudinal ends. Preferred stop assemblies are adjustable and are constructed and arranged to rest against the bumper when the mud flap assembly is secured to the hitch assembly and the combination mud flap assembly and hitch assembly is attached to the hitch receiver. Various mud flap assemblies may also include exhaust ventilation apertures and/or protective heat shields, as desired.

Disclosed embodiments include a mud flap assembly for attachment to a hitch assembly; the hitch assembly being attachable to a hitch receiver attached to a vehicle, preferably a pickup truck, proximate a bumper of the vehicle. The bumper will preferably have a rear surface and the hitch assembly will preferably have a shaft for engagement with the hitch receiver. Various mud flap assemblies will preferably have a frame, a securing assembly and two mud flap panels. The frame has two longitudinal ends and a rear plate. The rear plate includes a hitch opening spaced between the respective longitudinal ends for receiving the shaft of the hitch assembly. The securing assembly will preferably have two elongated members that can be adjustably secured to the frame and adjustably secured to one another to engage the shaft and thereby secure the hitch assembly to the frame. In preferred embodiments, the frame will include a pair of stops, one of which is located proximate each of the respective longitudinal ends of the frame; wherein the respective stops extend away from the frame, toward the bumper, such that the respective stops can engage the rear surface of the bumper when the mud flap assembly is operatively secured to the vehicle. In preferred embodiments, the frame will include a pair of stop assemblies and each of which includes a stop, a protective cap that is engageable with the respective stop such that the respective protective cap will come into contact with the bumper when the mud flap assembly is operatively secured to the vehicle. In preferred embodiments the mud flap assembly will include a pair of adjustable stop assemblies. Each of the respective stop assemblies includes a stop that extends away from adjacent parts of the frame toward the bumper, such that the respective stops can engage the rear surface of the bumper when the mud flap assembly is operatively secured to the vehicle.

The respective mud flap panels are preferably separately secured to the frame proximate one of the respective longitudinal ends. The frame of preferred mud flap assemblies will include a rear plate and a top plate; wherein the top plate is generally perpendicular to the rear plate and the top plate includes a support flange. The securing assembly is configured to allow the hitch assembly to be adjustably secured to the frame so that when the hitch assembly is secured to the frame and to the vehicle to provide a first point of contact between the mud flap assembly and the vehicle, the support flange can be engaged with a top surface of the bumper to provide a second point of contact between the mud flap assembly and the vehicle. In preferred embodiments, the hitch opening of the frame has a configuration selected from the group consisting of: 1) a generally U-shaped opening partially surrounded by adjacent elements of the frame; and 2) an opening completely surrounded by adjacent elements of the frame. The frame further includes a plurality of frame attachment openings proximate the hitch opening; wherein connectors can adjustably connect the pair of elongated members of the securing assembly to the frame and to one another to secure the shaft of the hitch assembly to the frame. In alternate embodiments of the mud flap assembly, the frame includes an enlarged opening over which a mounting plate having a hitch opening can be secured. The mounting plate id secured to the frame and the securing assembly is secured to the mounting plate and the shaft of the hitch assembly is secured to the mounting plate by the securing assembly. The mounting plate is a removable adjustment plate defining a hitch opening. The adjustment plate includes a plurality of plate openings to enhance the adjustment capabilities of the securing assembly. In further alternate embodiments of the mud flap assembly, the frame has a structure that is selected from the group consisting of: 1) a unitary structure; and 2) a multi-part structure in which a plurality of parts are interconnected to form a frame assembly. The multi-part frame structure may be adjustable in length.

In preferred embodiments, each of the respective enlarged mud flap panels is secured to the frame proximate opposite longitudinal ends of the frame and so that the outer edge of the respective flap panel extends at least about 2 inches beyond the end of the respective longitudinal end of the frame, preferably from about 2 inches to about 12 inches. The enlarged mud flap panels are preferably secured to the frame so that the inside edges of the respective flap panels a separated by a distance of from about 3 to about 5 inches. In other preferred embodiments, each the respective mud flap panels will be secured to the frame in a manner in which each of the respective enlarged mud flap panels extends above the top plate proximate respective longitudinal ends of the frame at least about two inches, preferably from about 2 inches to about 12 inches. In further preferred embodiments, the mud flap assembly will include at least one mud flap support member that is bent so that an included angle between opposing ends of an inside surface of the mud flap support member, which engages the respective mud flap, will be from about 175 to about 179 degrees. In preferred embodiments, the mud flap assembly will include two mud flap support members that are bent in this manner and secured to the frame in a manner in which the support member sandwiches the flap panel against the frame. The slight bend in the inside surface of the support member acts to minimize the degree to which the inside edge of the flap panel springs out away from the frame.

These and various other advantages and features of novelty which characterize the present invention are pointed out with particularity in the claims annexed hereto and forming a part hereof. However, for a better understanding of the invention, its advantages and objects obtained by its use, reference should be made to the drawings which form a further part hereof, and to the accompanying descriptive matter, in which there is illustrated and described a preferred embodiment of the present invention.

BRIEF DESCRIPTION OF THE DRAWINGS

In the drawings, in which corresponding reference numerals and letters indicate corresponding parts of the various embodiments throughout the several views, and in which the various embodiments generally differ only in the manner described and/or shown, but otherwise include corresponding parts; and in which reference is occasionally made either to the "rear" or to the "front" of the mud flap assembly or to a frame of the present mud flap assembly in a manner that is consistent with the orientation of the mud flap assembly or to a frame of the present mud flap assembly when it is secured to a vehicle as envisioned, so that the rear of a mud flap assembly or of a frame of the present invention will be consistent with what is seen when one is looking at the rear of such a vehicle when the mud flap assembly or such a frame is attached to such a vehicle as herein envisioned and the front of such a mud flap assembly or such a frame will be the view of such a mud flap assembly or such a frame that can be seen from seen from the front of the vehicle when such mud flap assembly or such frame is attached to the vehicle as envisioned herein and the vehicle does not obstruct the view;

FIG. 2E is an enlarged perspective view of a clamp half 86a of the securing assembly 84 shown in FIGS. 2A-2D;

FIG. 2F is an enlarged perspective view of a clamp half 86b of the securing assembly 84 shown in FIGS. 2A-2D;

FIG. 10C is a side view of the alternate frame 110 shown in FIG. 10B;

FIG. 14A is a rear perspective view of a further alternate frame 312 that may be used with the other parts of the mud flap assemblies of the present invention; the frame 312 having stops 316a, 316b extending away from the rear plate 330 (see FIG. 14B) and showing a flexible flap 347 the covers the front side of one of the access openings 323 to generally prevent rocks and debris from passing through the access opening from the front of the frame when the frame 312 is secured to a vehicle (not shown), while still allowing a user to extend his or her hand H through the covered access opening 323 in order to grasp a hitch pin (not shown), a cotter pin (not shown), safety chains (not shown) or the like;

FIG. 15C is a further rear perspective view of the mud flap assembly 410 of FIGS. 15A-15B, but showing the flap panels 450a, 450b and respective fastener elements 452a, 452b, 452c detached in a modified exploded view and also showing the elements of the securing assembly 484 detached in an exploded view arranged to clearly show the U-shaped hitch opening;

FIG. 16C is a rear perspective view of the alternate mud flap assembly 510 shown in FIGS. 16A-16B; in which the fasteners for securing the mounting plate 519 to the frame 512 have been removed for clarity as in FIG. 16B; showing the flap panels 550a, 550b and their respective fastener elements 552a, 552b, 552c in exploded view and also showing the elements of the securing assembly 584 in exploded view;

FIGS. 18A, 18B, 18C, 18D and 18E are rear plan views of an alternate multi-piece frame 712 that is expandable between five different lengths, L1, L2, L3, L4 and L5, respectively, which can be used to provide suitable for the addition of flap panels (not shown) so that the expandable frame can be used to make mud flap assemblies to provide protection for trailers and property hauled on such trailers behind hauling vehicles having a variety of different widths;

FIG. 27A is a rear perspective view of a further alternate mud flap assembly 1210 including frame 1012, which is the same as frame 1012 of FIGS. 23A and 23B, but having two still further enlarged flap panels 1250a, 1250b secured to and extending downwardly from the frame 1012; the mud flap assembly 1210 being securable to a vehicle (not shown) in the manner disclosed in the specification in relation to the discussion regarding FIG. 3A through FIG. 6;

FIG. 28 is a front perspective view of the enlarged outer mud flap support members 1232c, 1232d of FIG. 27B.

DETAILED DESCRIPTION OF THE PREFERRED EMBODIMENTS

Figure 1:
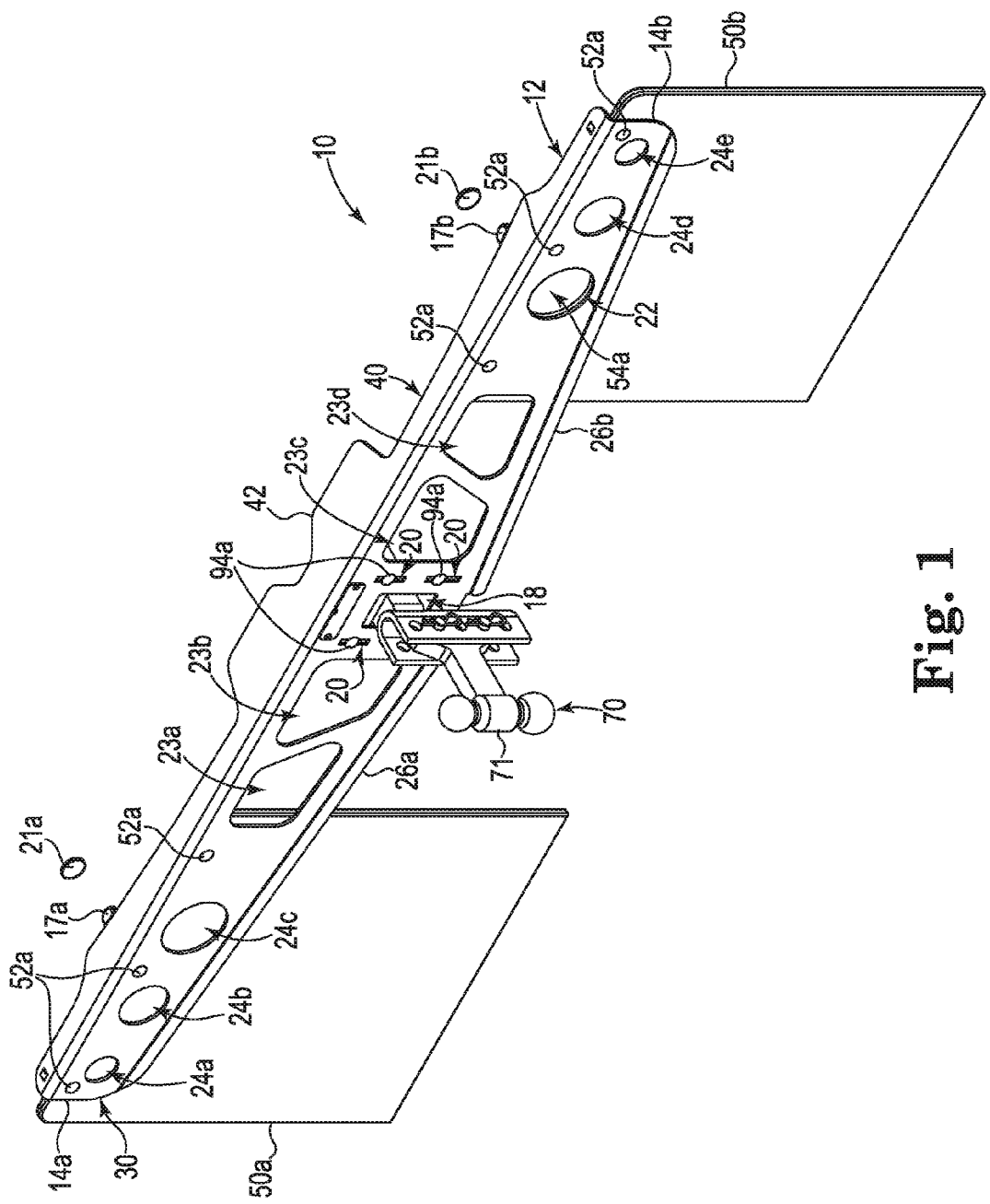
FIG. 1 is a rear perspective view of one preferred mud flap assembly 10 including a frame 12, a securing assembly 84 and two flap panels 50a, 50b secured to and extending downwardly from the frame 12; the frame 12 is attached to a hitch assembly 70 and showing protective pieces 21a, 21b, respectively, exploded away from respective stop assemblies 15a, 15b with which the respective protective pieces 21a, 21b would be engaged if the protective pieces 21a, 21b were attached to a bumper of a vehicle (not shown) and if the mud flap assembly 10 was secured to such a vehicle as shown in FIGS. 3A, 4 and 5.

Referring now to the drawings, the mud flap assemblies 10, 110, 210, 410, 510, 1010, 1110, 1210 disclosed herein can be secured to a hitch assembly 70, which can be secured to a hitch receiver 76 at the rear of a vehicle V, proximate the rear bumper B, to protect an apparatus being towed by the vehicle from being damaged due to rocks, debris and mud kicked up from under the rear tires of the vehicle. Preferred embodiments are configured to be easily removed and reinstalled, as needed.

Figure 3A:
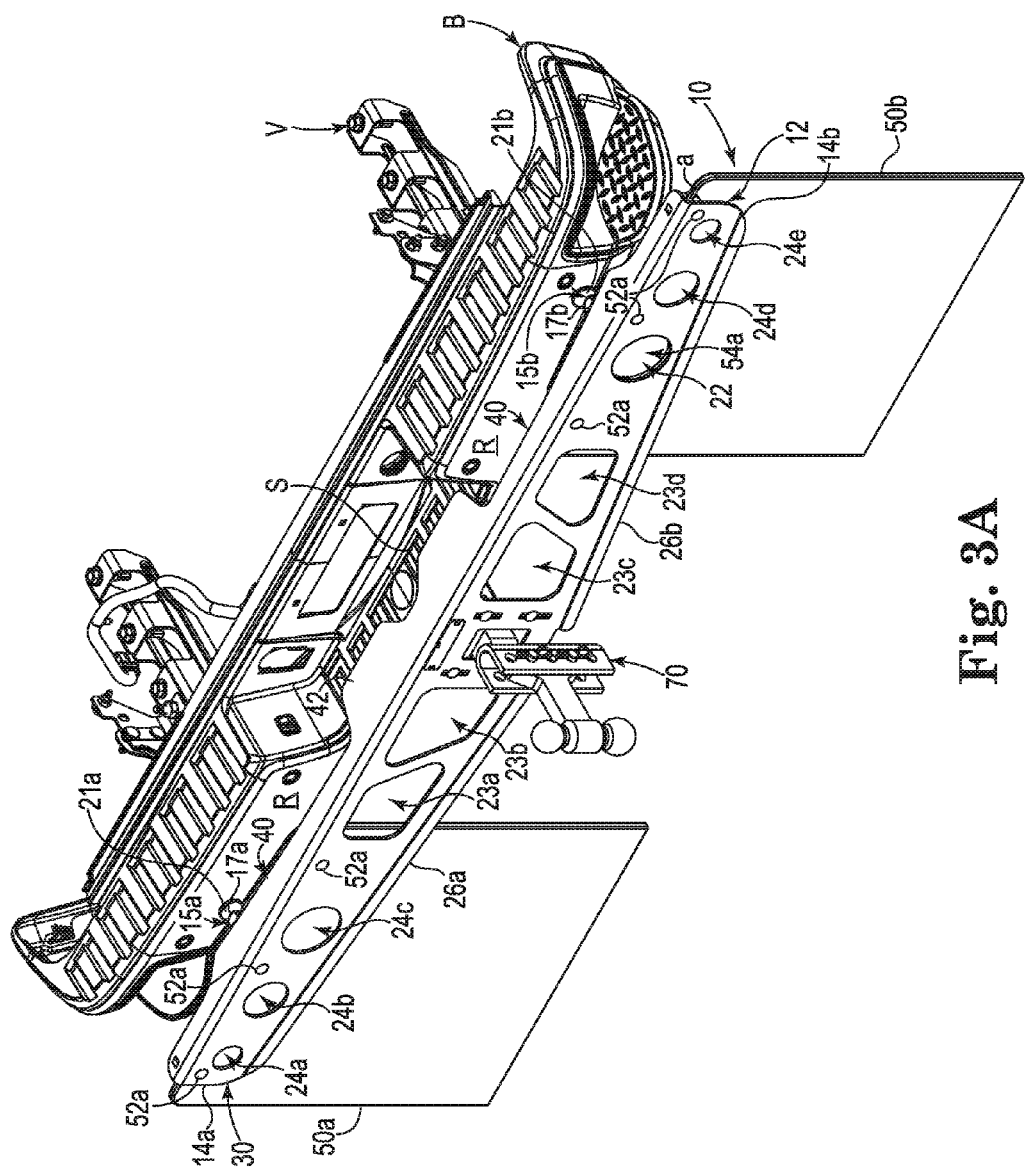
FIG. 3A is a rear perspective view of the mud flap assembly 10 of FIGS. 1-2D when the mud flap assembly 10 is operatively secured to a bumper B of a vehicle V (shown only in part)
Figure 4:
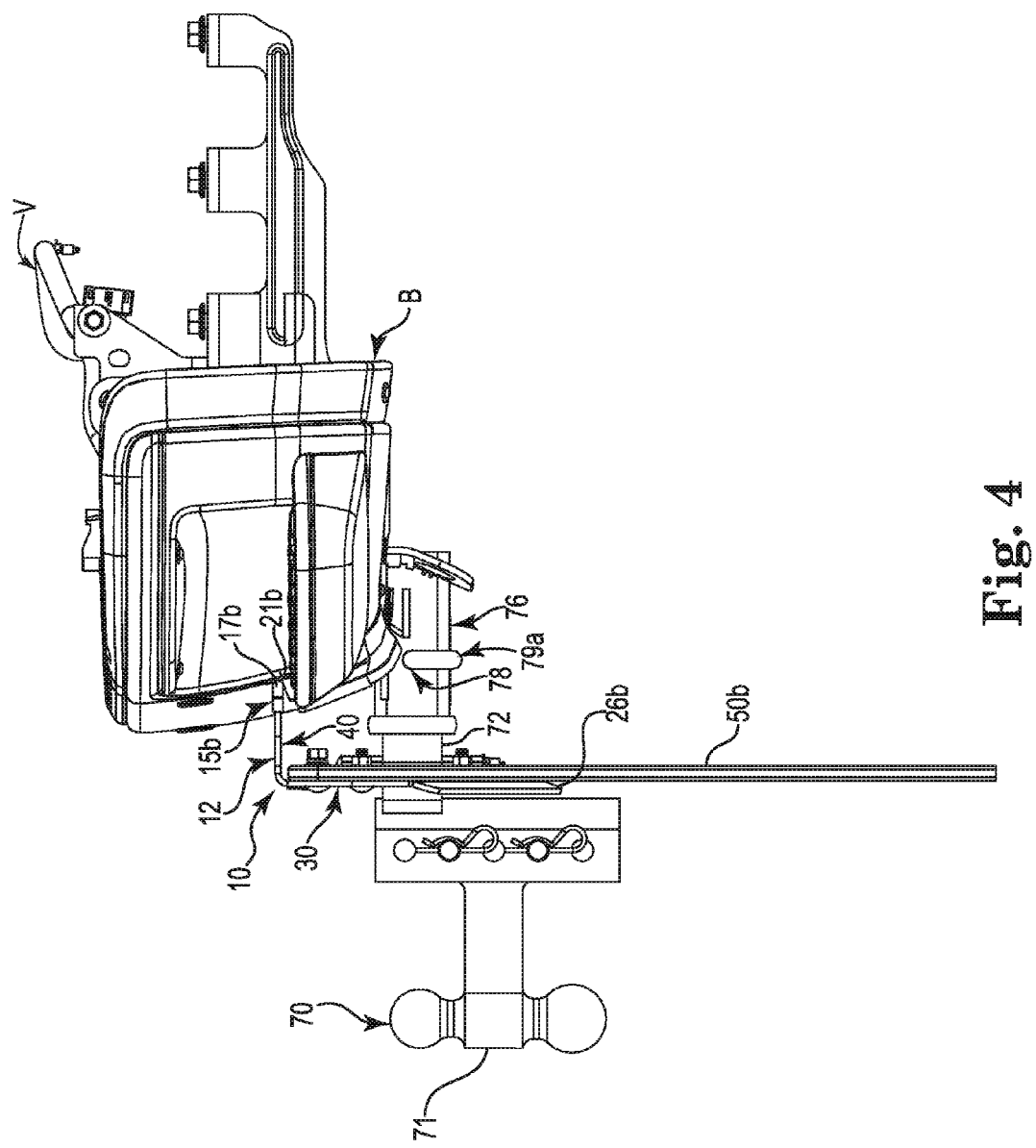
FIG. 4 is a side view of the mud flap assembly 10 of FIGS. 1-3A when the mud flap assembly 10 is operatively secured to a bumper B of a vehicle V (shown only in part)
Figure 5:
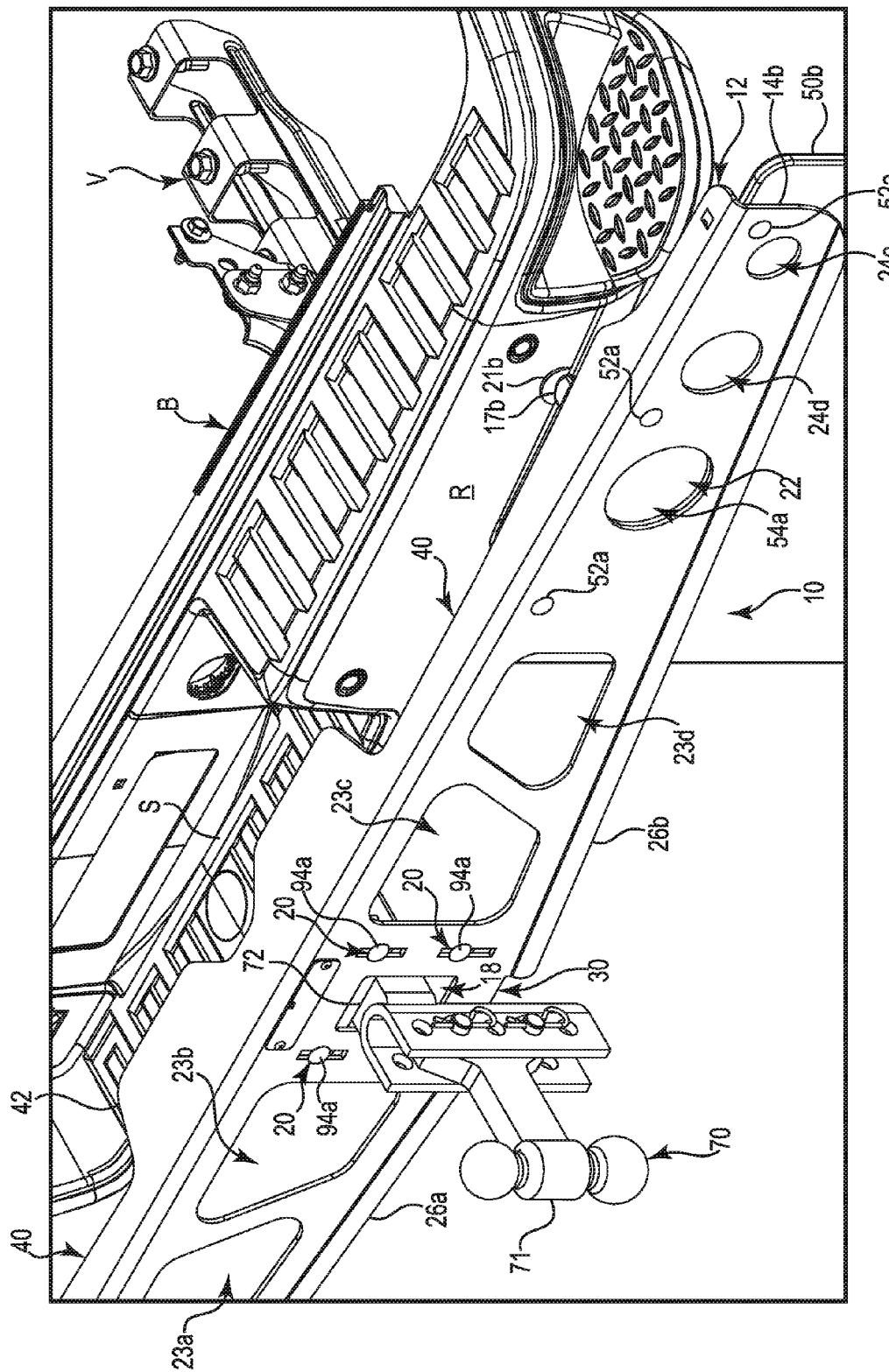
FIG. 5 is an enlarged, partial rear perspective view of a portion of the mud flap assembly 10 shown in FIG. 3A.
Figure 6:
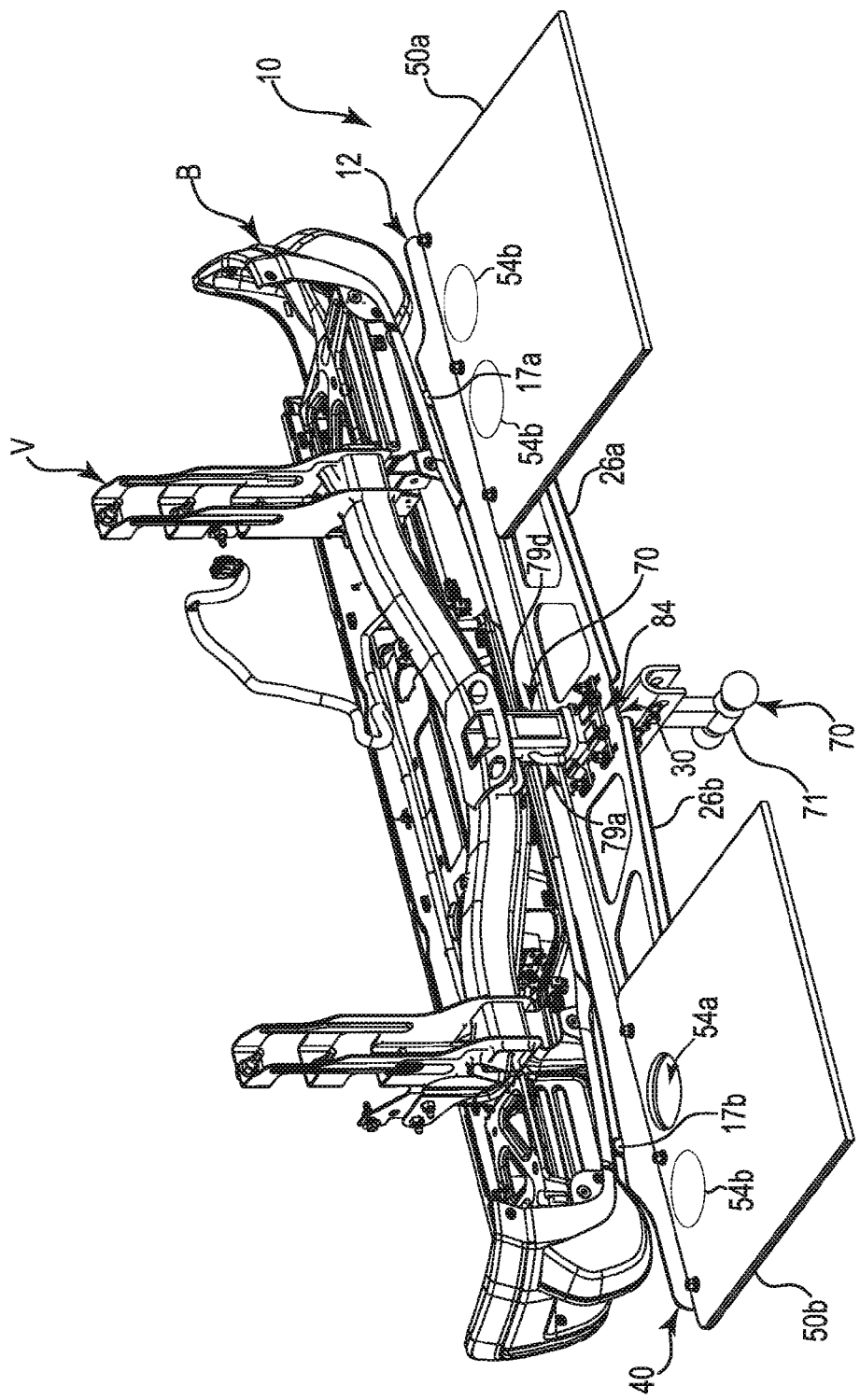
FIG. 6 is a perspective view from in front and below the mud flap assembly 10 shown in FIGS. 3A, 4 and 5, in which the mud flap assembly 10 is secured to the hitch assembly 70, and the hitch assembly 70 is secured to the hitch receiver 76 of the vehicle V, only a part of which is shown.
Figure 7:
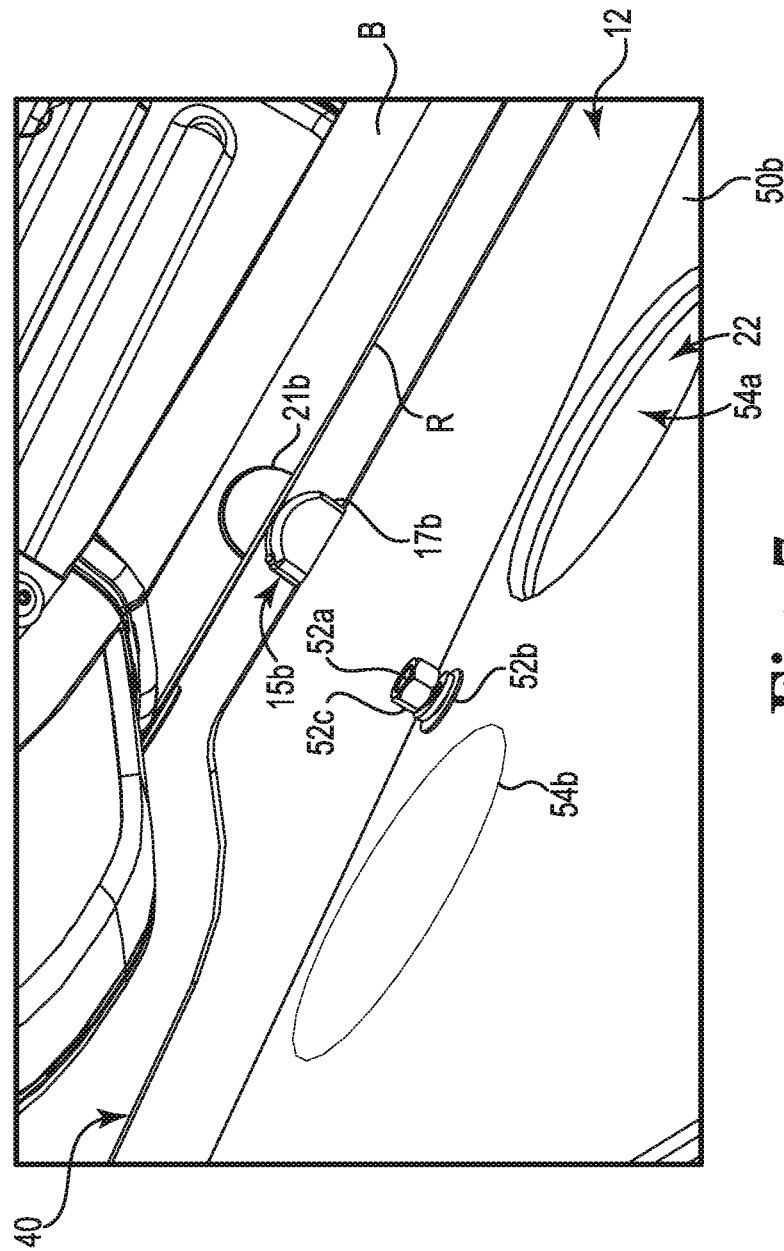
FIG. 7 is an enlarged, partial perspective view of the mud flap assembly 10 of FIG. 6, shown in a manner similar to that shown in FIG. 6, but from a somewhat different perspective, showing the cap 17b of one stop assembly 15b contacting a protective piece 21b secured to the bumper B.
Figure 8:
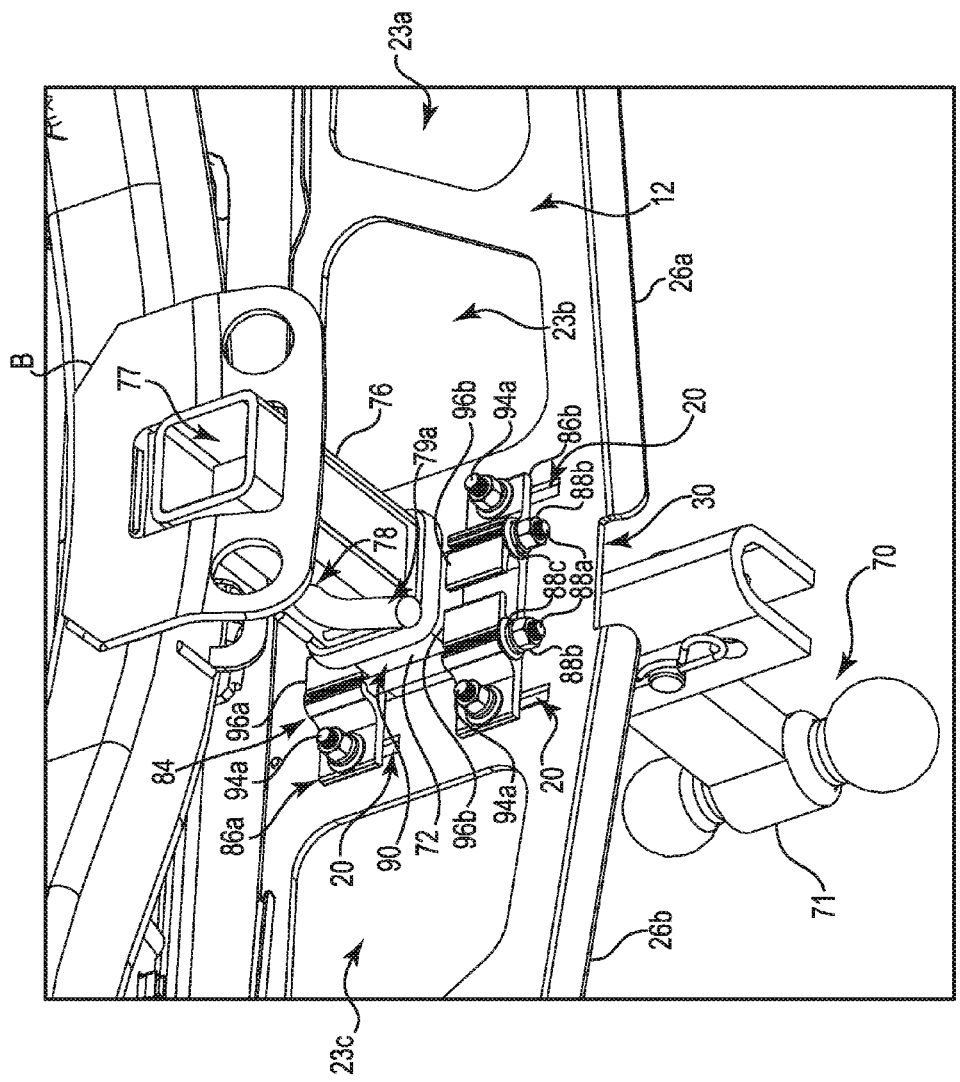
FIG. 8 is an enlarged, partial perspective view from in front and below the mud flap assembly 10 of FIGS. 1-7, shown in a manner similar to that shown in FIG. 6, but from a somewhat different perspective, showing the frame 12 secured to the hitch assembly 70 by the securing assembly 84, and the hitch assembly 70 secured to the hitch receiver 76.
Figure 12:
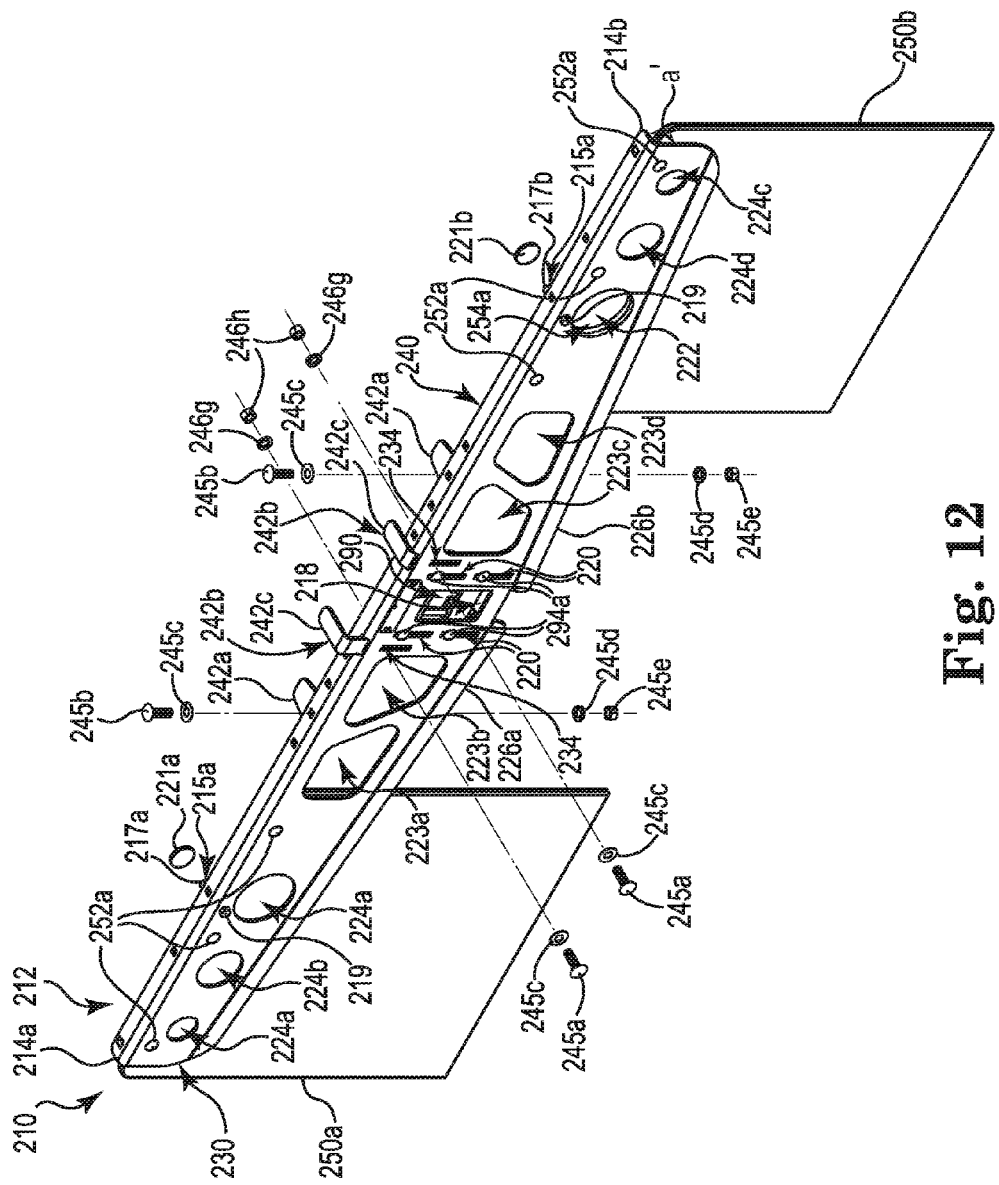
FIG. 12 is a partially exploded, rear perspective view of a further alternate embodiment of a mud flap assembly 210 having a universal frame 212, to which adjustable support flanges 242a, 242b are attached and stop assemblies 215a, 215b are secured by bolts 219.
Figure 13A:
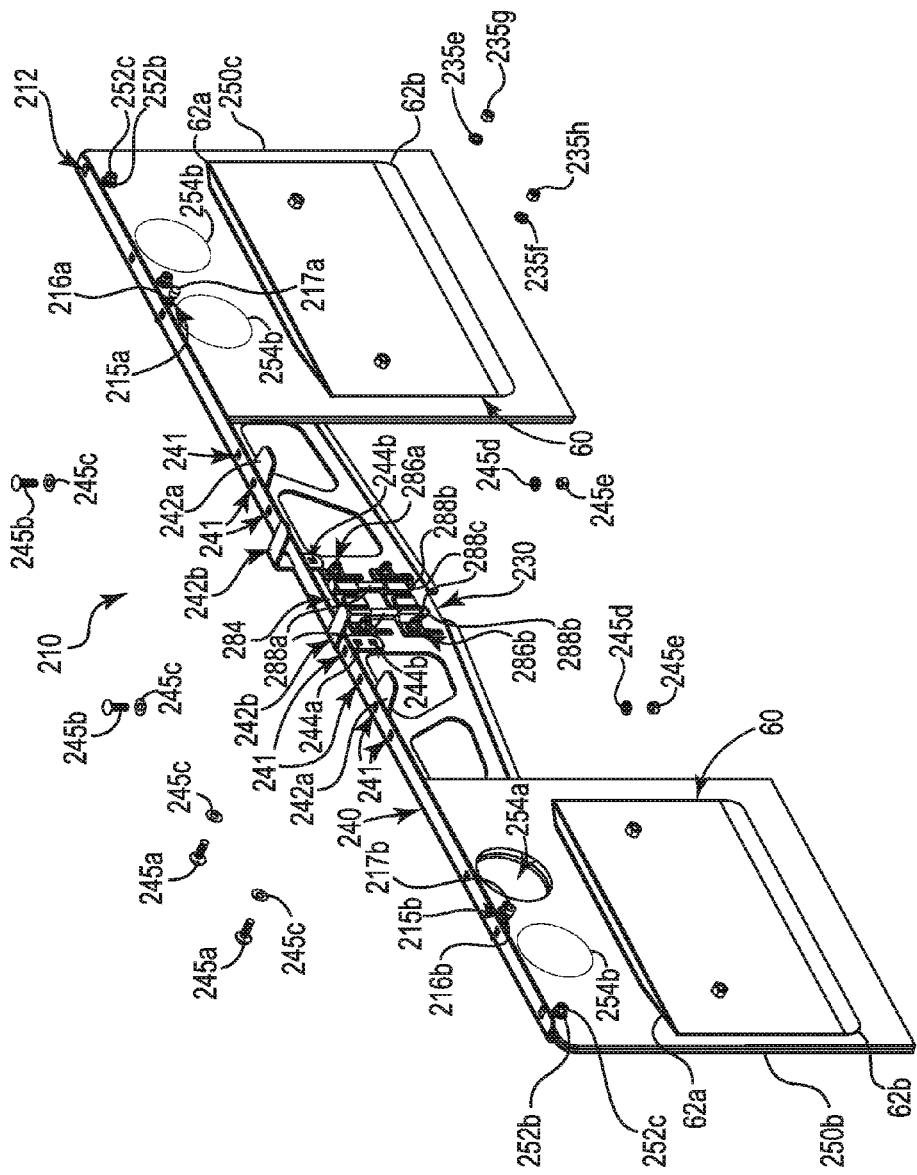
FIG. 13A is a partially exploded, front perspective view of the alternate mud flap assembly 210 of FIG. 12, including heat shields 60, such as shown in FIG. 11, but being bolted to the respective flap panels 250a, 250b.
Figure 13B:
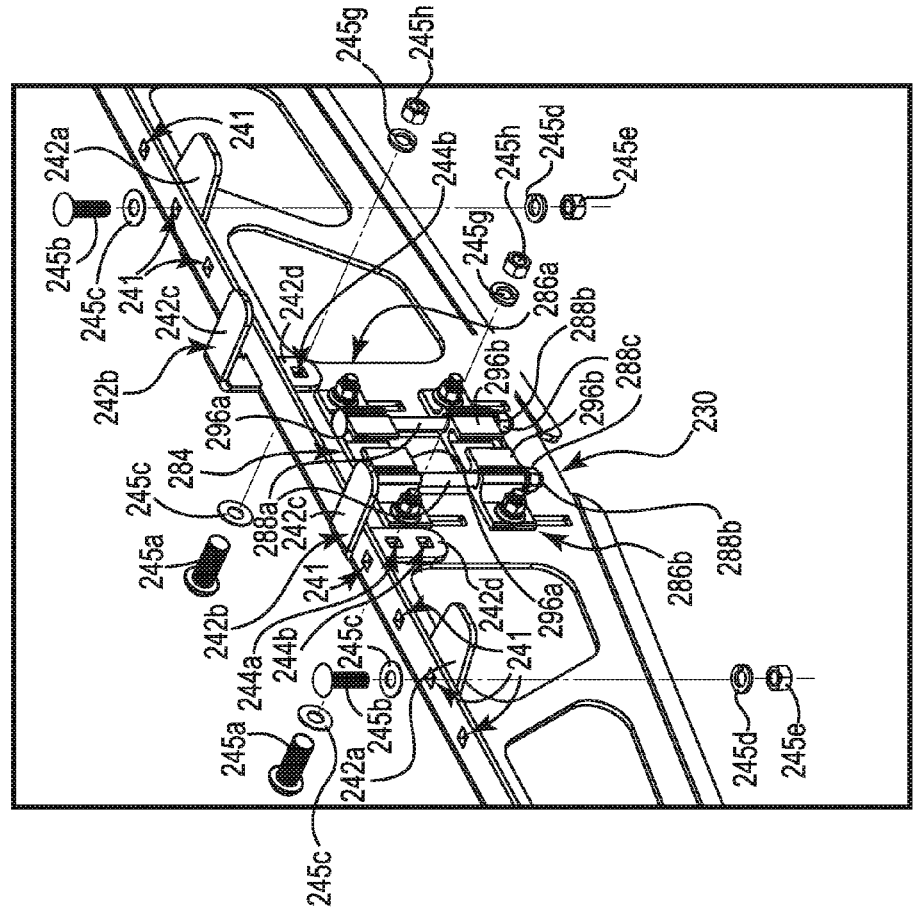
FIG. 13B is a partial perspective view of the front of the alternate mud flap assembly 210 of FIG. 13A, providing a partially exploded view of the alternate fasteners used to secure the alternate, adjustable support flange elements 242a, 242b.

Preferred mud flap assemblies 10, 110, 210, 410, 510, 1010, 1110, 1210 are designed to be attached to a hitch assembly 70 preferably having a ball mount 71 and then to a vehicle V having a rear bumper B and a hitch receiver 76 proximate the rear bumper B. With many vehicles, the rear bumper B has a step or a top surface S and the hitch assembly will preferably have a shaft or hitch tongue 72, which is preferably interconnected to the ball mount 71 for engagement with the hitch receiver 76. The preferred mud flap assemblies 10, 110, 210, 410, 510, 1010, 1110, 1210 preferably include a frame 12, 112, 212, 312, 412, 512, 1012, a securing bracket or securing assembly 84, 284, 484, 584, 1084 and two mud flap panels or flap panels 50a, 50b, 150a, 150b, 250a, 250b, 450a, 450b, 550a, 550b, 1050a, 1050b, 1150a, 1150b, 1250a, 1250b. The frame 12, 112, 212, 312, 412, 512, 612, 712, 1012, preferably has two longitudinal ends 14a, 14b, 114a, 114b, 214a, 214b, 313a, 314b, 414a, 414b, 514a, 514b, 614a, 614b, 714a, 714b, 1014a, 1014b, 1114a, 1114b, 1214a, 1214b, a rear plate 30, 130, 230, 330, 430, 530, 630a, 630b, 630c, 730a, 730b, 730c, 1030 and a top plate 40, 140, 240, 340, 440, 540, 640a, 640b, 640c, 740a, 740b, 740c, 1040 wherein the top plate is generally oriented perpendicularly to the rear plate. In preferred embodiments, as shown in FIG. 1, for example, and in FIGS. 9, 10, 17, 19 and 22, the top plate 40, 140, 640, 740, 840 preferably includes a pair of side by side support flanges 42, 142, 642, 742, 842 which extend away from the rear plate 30, 130, 630, 740, 840 toward the vehicle V, to a greater degree than other portions of the frame 12, 112, 612, 712, 812 when the frame 12, 112, 612, 712, 812 is secured to the vehicle V. As shown in FIGS. 3A, 4 and 5, the support flanges are designed to rest upon a shelf S of a bumper B of certain vehicles. When the support flanges rest upon the shelf S the frame 12, 112, 612, 712, 812 will be engaged with the bumper B and will act to stabilize the frame and the respective mud flap assembly against the bumper B so that the frame will not shake or vibrate independently of the vehicle as much as it would if the support flanges were not in contact with the bumper B. This enhances the wear life of the frame and anchors the frame the vehicle in such a way that a greater amount of weight can be placed on the top plate when the mud flap assembly is in use. In some preferred embodiments, as shown in FIGS. 12, 13A and 13B, for example, support flanges 242a, 242b are not part of the frame 212, but are instead separate pieces that are preferably secured to the fame 212 with a series of connectors such as the bolts 245a, 245b, washers 245c, 245d, 245e, 245f and nuts, preferably self locking nuts, 245g, 245h. These separate support flange pieces are preferably of two types, a single flat piece or a flange 242a that is connected to the frame 212 by a bolt 245b passing through one of several openings 241 in the top plate 240, so that the support flange piece 242a can be moved from place to place along the top plate 240 where such openings 241 reside and are therefore adjustable and repositionable, and a single angled piece 242b that has a bottom portion 242d that preferably extends vertically away from top portion 242c generally at a right angle that is inherent in the structure. The top portion 242c of the angled piece 242b is generally flat and its position with respect to the top plate 230 is adjustable because it is preferably secured to the frame 212 by a bolt 245a that preferably extends through a slot or aperture 234 in the rear plate 230 of the frame 212 (see FIG. 12) and then through one of two openings 244a, 244b in the bottom portion 242d of the angled piece 242b, so a nut 245h can be tightly secured to the bolt 245a to secure the bottom portion 242d of the angled piece 242b tightly against the rear plate 230, and further so that the angled piece 242b cannot slide against the rear plate 230 and the bolt 245a is unable to slide within the slot 234. It will be appreciated that because the nut 245h can be loosened so as to allow the bolt 245a to slide up or down within the confines of the edges of the slot 234, the angled piece 242b is adjustably attached to the frame 212. Furthermore, because the bottom portion 242d has an upper opening 244a and a lower opening 244b, the angled piece 242b can be further repositioned by selecting one opening or the other for passage of the bolt 245a prior to tightening the nut 245h to secure the angled piece 242b against the rear plate 230 of the frame 212. As such, the support flanges 242a, 242b can be positioned to rest upon the shelf S of the bumper B and will act to stabilize the frame and the respective mud flap assembly against the bumper B so that the frame will not shake or vibrate independently of the vehicle as much as it would if the support flanges were not in contact with the bumper B.

Each of the respective mud flap panels 50a, 50b, 150a, 150b, 250a, 250b, 450a, 450b, 550a, 550b, 1050a, 1050b, 1150a, 1150b, 1250a, 1250b can be secured to any frame 12, 112, 212, 312, 412, 512, 612, 712, 812, 1012, proximate respective longitudinal ends 14a, 14b, 114a, 114b, 214a, 214b, 313a, 314b, 414a, 414b, 514a, 514b, 612a, 614b, 714a, 714b, 814a, 814b, 1014a, 1014b, 1114a, 1114b, 1214a, 1214b of the respective frame 12, 112, 212, 312, 412, 512, 612, 712, 812, 1012. In one preferred embodiment, as illustrated in FIGS. 1-10, for example, the hitch assembly 70 can be adjustably secured to the frame 12 by the securing assembly 84 such that when the hitch tongue 72 is engaged with the hitch receiver 76 to provide a first point of contact with the vehicle V, the support flanges 42 of the top plate 40 can engage or rest upon an upper surface S of the rear bumper B to give the mud flap assembly 10 a second and a third point of contact with the vehicle V.

Figure 14A:
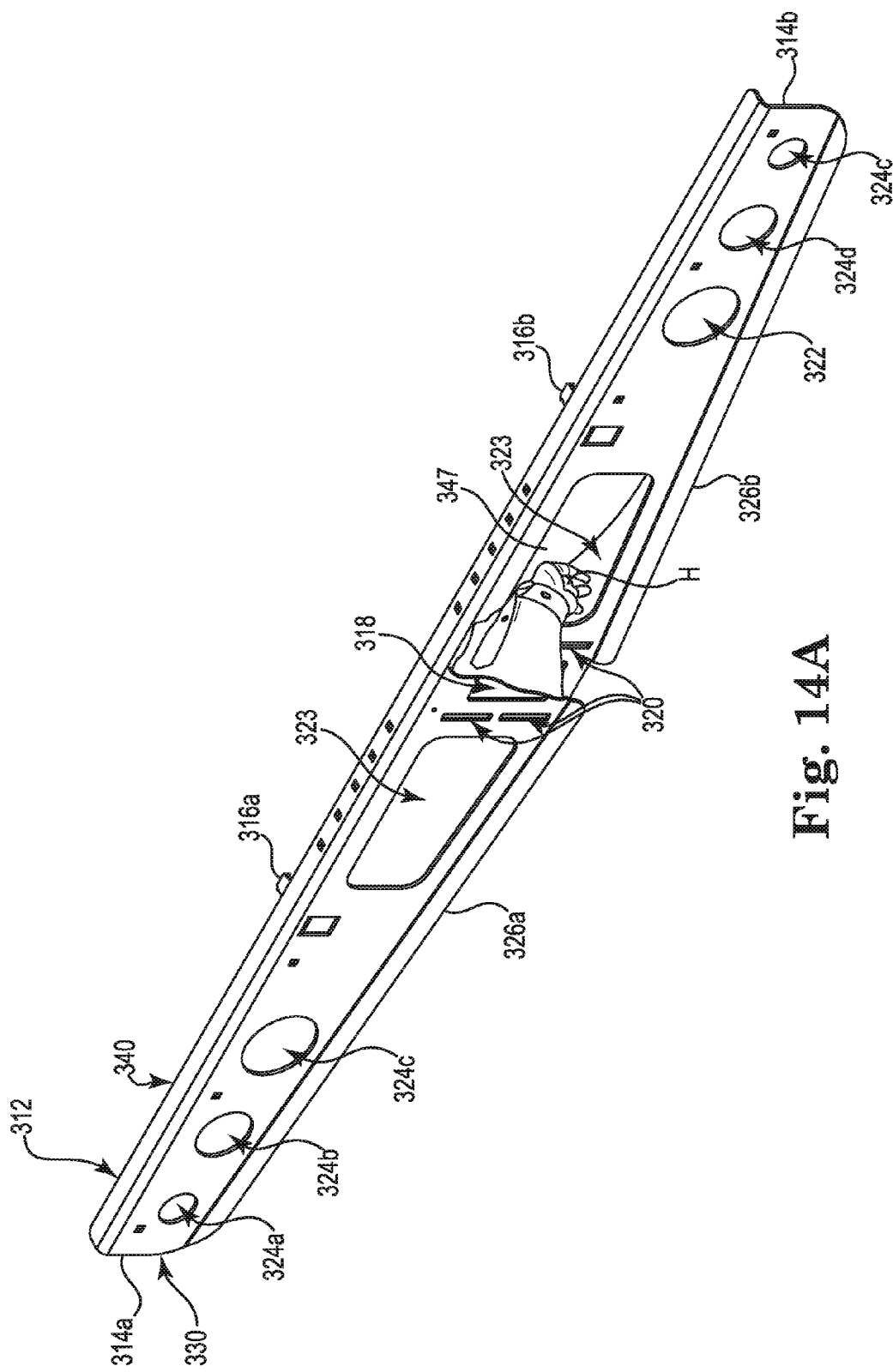
Figure 14B:
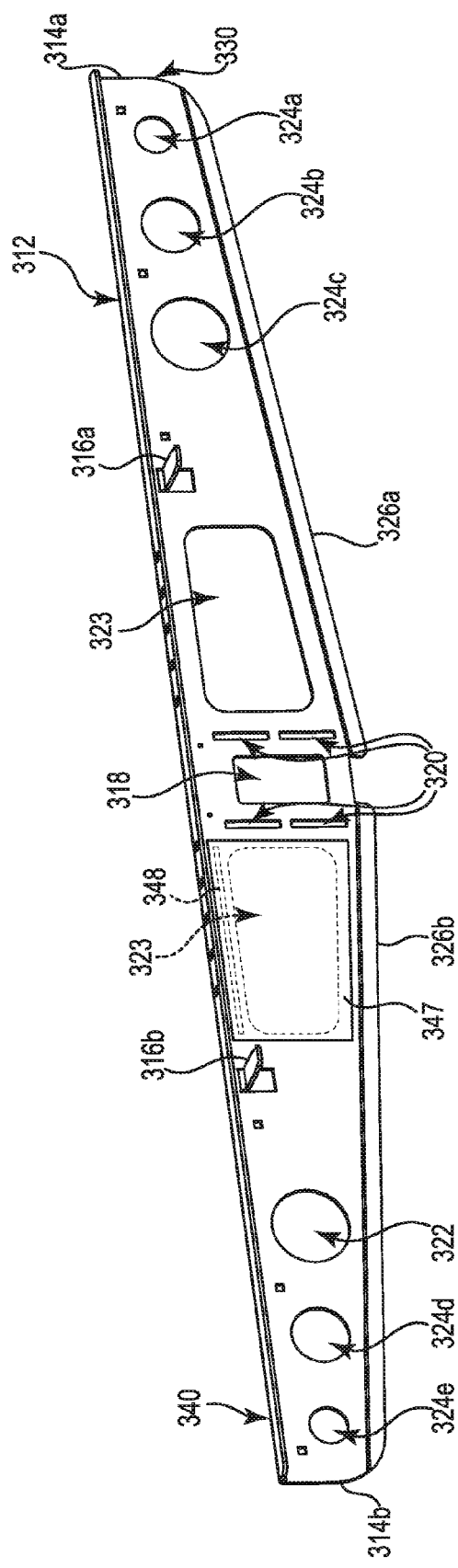
FIG. 14B is a front perspective view of the frame of FIG. 14A, showing the flexible flap 347 that covers one of the front of one of the access openings 323 (shown in phantom) that is covered by the flexible flap 347 that is preferably secured to the front of the frame 312 by a strip of adhesive material 348 that is also shown in phantom.
Figure 17:
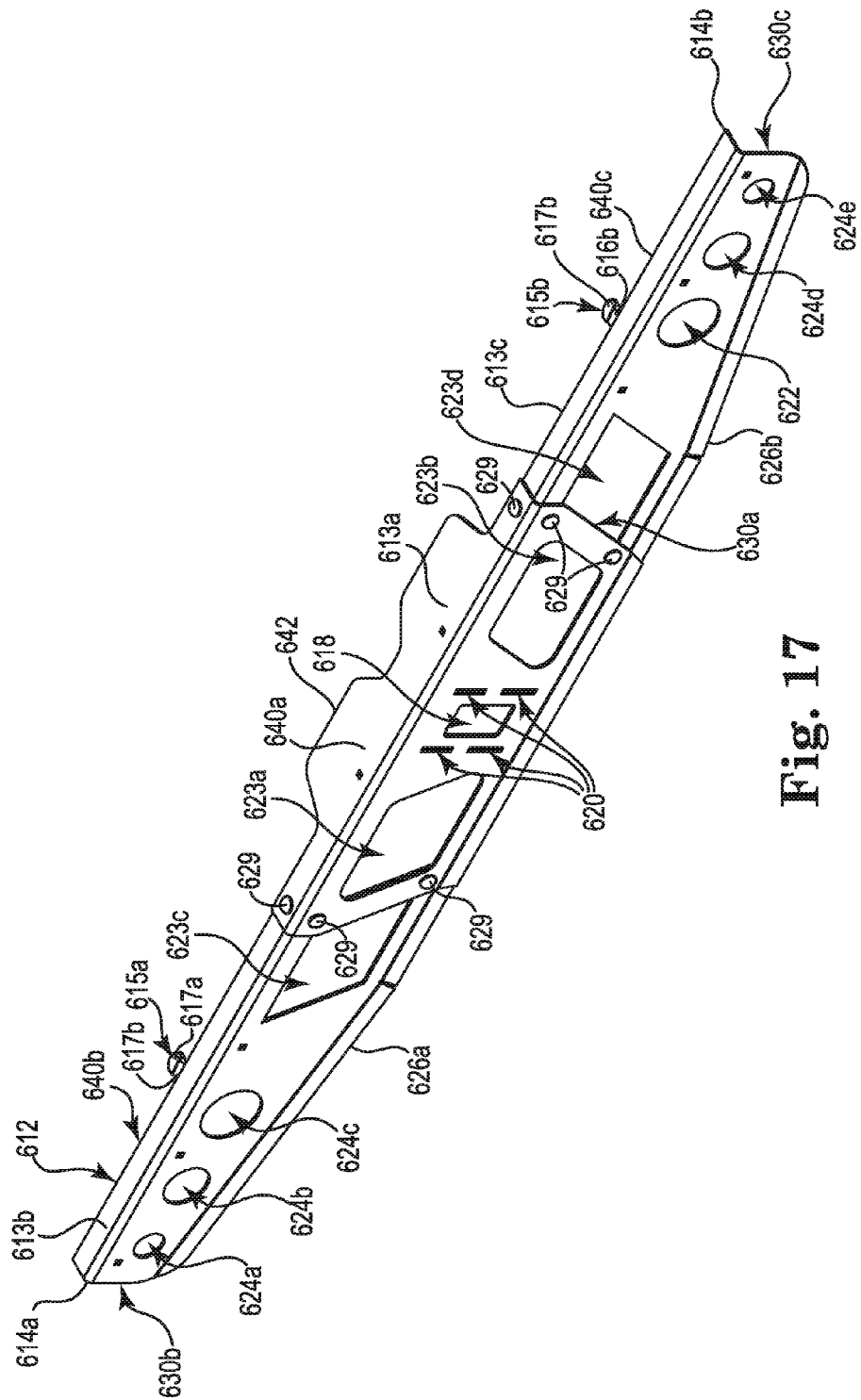
FIG. 17 is a rear perspective view of an alternate multi-piece frame 612 that can be used with the other parts of the various mud flap assemblies disclosed herein, wherein the alternate frame includes three separate frame elements 613a, 613b, 613c that are assembled together using a series of fasteners 629.
Figure 18D:
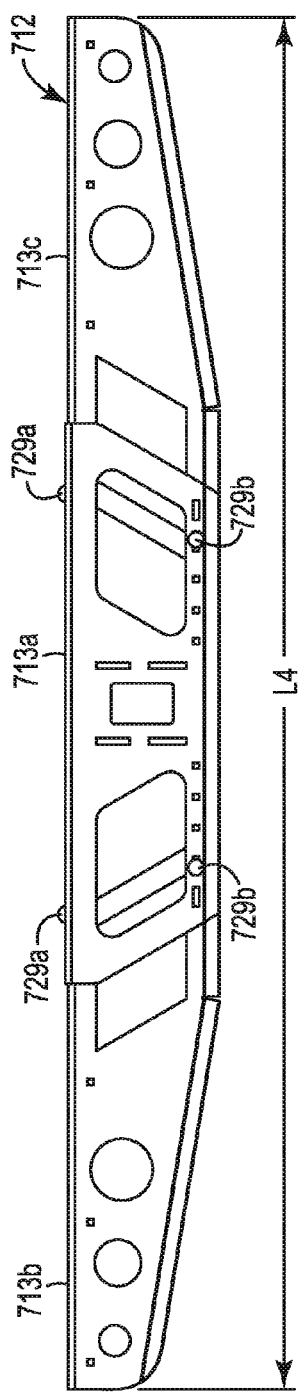
Figure 18E:
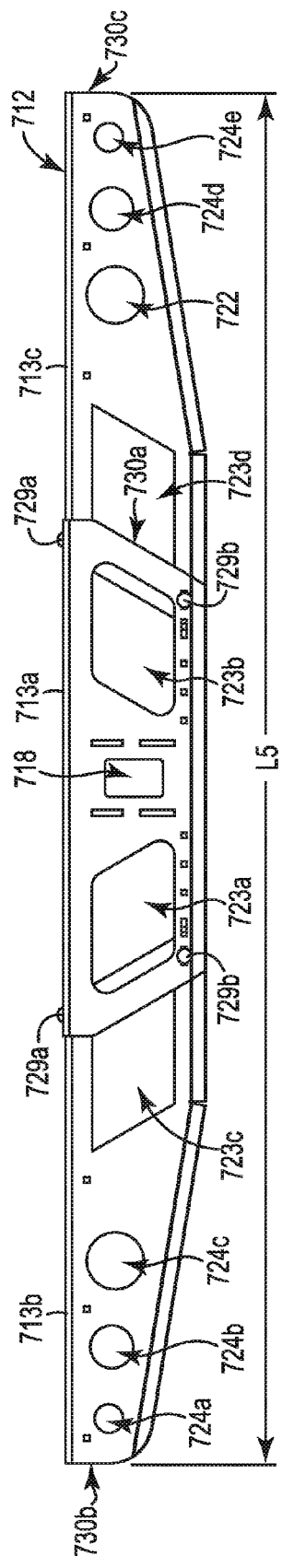

Preferred mud flap assemblies 10, 110, 210, 410 of the present invention, shown in FIGS. 1-10, 12-13B and 15A-15D each preferably include a pair of stop assemblies 15a, 15b, 115a, 115b, 215a, 215b, 415a, 415b, and each of the frames 312, 612 shown in FIGS. 14A-14B and 17 also include a pair of stop assemblies 315a, 315b, 615a, 615b. Each of the stop assemblies include a stop 16a, 16b, 116a, 116b, 216a, 216b, 316a, 316b, 416a, 416b, 616a, 616b, a bumper cap 17a, 17b, 117a, 117b, 217a, 217b, 317a, 317b, 417a, 417b, 617a, 617b and, in further preferred embodiments, a protective piece 21a, 21b, 121a, 121b, 221a, 221b, 321a, 321b, 421a, 421*b*, 621*a*, 621*b* is also provided that is placed on the vehicle bumper B proximate a place where the owner projects the bumper cap covering the stop will engage the bumper B when the stop and the bumper cap are pressed up against the bumper when the mud flap assembly is secured to the vehicle V in order to protect the bumper from abrasion at the point of contact. The stops 16*a*, 16*b*, 116*a*, 116*b*, 316*a*, 316*b*, 616*a*, 616*b* shown in FIGS. 1-10, 14A-14B and 17 are a part of the respective frame 12, 112, 312 and 612, and the stop assemblies 215*a*, 215*b*, 415*a*, 415*b* shown in FIGS. 12-13B and 15A-15D are attached to the respective frames 212, 412 using connectors of one kind or another. The stop assemblies 215*a*, 215*b* shown in FIGS. 12-13B are secured to a universal frame 212 using a bolt 219. The stop assemblies 415*a*, 415*b* shown in FIGS. 15A-15D are pivotally attached to a universal frame 412 by bolts 445*a* that pass through an aperture 441 in the top plate 440 of the frame 412 and an opening 419 in the pivotal stop 416 before a nut 445*d* is threaded on to the bolt 445*a* to secure the stop assembly 415*a*, 415*b* to the top plate 440 of the frame 412. When the universal frame 412 is secured to the vehicle V and the respective pivotal stop assemblies 415*a*, 415*b* are pivotally secured to the frame 412, the pivotal stop assemblies 415*a*, 415*b* can be adjusted so as to pivot the stop assembly 415*a*, 415*b* with respect to the top plate 440 of the frame 412 to engage the bumper cap 417*a*, 417*b* covering the stop 416*a*, 416*b* with the bumper B of the vehicle V to further stabilize the mud flap assembly 410 with respect to the bumper B. When the pivotal stop assemblies 415*a*, 415*b* is adjusted so as to pivot the stop assembly 415*a*, 415*b* toward the bumper B so as to engage the bumper cap 417*a*, 417*b* covering the stop 416*a*, 416*b* with the bumper B the nut 445*d* can be tightened against the stop assembly 415*a*, 415*b* so as to place a tension on the bumper B between the bumper cap 417*a*, 417*b* and the bumper B.

The preferred mud flap assemblies 10, 110, 210, 310, 410, 610 of the present invention shown in FIGS. 1-8, 9-10A, 12-13B and 15A-15E, each include a pair of stop assemblies 15*a*, 15*b*, 115*a*, 115*b*, 215*a*, 215*b*, 315*a*, 315*b*, 415*a*, 415*b*. When the frames 12, 112, 212, 312, 412, 512 are operatively installed on the vehicle V, the stop assemblies 15*a*, 15*b*, 115*a*, 115*b*, 215*a*, 215*b*, 315*a*, 315*b*, 415*a*, 415*b* are pressed against a rear surface R of the bumper B to further stabilize the mud flap assembly 10, 110, 210, 410 against the vehicle V. The position of the stop assemblies 415*a*, 415*b*, may be adjusted to accommodate many types of vehicles V as will be discussed further below. Although a pair of stop assemblies are preferably provided with each frame, if is contemplated that mud flap assemblies of the present invention may have from zero to three or more stop assemblies located in various different positions with respect to the frame in order to accommodate the various shapes and sizes of the variety of different vehicle bumper types.

FIGS. 1-8 illustrate one preferred mud flap assembly 10. The mud flap assembly 10 preferably includes a frame 12 having first and second ends 14*a*, 14*b* that generally span a bumper B of a vehicle V (partially shown) (see, for example, FIG. 3A). The frame 12 is preferably made of extruded aluminum and includes one or more access openings 23*a*, 23*b*, 23*c*, 23*d* to provide access to hitch wiring, safety chain and hitch receiver (not shown). It will be understood that the access openings 23*a*, 23*b*, 23*c*, 23*d* can be of many shapes sizes and configurations. The frame 12 preferably includes a rear plate 30 and a top plate 40. Preferably the rear plate 30 and the top plate 40 are generally reside in separate planes that are generally perpendicular to one another that meet at an angle (a) of about 90 degrees. In this embodiment, the top plate 40 includes a support flange 42 that is arranged and configured to sit upon the step S of the bumper B. By having the support flange 42 sit upon the bumper B when operatively installed, at least one contact point is formed between the mud flap assembly 10 and the bumper B, which stabilizes the mud flap assembly 10. The frame 12 preferably further includes at least one stop assembly 15*a*, 15*b* extending from the frame 12. Each stop assembly 15*a*, 15*b* preferably includes a stop 16*a*, 16*b* and a bumper cap 17*a*, 17*b*. The stop assemblies provide the respective mud flap assemblies with additional points of contact with the bumper B of the vehicle V to further stabilize the mud flap assemblies with respect to the vehicle V.

At first and second ends 14*a*, 14*b* of the frame 12, proximate the tires of the vehicle (not shown); flap panels 50*a*, 50*b* are secured to and extend downwardly from the frame 12. The flap panels 50*a*, 50*b* generally block dirt, debris or rocks kicked-up by the tires from damaging the apparatus being towed by the vehicle V via the hitch assembly 70. Flap panels 50*a*, 50*b* disclosed herein are preferably made of flexible material such as masticated rubber or the like. Preferably, the flap panels 50*a*, 50*b* are secured to the frame 12 with nuts 52*a*, bolts 52*b* and washers 52*c*.

To further protect the apparatus being towed (not shown) by the mud flap assembly 10, preferred frames 12 will be configured such that the top plate 40 generally mirrors the curvature of the bumper B to minimize the space between the top plate 40 and the bumper B such that rocks and other debris (not shown) cannot easily escape upwardly from the mud flap assembly 10.

Preferred mud flap assemblies 10 further include at least one stop 16*a*, 16*b* proximate each end 14*a*, 14*b* of the frame 12. Each stop 16*a*, 16*b* is arranged and configured to provide another contact point between the mud flap assembly 10 and the bumper B of the vehicle V. In preferred embodiments, each stop 16*a*, 16*b* is arranged and configured such that when the stop 16*a*, 16*b* contacts the bumper B and the hitch tongue 72 is inserted within a hitch receiver opening 77 of the hitch receiver 76, hitch tongue 72 apertures 74 and hitch receiver 76 apertures 78 are aligned. It is believed that such a configuration provides faster and easier installation of the mud flap assembly 10. Optionally, the mud flap assembly 10 can also include a protective piece 21*a*, 21*b* that can be securable to the bumper B such that each stop 16*a*, 16*b* contacts one respective protective piece 21*a*, 21*b* and prevents and marring or potential damage to the bumper B due to contact with the respective bumper cap 17*a*, 17*b*. The protective piece 21*a*, 21*b* can be vinyl static-cling material, an adhesive sticker or the like.

Preferred mud flap assemblies 10 are adjustable so that they can accommodate many types of vehicles and hitch assembly 70 configurations. In preferred embodiments, the frame 12 includes a hitch opening 18 and four slots 20 proximate the hitch opening 18. Referring now also to FIGS. 2C-2F, a securing assembly or securement bracket 84 is preferably used to connect the hitch tongue 72 to the frame 12. Preferred securing assemblies 84 include two clamp halves 86*a*, 86*b* interconnected by two long bolts, preferably long carriage bolts 88*a*, and corresponding nuts 88*b* and washers 88*c* used to secure the respective clamp halves 86*a*, 86*b* together to form a central clamp opening 90 for receiving the hitch tongue 72. The securing assembly 84 will also include four small bolts 94*a*; preferably small carriage bolts 94*a* to secure the respective clamp halves 86*a*, 86*b* to the frame 12. The clamp halves 86*a*, 86*b* are preferably secured to the frame 12 by inserting the respective small carriage bolts 94*a* through the respective slots 20 in the frame 12 and through small bolt receiving openings 87 in each of the respective sides of the respective clamp halves 86*a*, 86*b* and nuts 94*b* and washers 94c are preferably used to secure the small bolts 94a to the clamp halves 86a, 86b and the frame 12. The small carriage bolts 94a, 94b have a squared off shank portion (not shown), similar to a squared off shank portion 88a" below the head 88a' of the preferred long carriage bolts 88a, so that the nuts 94b can be easily tightened against the respective clamp half 86a, 86b with a single wrench when the squared off shank portion resides within the respective slot 20.

The two long carriage bolts 88a are used to secure the respective clamp halves 86a, 86b to one another on opposite sides of a hitch tongue 72, when the securing assembly 84 is secured to the hitch tongue 72. The respective clamp halves 86a, 86b are preferably pieces cut from an aluminum extrusion (not shown). The aluminum extrusion is preferably a 20 foot extrusion and the piece are preferably cut from the extrusion with a band saw in widths of from about 1.0 to about 1.5 inches, preferably about 1.25 inches, to create side surfaces 97 above and below three channels 89, 91, 89 in each of the respective clamp halves 86a, 86b. Each clamp half 86a, 86b will preferably have a left side 86a', 86b' and a right side 86a", 86b" that are mirror images of one another and each of the respective sides 86a', 86b', 86a", 86b" will each preferably include an aperture 87 for receiving the short carriage bolts 94a, so that the short carriage bolts 94a can secure the respective clamp halves 86a, 86b to the frame 12. In preferred embodiments the apertures 87 will be machined, stamped or punched, preferably punched into the respective clamp halves 86a, 86b. Each side 86a', 86b', 86a", 86b" will preferably have a long carriage bolt receiving opening 89, preferably a channel 89 that extends from one side surface 97 of the respective clamp half 86a, 86b to another. The long carriage bolt receiving opening channel 89 will preferably have a cross-sectional shape that is generally square so as to receive the shank portion 88a" of the long carriage bolts 88a, so that the nuts 88b can be easily tightened against the respective clamp half 86a, 86b with a single wrench when the squared off shank portion 88a" resides within the respective channel 89. Each of the respective clamp halves 86a, 86b preferably have a central channel 91 at least partial defined by a flange 96a, 96b. The respective flanges 96a, 96b extend upward from the base of each of the respective clamp halves 86a, 86b expanding the area of the respective side surfaces 97, adjacent to the respective long carriage bolt receiving channels 89, against which the heads 88a' of the long carriage bolts 88a and the washers 88c and/or nuts 88b that secure the respective long carriage bolts 88a to the respective clamp halves 86a, 86b, will press when the securing assembly 84 is secured to the hitch tongue 72. This extended surface area is believed to reduce the stress that is placed upon the respective long carriage bolts 88a when the securing assembly 84 is secured to the hitch tongue 72. It will be appreciated that the respective channels 89, 91, 89 allow the die (not shown) used to make the aluminum extrusion (not shown) from which the respective clamp halves 86a, 86b are cut, to be simplified, which greatly reduces to cost of production for the respective clamp halves 86a, 86b. Creating channels as opposed to machining a channel or an aperture from top to bottom in the respective side surfaces 97 of each of the respective clamp halves 86a, 86b is believed to significantly reduce to cost per piece of the respective clamp halves.

The clamp halves 86a, 86b are secured to the frame 12 with short carriage bolts 94a with nuts 94b and washers 94c. The short carriage bolts 94a pass through slots 20 in the frame 12 and apertures 87 in the clamp halves 86a, 86b (see, for example, FIGS. 1, 2A-2D). Preferably, the slots 20 provide for adjustable placement of the short carriage bolts 94a or the like to accommodate various hitch assembly 70 sizes and to permit the securing assembly 84 to be adjustably oriented vertically with respect to the frame and the frame with respect to the bumper B and the vehicle V.

The frame 12 also preferably includes at least one exhaust opening 22 that is aligned with a corresponding aperture 54a in the respective flap panel 50b. Each flap panel 50a, 50b may include one or more outlines 54b for a user to trace and cut an aperture 54a in the flap panel 50b, if desired. It is noted that there is no outline proximate 54a, because the exhaust aperture 54a has already been cut where the outline would be located. The outline may be formed by a marking, scored edge or the like. The exhaust openings in the frame 12 and exhaust opening 54a respective flap panel 50a, 50b are preferably aligned proximate the vehicle exhaust pipe P so that the mud flap assembly 10 allows for suitable ventilation of hot exhaust away from the vehicle V. Such an exhaust opening 22 is particularly beneficial for models of trucks, such as the Dodge 1500 model truck, which includes an exhaust pipe that would be located close to the flap panel 50b. The frame 12 may also include decorative apertures 24a, 24b, 24c 24d, 24e textures or designs, as desired.

In preferred embodiments, the frame 12 further includes a bent lip 26a, 26b proximate the flap panels 50a, 50b, which allows the respective flap panels 50a, 50b to flex upwardly as the vehicle moves forward and air resistance pushes the bottoms of the respective flap panels away from the vehicle when the mud flap assembly 10 is secured to the vehicle. The bent lips 26a, 26b also provide greater strength to the respective rear plates 30a, 30b to resist horizontal deformation. Corresponding bent lips 126a, 126b, 226a, 226b, 326a, 326b, 426a, 426b, 526a, 526b, 626a, 626b, 726a, 726b, 826a, 826b, 1026a, 1026b, 1126a, 1126b, 1226a, 1226b are also provided in each of the other respective embodiments described below.

Figure 9:
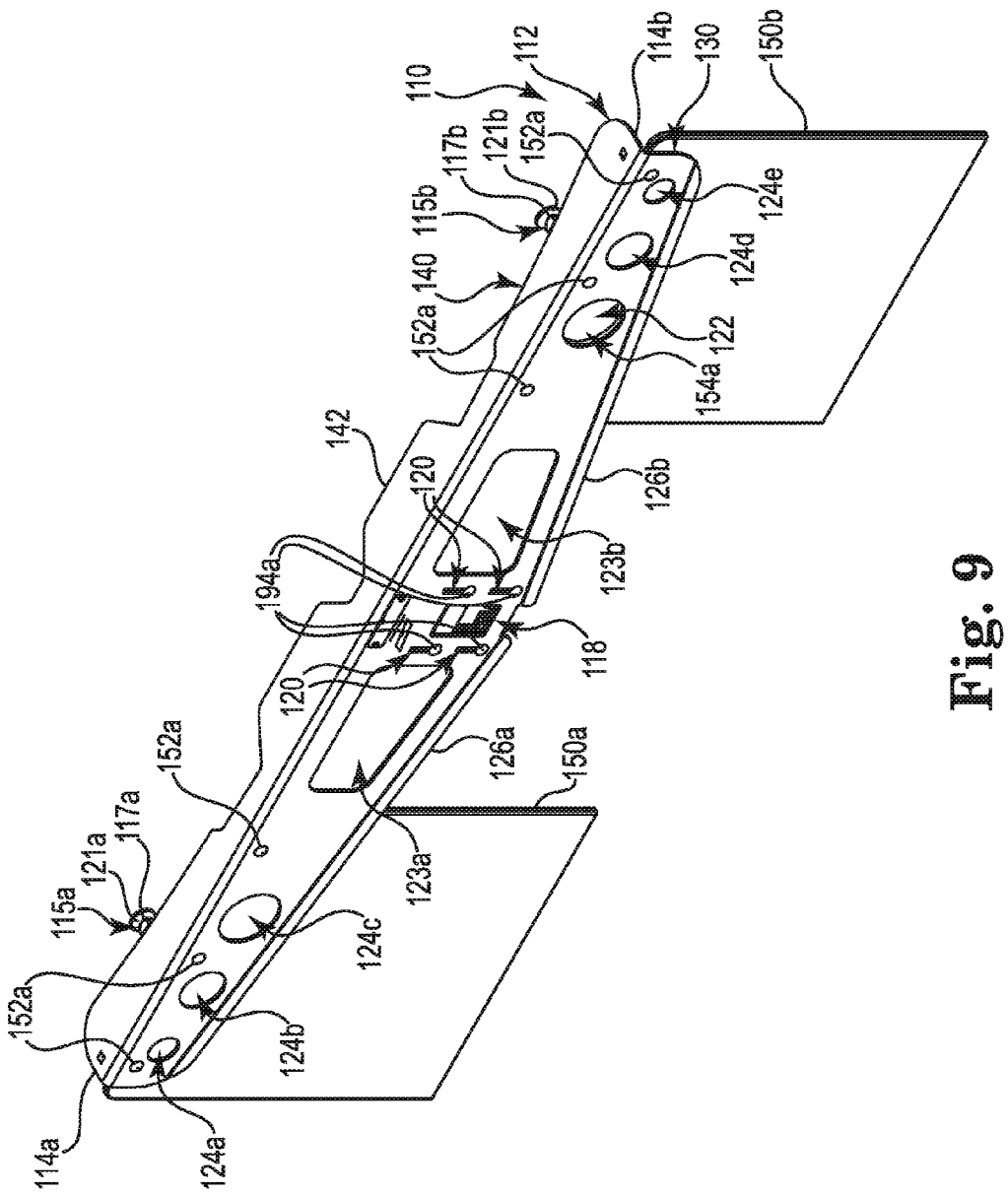
FIG. 9 is a rear perspective view of an alternate mud flap assembly 110, largely similar to the mud flap assembly 10 shown in FIG. 1, but having enlarged access openings 123a, 123b and showing the respective stop assemblies 115a, 115b engaged with protective pieces 121a, 121 b, respectively, as they would be if the protective pieces 121a, 121b were attached to a bumper of a vehicle (not shown), if the alternate mud flap assembly was secured to such a vehicle.
Figure 10A:
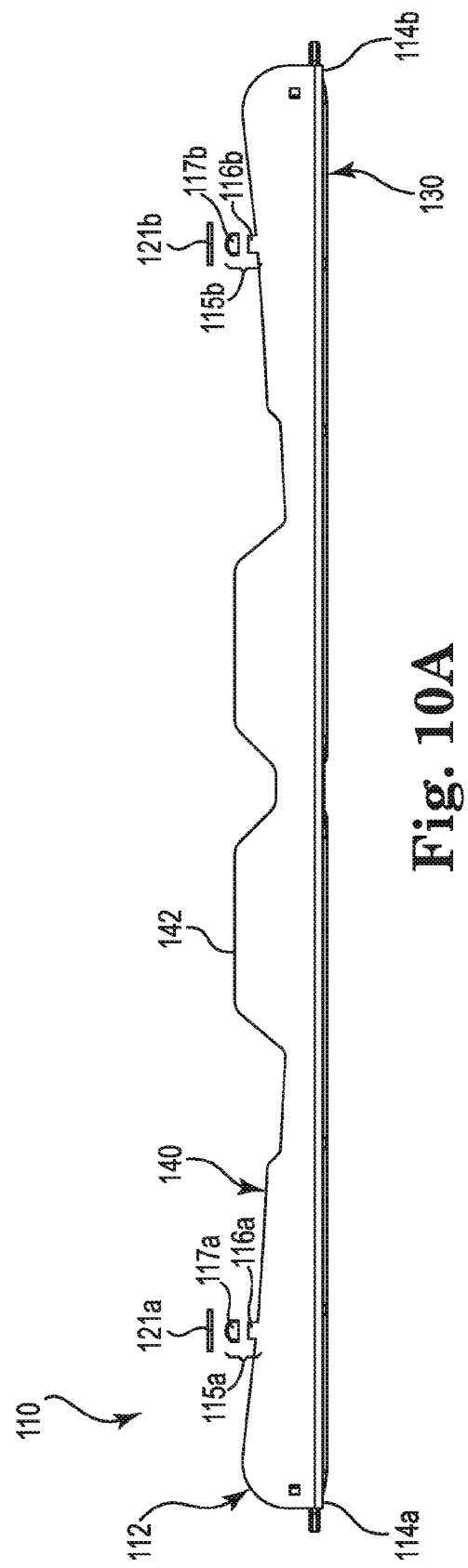
FIG. 10A is a top plan view of the alternate mud flap assembly 110 of FIG. 9, but showing the respective bumper caps 117a, 117b of the respective stop assemblies 115a, 115b exploded away from the respective stops 16a, 16b and the respective protective pieces 121a, 121b shown in FIG. 9.

One alternate mud flap assembly 110 is illustrated in FIGS. 9-10A. As can be seen, the mud flap assembly 110 includes most of the same elements of the mud flap assembly 10 of FIGS. 1-8, but has an alternate frame 12 design including two access openings 123a, 123b on either side of a hitch opening 118. It is noted that the access openings 123a, 123b can be of many shapes and sizes and that such shapes and sizes. As can be seen, mud flap assembly 110 includes a frame 112 having a first end 114a, a second end 114b, a rear plate 130 and a top plate 140 having a support flange 142. Extending from the rear plate 130 are preferably at least one stop assembly 115a, 115b having bumper caps 117a, 117b. The frame 112 may also include a hitch opening 118, slots 120, decorative apertures 124a, 124b 124c 124d, 124d, 124e and at least one exhaust opening 122. The frame 112 can be secured to flap panels 150a, 150b with fasteners 152b or the like. The mud flap assembly 110 can be secured to a hitch assembly 70 with a securing assembly 84 or the like (see also, for example, FIG. 4 and related disclosure).

Figure 10B:
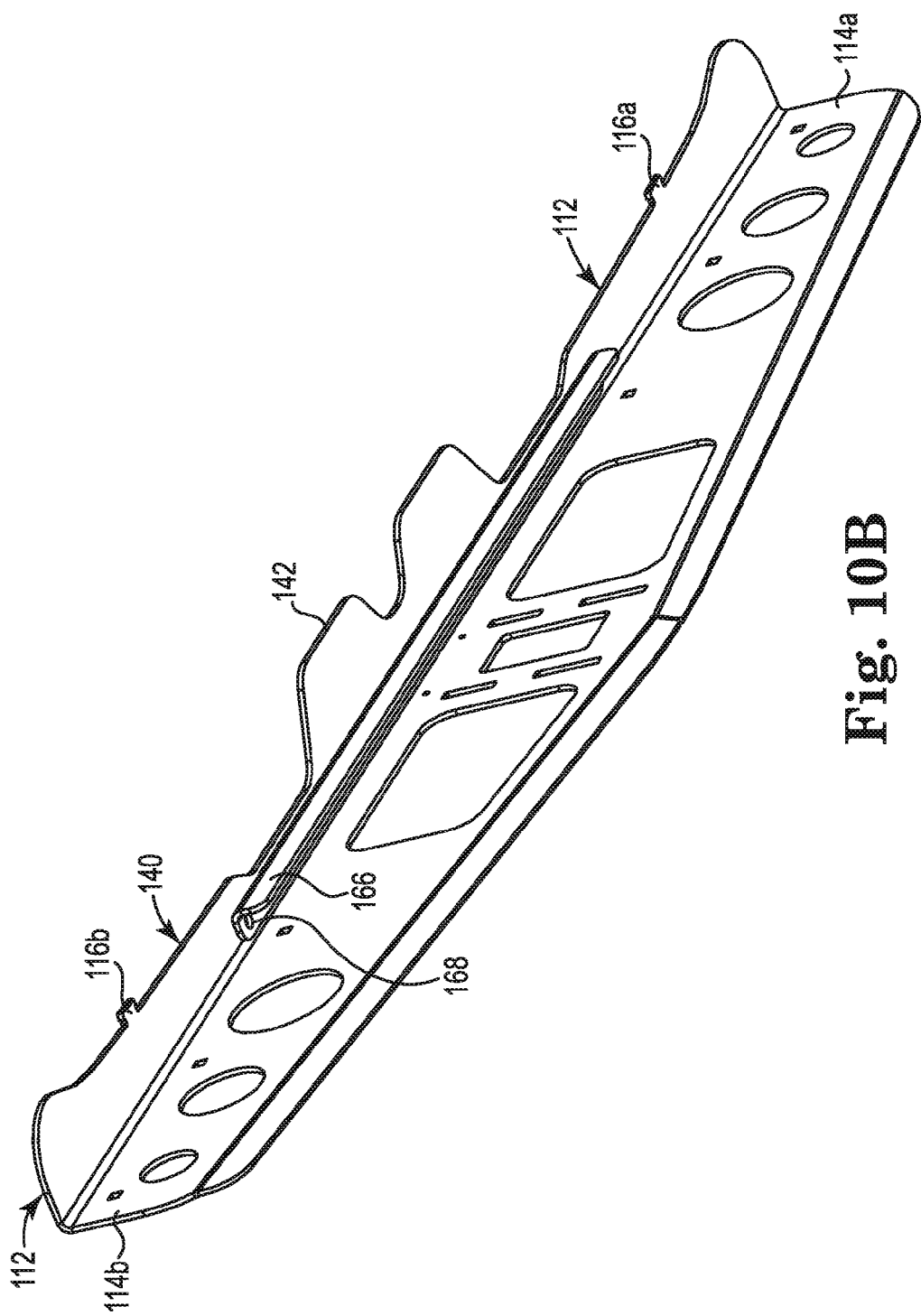
FIG. 10B a perspective view of the frame 112 of the mud flap assembly 110 of FIGS. 9 and 10A, as seen from in front and below the frame 112, showing a gusset member 166 that is plug welded, spot welded or the like to secure the gusset member to the frame 112 below the top plate 140 and proximate the support flanges 142 to strengthen the top plate 140 of the alternate frame 112.

FIGS. 10B and 10C illustrate a preferred gusset member 166 that can be plug welded to the frame 112 below the top plate 140 and proximate the support flanges 142 to strengthen the alternate frame 112. Although the frames of the present invention are preferably made of extruded aluminum, they may be made out of other metal materials and even hard plastics and composite material in alternate embodiments. In preferred embodiments the gusset member 166 will also be made of extruded aluminum and the gusset member is plug welded at a plurality of plug openings 168, spot welded at a plurality of positions or alternately connected with bolts, screws or other fasteners (not shown). The gusset member 166 can be added to the frame 112 to strengthen the frame so that the frame can better resist the forces applied to the extremities of the frame 112 during normal use.

Figure 11:
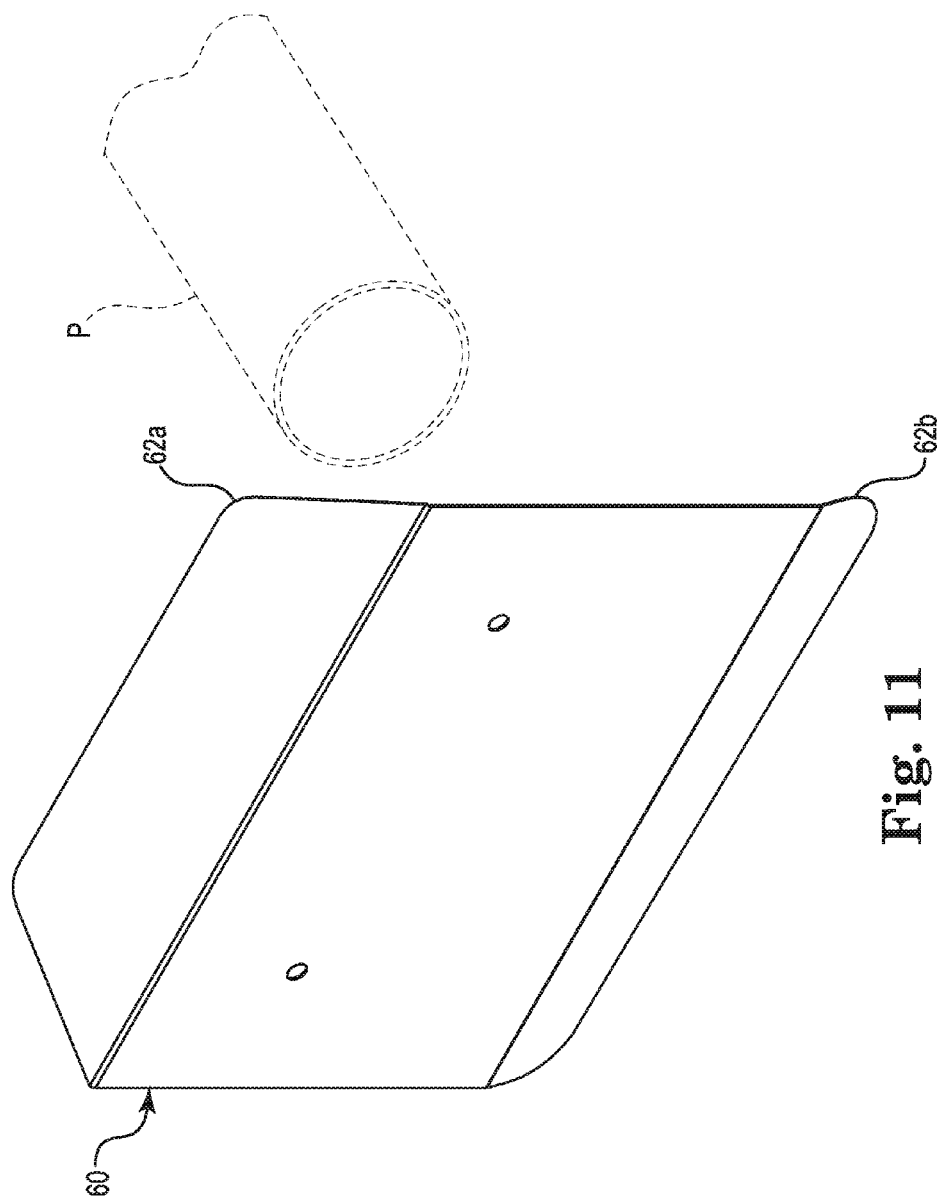
FIG. 11 is a schematic, perspective view to provide a schematic positioning perspective of the front of a heat plate 60, shown in relation to a vehicle exhaust pipe P (shown in phantom); wherein the heat plate can be operatively secured to the front of a flap panel 50a, 50b, 150a, 150b, 250a, 250b, 450a, 450b, 550a, 550b of mud flap assemblies 10, 110, 210, 410, 510, as shown in FIG. 13A, to shield the flap panel from hot exhaust coming from the exhaust pipe P.

FIG. 11 illustrates a preferred heat plate 60 that can be secured to one or more of the flap panels 50a, 50b, 150a, 150b, 250a, 250b, 450a, 450b, 550a, 550b, 1050a, 1050b, 1150a, 1150b, 1250a, 1250b of the disclosed mud flap assemblies 10, 110, 210, 410, 510, 1010, 1110, 1210. The heat plate 60 is preferably made of extruded aluminum and is positioned proximate an exhaust pipe P such that the heat from the exhaust exiting the exhaust pipe P is dissipated by the plate 60 and the flap panel 50a, 50b is protected from heat damage (see also, FIG. 15). The heat plate 60 may include upper and lower lips 62a, 62b that make it easier for the respective flap panel 50a, 50b to flex. Mud flap assemblies 10, 110, 210, 410, 510, 1010, 1110, and 1210 may include a heat plate 60 for each flap panel 50a, 50b, etc. or just one or no heat plates, as desired. The heat plate will preferably secured to the flap panels with mechanical fasteners such as bolts with washers and nuts (not shown), but other conventional mechanisms from securing the heat plates to the flap panels are also envisioned within the scope of the present invention.

Referring now also to FIGS. 12-13B, which disclose another preferred mud flap assembly 210 that is adjustable to accommodate many different vehicle and bumper types. The preferred mud flap assembly 210 includes a frame 212 that generally spans a bumper B of a vehicle V (see also, for example, FIG. 3A). The frame 212 includes one or more access openings 223a, 223b, 223c, 223d to provide access to hitch pins, cotter pins, hitch wiring, safety chains and hitch receivers (not shown). It will be understood that the access openings 223a, 223b, 223c, 223d can be of many sizes and shapes. The frame 212 preferably includes a rear plate 230 and a top plate 240. In preferred embodiments the rear plate 230 and the top plate 240 are at an angle (a') of approximately 90 degrees with respect to each other. The top plate 240 includes a plurality of support flange pieces 242a, 242b that are preferably arranged and configured to sit upon the step S of the bumper B.

In this embodiment, there are four support flanges 242a, 242b extending from the frame 212. The support flanges 242a are adjustable laterally along the length of the frame 212 and can be secured within a plurality of apertures 241 of the frame 212 with a bolt 245b, washers 245c, lock washers 245d and nuts 245e or the like. Support flanges 242b can alternatively be used and are adjustable in height to accommodate many different vehicles by securing a bolt 245a within slots 234 in the frame 212 and a pair of apertures 244a, 244b the lower portion 242d of support flange 242b with bolts 245a, flat washers 245c, lock washers 245g and nuts 245h or the like.

In this embodiment, the support flanges 242b are adjustable in that they include a plurality of adjustment apertures 244a, 244b that can be aligned with corresponding frame apertures 234 to selectively position the respective support flange 242b at a desired height once secured in place with a bolt 245a, flat washer 245c, lock washer 245g and nut 245h, for example (see also, for example, FIG. 13A in which support flanges 242b are illustrated at different heights with respect to the frame 212). Preferably, the support flanges 242a, 242b are adjusted such that they will sit upon the step S of the bumper B. As with previously disclosed embodiments, by having at least one support flange 242a, 242b sit upon the step S of the bumper B when operatively installed, additional contact points are formed between the mud flap assembly 210 and the bumper B of the vehicle V, which stabilizes the mud flap assembly 210. The frame 212 preferably further includes two adjustable stop assemblies 215a, 215b. Each stop assembly 215a, 215b including a stop 216a, 216b and a bumper cap 217a, 217b that extend from the frame 212 that provide two additional contact points with the vehicle that can stabilize the mud flap assembly 210. These additional points of contact help to further stabilize the respective mud flap assemblies with respect to the vehicle so as to minimize the degree to which the frames of the respective mud flap assemblies vibrate and move independently of the vehicle.

At first and second ends 214a, 214b of the frame 212, proximate the tires of the vehicle (not shown); flap panels 250a, 250b are secured to and extend downwardly from the frame 212. The flap panels 250a, 250b generally block any dirt, debris or rocks kicked-up by the tires from damaging the trailer and apparatus being towed by the vehicle (not shown). The flap panels 250a, 250b are secured to the frame 212, for example, with nuts 252a, bolts 252b and washers 252c.

Figure 3B:
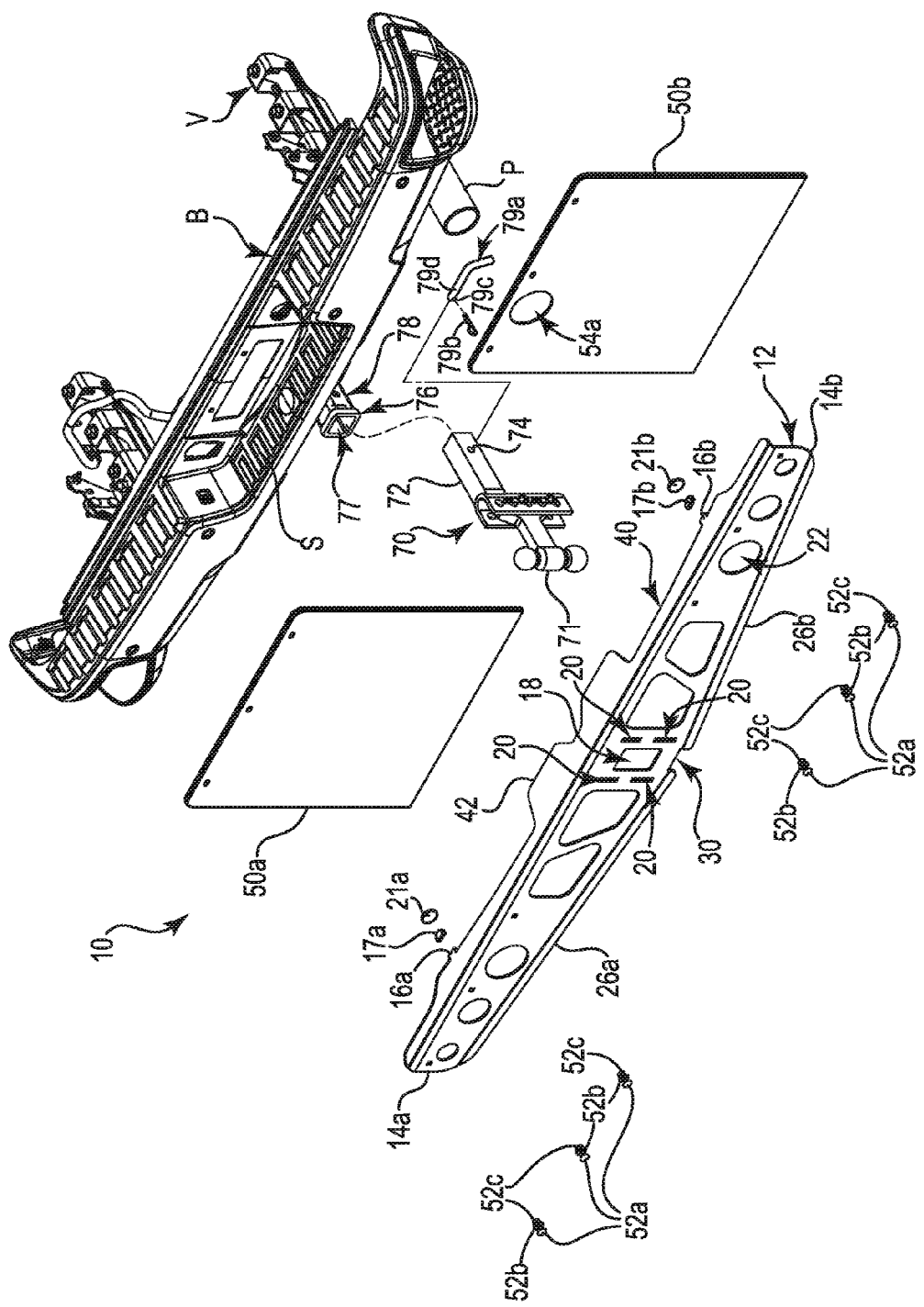
FIG. 3B is an exploded, rear perspective view of the mud flap assembly 10 of FIGS. 1-3A as seen generally from the perspective of FIG. 3A, in which the hitch assembly 70 is shown separately from the frame and the securing assembly 84 is not shown for clarity.

As with previously discussed embodiments, the mud flap assembly 210 of FIGS. 12-13B further includes at least one adjustable stop assembly 215a, 215b proximate each, or at least one end 214a, 214b of the frame 212. Each stop assembly 215a, 215b can preferably be adjusted to provide another contact point between the mud flap assembly 210 and the bumper B of the vehicle V. In preferred embodiments, the stop assembly 215a, 215b is adjustable such that when the respective stop is positioned against the bumper B, the hitch tongue aperture and hitch receiver opening 277 are aligned (as generally seen in FIGS. 3B and 10 illustrating hitch receiver 76 having hitch receiver opening 77, hitch aperture 78 and hitch tongue 72 having aperture 74). Such a configuration provides faster and easier installation of the mud flap assembly 210. One preferred way of making the stop assemblies 215a, 215b adjustable is to have the caps 217a, 217b arranged and configured so that they can be twisted like a threaded screw to either extend outwardly or inwardly from the stops 216a, 216b. It will be understood that there are numerous other ways in which the stop assemblies can be made adjustable to achieve the desired result of creating contact points with the bumper of a vehicle to stabilized the mud flap assembly and provide an alignment aid for the hitch tongue aperture and hitch receiver aperture.

The mud flap assembly 210 is also preferably further adjustable in that the frame 212 includes a hitch opening 218 and four slots 220 proximate the hitch opening 218. As with prior embodiments, a securing assembly or securement bracket 284 is preferably used to secure the shaft or hitch tongue 72 of the hitch assembly 70 to the frame 212 (see also, FIG. 2D illustrating one preferred securing assembly 284 in an exploded view). Preferred securing assemblies 284 include two clamp halves 286a, 286b interconnected with long carriage bolts 288a, nuts 288b and washers 288c to form a central clamp opening 290 for receiving the shaft or hitch tongue (see also, hitch tongue 72). Each clamp half 286a, 286b preferably includes at least one support flange 296a, 296b to contact the shaft or hitch tongue (see also, hitch tongue 72) and also to provide support for the long carriage bolts 288a, as discussed earlier. The clamp halves 286a, 286b are secured to the frame 212 with short carriage bolts 294a located within the frame slots 220 with nuts 294b and washers 294c. The short carriage bolts 294a can be secured within apertures in the clamp halves 286a, 286b (see also, for example, FIG. 2D).

The frame 212 can also include at least one exhaust opening 222 that is aligned with a corresponding aperture 254a in the respective flap panel 250b. Each flap panel 250a, 250b may include one or more outlines 254b for a user to trace and cut exhaust openings in the flap panel, if desired. The exhaust openings 222 in the frame 212 and exhaust opening 254a in the respective flap panel 250b are preferably aligned proximate the vehicle exhaust pipe P (see also, FIG. 3B) so that the mud flap assembly 210 ventilates hot exhaust away from the vehicle V. The outline may be a marking, scored edge or the like. The frame 212 may also include decorative apertures 224a, 224b, 224c, 224d, and 224e as desired. In preferred embodiments, the frame 212 further includes a bent lip 226a, 226b proximate each of the flap panels 250a, 250b such that the flap panels 250a, 250b can flex upwardly.

Now referring also to FIGS. 14A-14B that illustrate another preferred frame 312 that can be used with any of the various parts of disclosed mud flap assemblies 10, 110, 210, 410, 510, 1010, 1110, 1210 or be used as a replacement for frames 12, 112, 212, 412, 512, 1012. It will be understood that the frame 312 operates in largely the same manner as other frames disclosed herein and also includes a rear plate 330 and a top plate 340. Frame 312 does differ from those others disclosed in that each stop assembly 315a, 315b is cut from and extends from the rear plate 330 of the frame 312 after mechanical force is used to bend the cut piece so that it ultimate resides in a plane that stands generally at an angle of about 90 degrees with respect to a plane in which the rear plate resides. As with previous embodiments, the frame 312 may include one or more exhaust openings 322 or decorative apertures 324a, 324b, 324c, 324d, 324e, as desired.

This frame 312 is also equipped with a flexible flap 347, which can be used with any of the frames disclosed herein. The flexible flap is designed to cover an access opening 323 which can generally prevent rocks, debris and mud from flying through the access opening when the wheels of the vehicle cause them to fly up from underneath the vehicle and potentially come through any of the access openings 323. It will be appreciated that the access openings 323 can be many shapes and sizes. It will also be appreciated that the flap 347 may be made of any flexible materials available in the marketplace and also, in alternate embodiments, of materials that are not especially flexible, but that can be secured to the front of the frame proximate one access opening 323 by a hinge or a plurality of hinges and then hinged so that it can cover the access opening 323 and yet allow access to a hand H of a user, in a manner that is similar to that shown in FIG. 14A. In preferred embodiments, the flap 347 will be of flexible material and it will be secured to the front of the frame 312 by a strip of adhesive material 348, preferably a strip of double backed industrial grade mounting tape or the like, so that the flap 347 will cover one access opening 323 and generally prevent rocks, debris and mud from flying through the access opening to damage or impact upon the trailer or other apparatus hauled by the vehicle. In alternate embodiment the flexible flap 347 can also be secured to the front of the frame by glue, double backed adhesive tabs, screws, snaps, corresponding components of hook and loop fasteners that have an adhesive backings and the like.

Now also referring to FIGS. 15A-15E, which collectively illustrate yet another preferred mud flap assembly 410. The mud flap assembly 410 includes a frame 412 that generally spans a bumper B of a vehicle V (see also, frame 12 shown in FIG. 3A). The frame 412 includes two access openings 423a, 423b to provide access to hitch wiring, safety chain and hitch receiver (not shown). The frame 412 preferably includes a rear plate 430 and a top plate 440. In preferred embodiments, the rear plate 430 preferably is at an angle (a") of approximately 90 degrees with respect to the top plate 440. The top plate 440 includes two support flanges 442a, 442b that are secured to apertures 441 the frame 412 with bolts 445a, flat washers 445b, lock washers 445c, and nuts 445d. The support flanges 442a, 442b are preferably arranged and configured to sit upon the step S of the bumper B (see also, FIG. 3A). By having the support flanges 442a, 442b sit upon the bumper when operatively installed, two additional contact points are established between the mud flap assembly 410 and the vehicle, which stabilize the mud flap assembly 410 with respect to the vehicle V when the frame is secured to the vehicle.

As with previous embodiments, at first and second ends 414a, 414b of the frame 412, proximate the tires of the vehicle V (not shown), flap panels 450a, 450b are secured to and extend downwardly from the frame 412. Preferably, the flap panels 450a, 450b are secured to the frame 412 with nuts 452a, bolts 452b and washers 452c or the like.

The mud flap assembly 410 further includes at least one stop assembly 415a, 415b proximate each end 414a, 414b of the frame 412. Each stop assembly 415a, 415b preferably includes a stop 416a, 416b connected to a cap 417a, 417b. Each stop assembly 415a, 415b is arranged and configured to provide another contact point between the mud flap assembly 410 and the bumper B of the vehicle V (see also, FIG. 3A and related disclosure, for example). In preferred embodiments, each stop assembly 415a, 415b is arranged and configured such that when the cap 417a, 417b contacts the bumper B, the hitch tongue apertures and hitch receiver apertures are aligned for insertion of a pin (see also FIGS. 3B and 4 illustrating hitch tongue aperture 74 and hitch receiver aperture 78 and related disclosure). Such a configuration provides faster and easier installation of the mud flap assembly 410.

As with previous embodiments, the mud flap assembly 410 is adjustable such that the mud flap assembly 410 can accommodate many types of vehicles and hitch configurations. The frame 412 includes a generally U-shaped hitch opening 418, and four slots 420 proximate the hitch opening 418. A securing assembly 484 is preferably used to secure the shaft or hitch tongue 72 to the frame 412 (see also, for example, FIGS. 3B and 4 illustrating hitch tongue 72, the securing assembly 84 and related disclosure). The preferred securing assembly 484 includes two clamp halves 486a, 486b interconnected with long carriage bolts 488a, nuts 488b and washers 488c to form a central clamp opening 490 for receiving a hitch tongue. Each clamp half 486a, 486b preferably includes at least one support flange 496a, 496b to contact and support the hitch tongue and provides support for the long carriage bolts 488a (see also, FIG. 2C and related disclosure). The clamp halves 486a, 486b are preferably secured to the frame 412 with short carriage bolts 494a located within the frame slots 420 with nuts 494b, flat washers 494c and lock washers 494d. The short carriage bolts 494a can be secured within apertures in the clamp halves 486a, 486b (see also, apertures 87, FIGS. 1, 2A-2D and related disclosure). It will be appreciated that the securing assemblies 84, 284, 484, 584 may be assembled and secured to the frame of the preferred mud flap assembly on either side, front or back, even though it is preferred to assemble the respective securing assembly on the front side as shown in the respective drawing figures.

The frame 412 also preferably comprises at least one exhaust opening 422 that is aligned with a corresponding aperture 454a in the respective flap panel 450b. The flap panel 450b proximate the exhaust pipe may include one or more outlines 454b for a user to trace and cut additional exhaust openings in the flap panel 450b, if desired. Each outline 454b may be formed by a marking, scored edge or the like. The one or more exhaust openings 422 in the frame 412 and respective flap panel 450b preferably aligned proximate the vehicle exhaust pipe (see also, FIG. 11) so that the mud flap assembly 410 ventilates hot exhaust away from the vehicle.

In preferred embodiments, the frame 412 further includes a bent lip 426a, 426b at first and second ends 414a, 414b proximate the respective flap panels 450a, 450b such that the flap panels 450a, 450b can flex upwardly. The bent lip 426a, 426*b* will also help the frames to resist forces that tend to make the frame 412 bend along the frame's length.

Figure 15A:
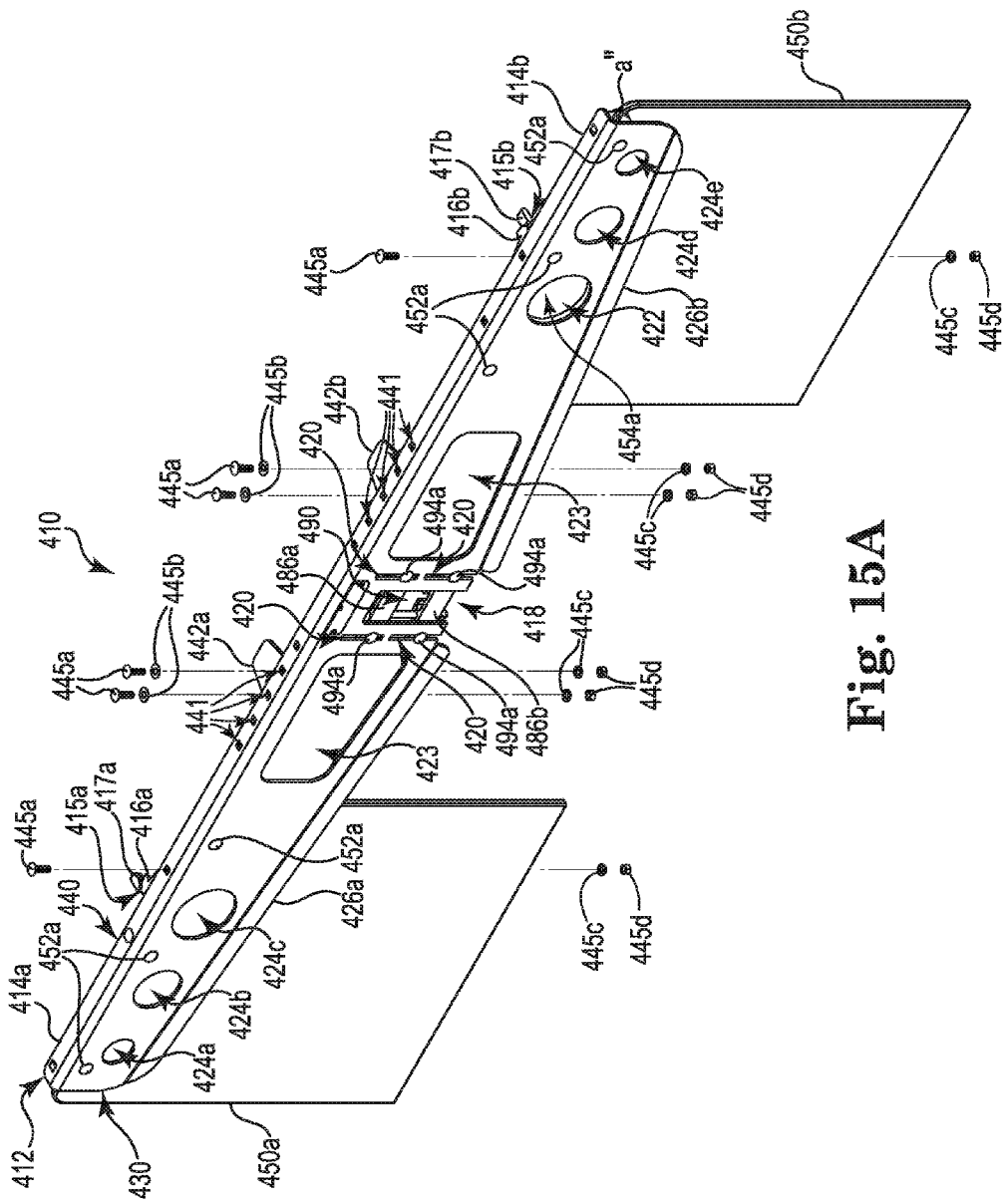
FIG. 15A is a rear perspective view of a further alternate mud flap assembly 410 including a universal frame 412 having a generally U-shaped hitch opening 418 and showing fastener elements 445a, 445b, 445c, 445d, for securing support flange elements 442a, 442b and adjustable stop assemblies 415a, 415b, in exploded view.
Figure 15B:
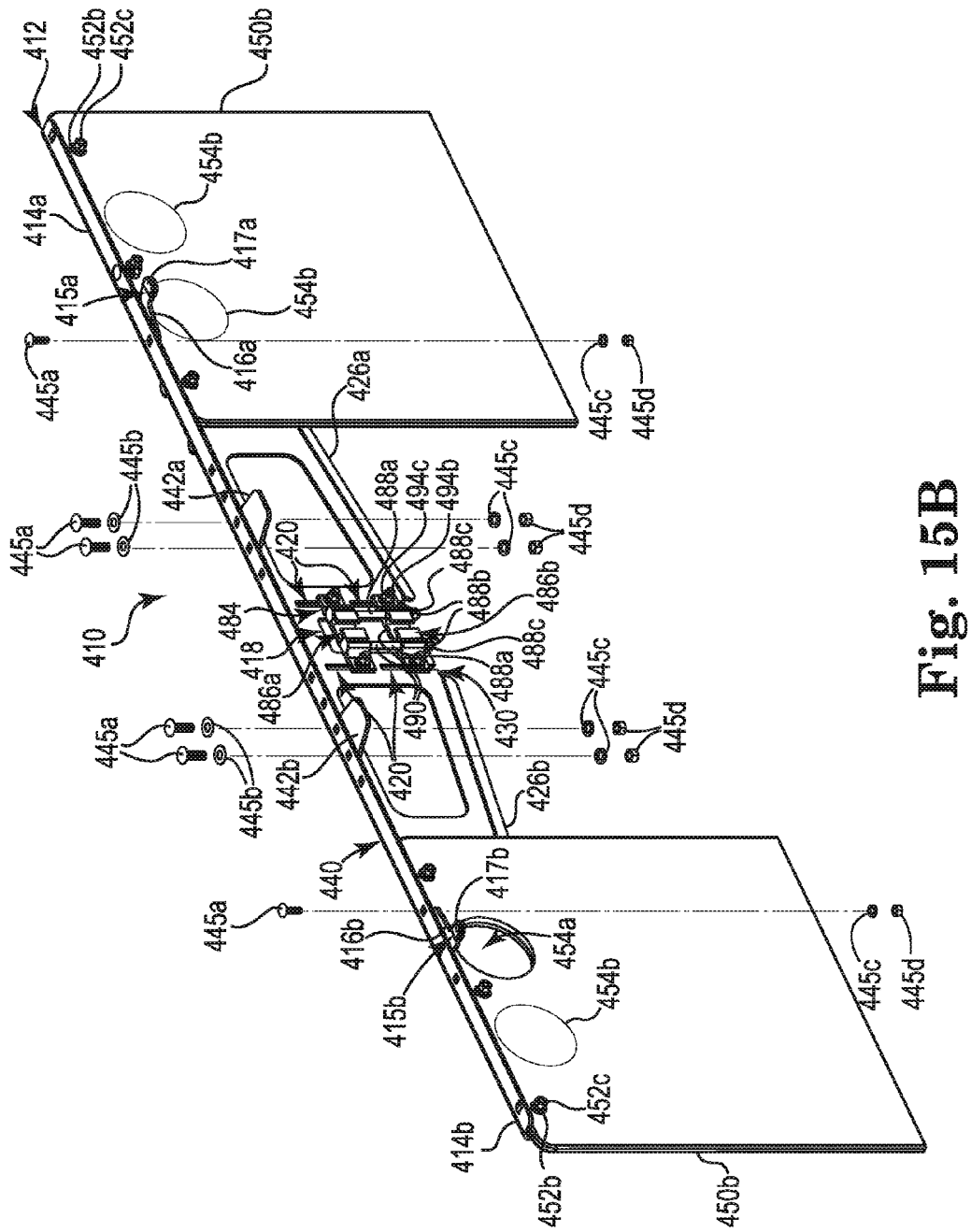
FIG. 15B is a front perspective view of the mud flap assembly 410 of FIG. 15A showing fastener elements 445a, 445b, 445c, 445d, for securing support flange elements 442a, 442b and adjustable stop assemblies 415a, 415b, in exploded view.
Figure 15D:
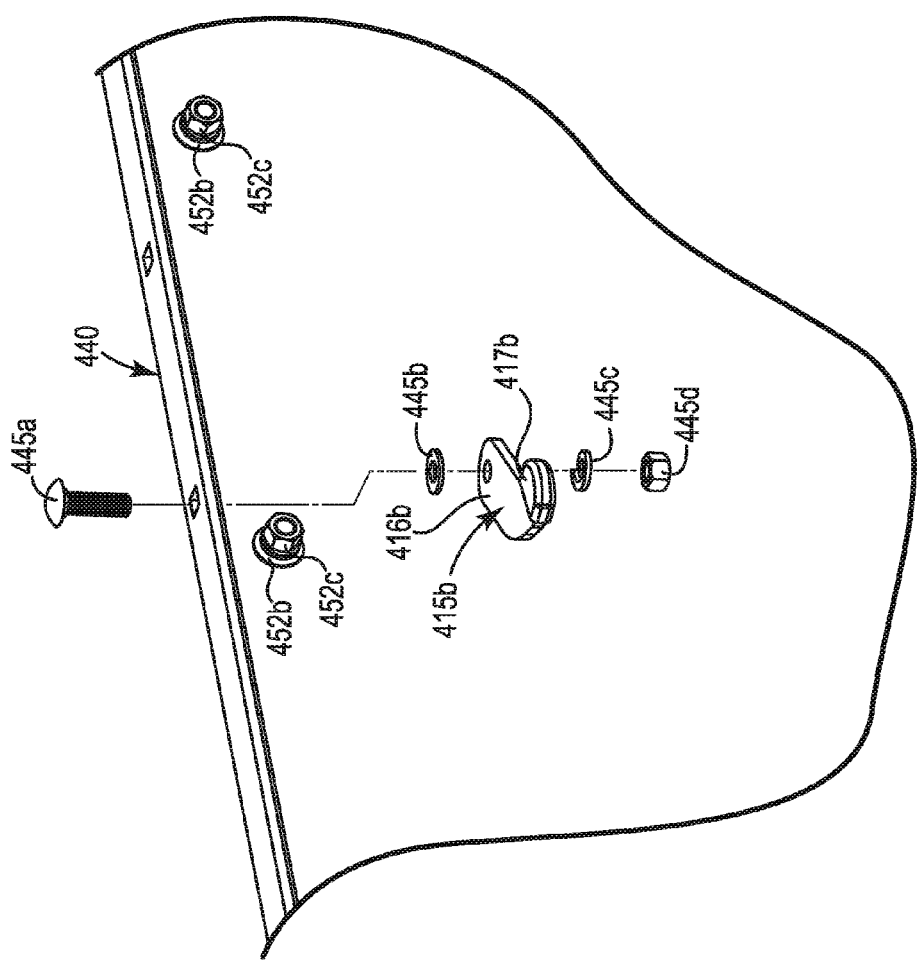
FIG. 15D is an enlarged, partial front perspective view of the mud flap assembly 410 of FIG. 15B, but only showing one of the adjustable stop assemblies 415b detached from fastener elements 452a, 452b, 452c and the top plate 440 in an exploded view.
Figure 15E:
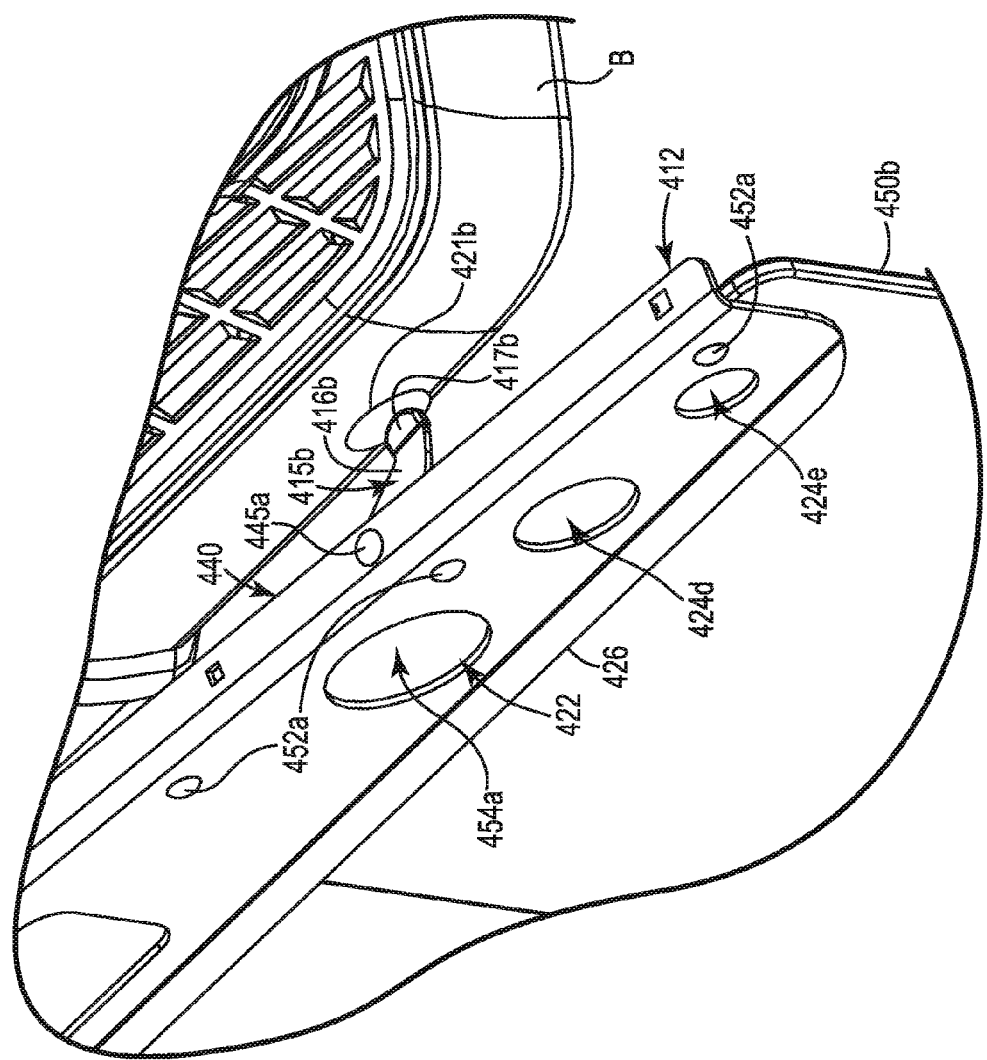
FIG. 15E is an enlarged, partial rear perspective view of a portion of the alternate mud flap assembly 410 of FIG. 15A, showing the adjustable stop assembly 415b secured to the top plate 440 by bolt 445a and its complementary fastening elements (not shown); wherein the bumper cap 417b is pressed up against a protective piece 421b and the bumper B, when the mud flap assembly is secured to the vehicle (not shown) in order to give the mud flap assembly 410 a further point of contact with the vehicle.

Referring now specifically to FIGS. 15D and 15E, the frame 412 is preferably equipped with a pair of adjustable stop assemblies 415*a*, 415*b* that are secured to the frame 412 by fasteners of any kind known in the art, preferably by bolts 445*a* and nuts 445*d* that sandwich the frame 412 and a plurality of washers 445*b*, 445*c* around the adjustable stop 416*a*, 416*b*. When the stop assembly 415*a*, 415*b* is secured to the frame 412 by the nut 445*d* and the bolt 445*a*, the stop 416*a*, 416*b* can pivot to some degree about the bolt 445*a*. As such, the user can adjust the stop assembly by turning the stop 416*a*, 416*b* about the bolt 445*a*, thereby pressing it against the rear R of the bumper B to create a more forceful engagement of the bumper B by the stop assembly 415*a*, 415*b*, thereby increasingly stabilizing the frame against the bumper B. The additional points of contact between the frame and the bumper, provided by the stops or the stop assemblies, help to stabilize the frame of the respective mud flap assemblies with respect to the vehicle so as to minimize the degree to which the frames vibrate and move independently of the vehicle.

In preferred embodiments, when the frame 12, 112, 212, 312, 412, 512, 612, 712, 812, 1012 is secured to the vehicle V, the shaft 72 of the hitch assembly 70 can be secured to the hitch receiver 76 when the securing assembly 84, 284, 484, 584 is loosely attached to the frame 12, 112, 212, 312, 412, 512, 612, 712, 812, 1012 and the frame 512 via the mounting plate 519 when the mounting plate 519 is attached to the frame 512, as shown in FIGS. 16A-16D, but not tightly secured. As such, the shaft 72 will be threaded through one of the respective hitch openings 18, 118, 218, 318, 418, 518*a*, 618, 718, 818, 1018 and the fully assembled, but loosely secured securing assembly 84, 284, 484, 584, 1084. Alternatively, the respective securing assembly 84, 284, 484, 584, 1084 can be fully assembled and loosely secured and engaged with the respective frame 12, 112, 212, 312, 412, 612, 712, 812, 1012 or the respective frame 512 by attachment to the mounting plate 519, in the embodiment shown in FIGS. 16A-D, where mounting plate 519 is secured to frame 512, so that the nuts 88*b*, 288, 488*b*, 588*b* that are engaged with the long carriage bolts 88*a*, 288*a*, 488*a*, 588*a* that pass through the respective long carriage bolt receiving channels 89 of the respective clamp halves 86*a*, 86*b*, 286*a*, 286*b*, 486*a*, 486*b*, 586*a*, 586*b* will be fully engaged to create a central clamp opening 90, 290, 490, 590, but will not be tightened down, so to speak, and the short carriage bolts 94*a*, 294*a*, 494*a*, 594*a* will also be loosely engaged with respective washers 94*c*, 294*c*, 494*c*, 594*c* and nuts 94*b*, 294*b*, 494*b*, 594*b* so that the shaft 72, which is positioned within the hitch opening 18, 118, 218, 318, 418, 518*a*, 618, 718, 818, 1018 and within the central clamp opening 90, 290, 490, 590 between the respective clamp halves 86*a*, 86*b*, 286*a*, 286*b*, 486*a*, 486*b*, 586*a*, 586*b* will be able to move back and forth within the hitch opening and the central clamp opening between the respective clamp halves. This will allow the frame to be tightly secured against the bumper B, because the frame can be pressed hard against the bumper B, when the shaft 72 is positioned in this way between the respective clamp halves so that the support flange(s) and the stops or stop assemblies are in contact with the bumper and the frame is in tension against the bumper B when the nuts 88*b*, 288, 488*b*, 588*b* are turned in order to tighten them to the long carriage bolts 88*a*, 288*a*, 488*a*, 588*a* that pass through the respective clamp halves 86*a*, 86*b*, 286*a*, 286*b*, 486*a*, 486*b*, 586*a*, 586*b*. When the nuts are turned in this way, the clamp halves will tightened down against the shaft 72, so that the shaft 72 is fully secured to the frame in a position in which the frame is in tension with the bumper B, so much so that the respective frame forces the stops or stop assemblies against the bumper B so that the stops or stop assemblies will be biased against the bumper with a constant force to keep the stops or stop assemblies engaged against the bumper B so as to stabilize the frame at the respective points of contact between the frame and the bumper B, which is believed to minimize the degree to which the respective frame vibrates and moves independently of the vehicle V. Each of the nuts on the long carriage bolts are then torqued to 32 ft. lbs. to even the tightness on associated with each of the long carriage bolt fasteners.

After the nuts 94*b*, 294*b*, 494*b*, 594*b* are tightened against the lower of the two clamp halves 86*b*, 286*b*, 486*b*, 586*b* to tightly secure the shaft or hitch tongue 72 within the central clamp halve opening 90, 290, 490, 590, downward force can be placed on respective the respective frame 12, 112, 212, 312, 412, 512, 612, 712, 812 and/or the respective support flanges 42, 142, 242, 342, 442, 542, 642, 742, 842 so that the support flanges are in contact with and engaged with the bumper B, because the nuts 94*b*, 294*b*, 494*b*, 94*b* on the short carriage bolts 94*a*, 294*a*, 494*a*, 594*a* are still loosely secured in order to allow the short carriage bolts 94*a*, 294*a*, 494*a*, 594*a* to slide up and down within the respective slots 20, 120, 220, 320, 420, 520, 620, 720, 820 to enable the securing assembly 84, 284, 484, 584 to adjust its vertical orientation to the respective frame or mounting plate in a position that allows the support flanges 42, 142, 242, 342, 442, 542, 642, 742, 842 to be in contact and engaged with the bumper B. The nuts 94*b*, 294*b*, 494*b*, 594*b* are then turned around the short carriage bolts 94*a*, 294*a*, 494*a*, 594*a* to tighten the respective clamp halves 86*a*, 86*b*, 286*a*, 286*b*, 486*a*, 486*b*, 586*a*, 586*b* to the respective frame 12, 112, 212, 312, 412, 612, 712, 812, 1012 or the respective mounting plate 519 (in the embodiment shown in FIGS. 16A-D, where mounting plate 519 is secured to frame 512). Each of the nuts on the short carriage bolts are then torqued to 32 ft. lbs. to even the tightness associated with each of the short bolt fasteners. The respective mud flap assemblies are then fully secured the vehicle so that the respective mud flap assemblies are in a slight tension both with the rear of the bumper B and with the top of the bumper B to stabilize the respective frame at a plurality of contact points where the respective mud flap assembly is in contact with the vehicle V.

Now also referring to FIGS. 16A-16D, which collectively illustrate a further preferred mud flap assembly 510, which is largely similar to those mud flap assemblies 10, 110, 210, 410, 1010, 1110, 1210 disclosed herein; the mud flap assembly 510 includes a universal frame 512 similar to the universal frame 412 shown in FIGS. 15A-15C, each of which generally span a bumper B of a vehicle V (not shown) in the manner shown in FIGS. 3A-6 (see for example, FIG. 3A). The universal frame 512 preferably includes a rear plate 530 and a top plate 540.

The universal frame 512 preferably includes an enlarged opening 518 and a mounting plate 519 that has four slots 520 for securing the securing assembly 584. The slots 520 are proximate a hitch opening 518*a* in the mounting plate 519 through which a hitch tongue or a shaft 72 of a hitch assembly 70, similar to that shown in FIG. 1, can be received (see also, FIG. 2D and related disclosure) and secured by the securing assembly 584. The mounting plate 519 can be fastened to the frame 512 with fasteners such as bolts 521*a* and corresponding nuts 521*b* and washers 521*c* inserted through apertures 528 in the mounting plate 519 and apertures 523 in the frame 512. As such, the mounting plate 519 functions as a part of the frame 512, providing the slots 520 adjacent to the hitch opening 518*a*, where a securing assembly 584 similar to that shown in FIGS. 2C and 2D, can be secured. It will be appreciated that the enlarged opening 518 will give the frame 512 additional versatility to accommodate a variety of different hitch assemblies, by accepting a specialized mounting plate designed to accommodation special aspects of the hitch assembly that may not be compatible with hitch openings in the other frames disclosed herein.

As with prior embodiments, the securing assembly 584 (FIG. 16B, 16D) can be used to secure a hitch tongue assembly (not shown) to the frame 512 in a manner similar to that discussed above and shown in FIGS. 1, 2B-2D. As in the previous disclosed embodiments, the preferred securing assemblies 584 include two clamp halves 586a, 586b interconnected with long carriage bolts 588a, nuts 588b and washers 588c that can be secured to clamp a hitch tongue (not shown) of a hitch assembly (not shown) within the plate opening 590 of the mounting plate 519 to secure the hitch assembly (not shown) to the frame 512 when the mounting plate 519 is secured to the frame 512. Each clamp half 586a, 586b preferably includes at least once support flange 592a, 592b to contact the hitch tongue (not shown). The clamp halves 586a, 586b are secured to the mounting plate 519 with short carriage bolts 594a located within the slots 520. The short carriage bolts 594a can be secured within apertures 587 in the clamp halves 586a, 586b (see also, for example, FIGS. 1, 2A-2D) with nuts 594b, flat washers 594c and lock washers 594d.

The frame 512 can also include at least one exhaust opening 522 that is aligned with a corresponding aperture 554a in the respective flap panel 550b. Each flap panel 550a, 550b may include one or more outlines 554b for a user to trace and cut additional exhaust openings in the flap panels 550a, 550b, if desired. In alternate embodiments, the outlines can be scored, perforated or the like, to make it easier for the user to remove the outlined material to make a suitable aperture to correspond with an exhaust opening 522 in the frame 512. The at least one exhaust opening 522 in the frame 512 and respective flap panel 550b is preferably generally aligned proximate the vehicle exhaust pipe P so that the mud flap assembly 510 ventilates hot exhaust away from the vehicle V. The frame 512 may also include decorative apertures 524a, 524b, 524c, 524d, and 524e as desired that compliment the decorative aspects of the exhaust opening 522. For some vehicle models, a second exhaust opening (not shown) can be preferably provided, preferably opposite the first exhaust opening 522. The exhaust opening can have any shape, but the decorative shape of a circle is preferred in order to provide continuity with the decorative shape of the proximate decorative apertures 524a, 524b, 524c, 524d, and 524e in the frame 512.

At first and second ends 514a, 514b of the frame 512, proximate the tires (not shown) of the vehicle V (not shown); the flap panels 550a, 550b are secured to and extend downwardly from the frame 512. The flap panels 550a, 550b generally block any dirt, debris or rocks kicked-up by the tires from damaging the trailer and apparatus (not shown) being towed by the vehicle via the hitch assembly (see also, hitch assembly 70 and related disclosure). As with previous embodiments, flap panels 550a, 550b are preferably made of flexible material such as masticated rubber or the like. Preferably, the flap panels 550a, 550b are secured to the frame 512 with nuts 552a, bolts 552b and washers 552c.

The frame 512 also includes a top plate 540 including one or more apertures 541 for the optional securing of a support flange piece or pieces (not shown), similar to the support flange piece 242a, 242b shown in FIGS. 12, 13A, 13B, or the support flange pieces 442a, 442b, shown in FIGS. 15A-15C to sit upon a step S of a bumper B of a vehicle (not shown) similar to that shown in FIGS. 3A-6. For example, see apertures 541 in FIG. 16D, as well as corresponding apertures 241 and support flanges 242a, 242b shown in FIG. 13A and the related disclosure. Also note the corresponding disclosure of support flanges 442a, 442b secured to the universal frame 412 by bolts 445a that pass through apertures 441, as shown in FIG. 15A-15C, and as noted in the related disclosure.

The universal frame 512 can also have stops (not shown) that are provided by stop assemblies (not shown) of the type that can be secured to the top plate 540, through apertures 541 in the manner in which stop assemblies 415a, 415b are secured to the universal frame 412 as shown in FIGS. 15A-15E.

FIG. 17 illustrates an alternative multi-piece frame 612 that can be used to provide a mud flap assembly (not shown) largely similar to the mud flap assemblies 10, 110, 210, 410, 510, 1010, 1110, 1210 disclosed herein by attaching a pair of flap panels (not shown) in a manner corresponding to the manner disclosed above for similar mud flap assemblies. The multi-piece frame 612 allows the manufacturer great flexibility in shipping and auto body repair shops greater repair flexibility when repairing such a multi-piece frame 612 if one of the pieces is damaged and requires repair. Three separate pieces 613a, 613b, 613c are secured together by fasteners of any kind known in the art, preferably by bolts 629.

The frame 612 is preferably sized to generally span the bumper B of a vehicle V (not shown) in a manner similar to that of other embodiments disclosed herein (see for example, FIG. 3). The frame 612 includes a center portion 613a preferably secured to two side portions 613b, 613c with bolts 629 or other fasteners that are well known in the art. As it will be understood, the center portion 613a can be connected to the side portions 613, 613c in many ways including welding, other mechanical fastening and the like. The center portion 613a includes two access openings 623a, 623b to provide access to hitch wiring, safety chain and hitch receiver (not shown). The two side portions 613b, 613c can also include access openings 623c, 623d, which further provide access to hitch wiring, safety chain and hitch receiver (not shown). Each portion further includes a rear plate 630a, 630b, 630c and a top plate 640a, 640b, 640c. The top plate 640a preferably includes a support flange 642 that can sit upon a step S of a bumper B of a vehicle as described and illustrated with previously discussed embodiments. The frame 612 preferably further includes a hitch aperture 618 and a plurality of slots 620 for securing a securing assembly (not shown) to the frame 612, such as the securing assembly 84 disclosed in FIGS. 2C-2D and the related disclosure, for example. Moreover, the frame 612 may include one or more exhaust openings 622 and decorative apertures 624a, 624b, 624c, 624d, 624e similar to previously discussed frame embodiments, each of which provide ornamental elements to the frame 612 and are designed to be circular in shape to provide a consistent ornamental appearance to the rear plates 630b, 630c of the multi-piece frame 612. The multi-piece frame 612 preferably has first and second ends 614a, 614b. In preferred embodiments, the multi-piece frame 612 further includes bent lips 626a, 626b proximate the bottom of the rear plates 630b, 630c of the respective side portions 613b, 613c, such that flap panels secured to the frame can easily flex upwardly during use and also provide greater strength to the respective rear plates 630a, 630b to resist horizontal deformation.

FIGS. 18A-18E illustrate a further alternate multi-piece frame 712 that is expandable to enable the user to adjust the length of the frame 712, so that the adjustable multi-piece frame 712 can be used to form mud flap assemblies having all of the elements of the universal mud flap assemblies shown in FIGS. 12-16D. It will be appreciated that the multi-piece frame 712 is adjustable so that its length L, from one end 714a of the multi-piece frame to the other end 714b of the multi-piece frame 712, is adjustable so that a further embodiment of the present mud flap assembly that utilizes this multi-piece frame 712 will be adjustable in length so as to accommodate vehicles (not shown) having either a wider than normal body or a narrower than normal body. The multi-piece frame 712 is most similar to the universal frames 212, 412 and 512 disclosed in FIGS. 12-13B, 15E-15E and 16A-16D, respectively. The multi-piece frame 712 can be adjusted to five different lengths (L1, L2, L3, L4 and L5) generally depicted in FIGS. 18A, 18B, 18C, 18d and 18E, respectively. The multi-piece frame 712 has three main parts, a center portion 713a and two side portions 713b, 713c that are secured together in relation to one another in a series of different configurations, as both shown and discussed, by a plurality of fasteners 729a that pass through corresponding apertures (not shown, see FIG. 19) in the respective top plates 740a, 740b and 740c of the respective center and side portions 713a, 713b, 713c, respectively, so that at least one fastener 729a passes through each of two apertures (not shown, see FIG. 19) at opposite ends of the top plate 740a of the center portion 713a and each of the respective top plates 740b, 740c of the respective side portions 713b, 713c, to secure the respective center and side portions 713a, 713b, 713c together in each of the five possible configurations. The center portion 713a and two side portions 713b, 713c of the multi-piece frame 712 are also secured together in relation to one another this series of different configurations, by a plurality of fasteners 729b that pass through corresponding apertures (not shown, see FIG. 19) in the respective rear plates 730a, 730b and 730c of the respective center and side portions 713a, 713b, 713c, respectively, so that at least one fastener 729b passes through an aperture (not shown, see FIG. 19) in the rear plate 730a of the center portion 713a and each of the respective top plates 740b, 740c of the respective side portions 713b, 713c, to secure the respective center and side portions 713a, 713b, 713c together in each of the five possible configurations. It will be appreciated that any number of configurations, yielding alternate multi-piece frames having any number of alternate lengths are possible.

Figure 19:
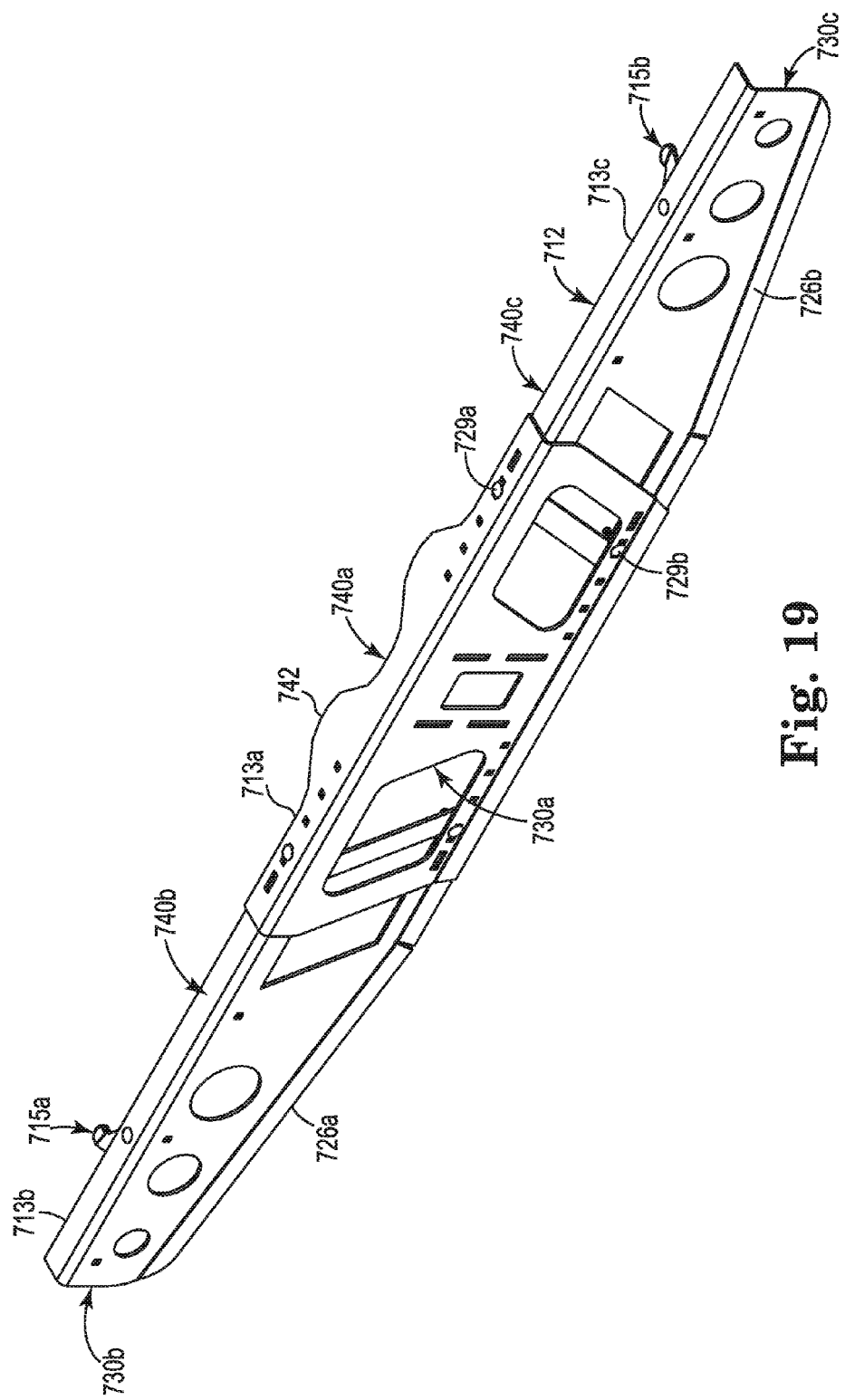
FIG. 19 is a rear perspective view of the alternate multi-piece expandable frame 712 as it is shown in FIG. 18D.
Figure 20:
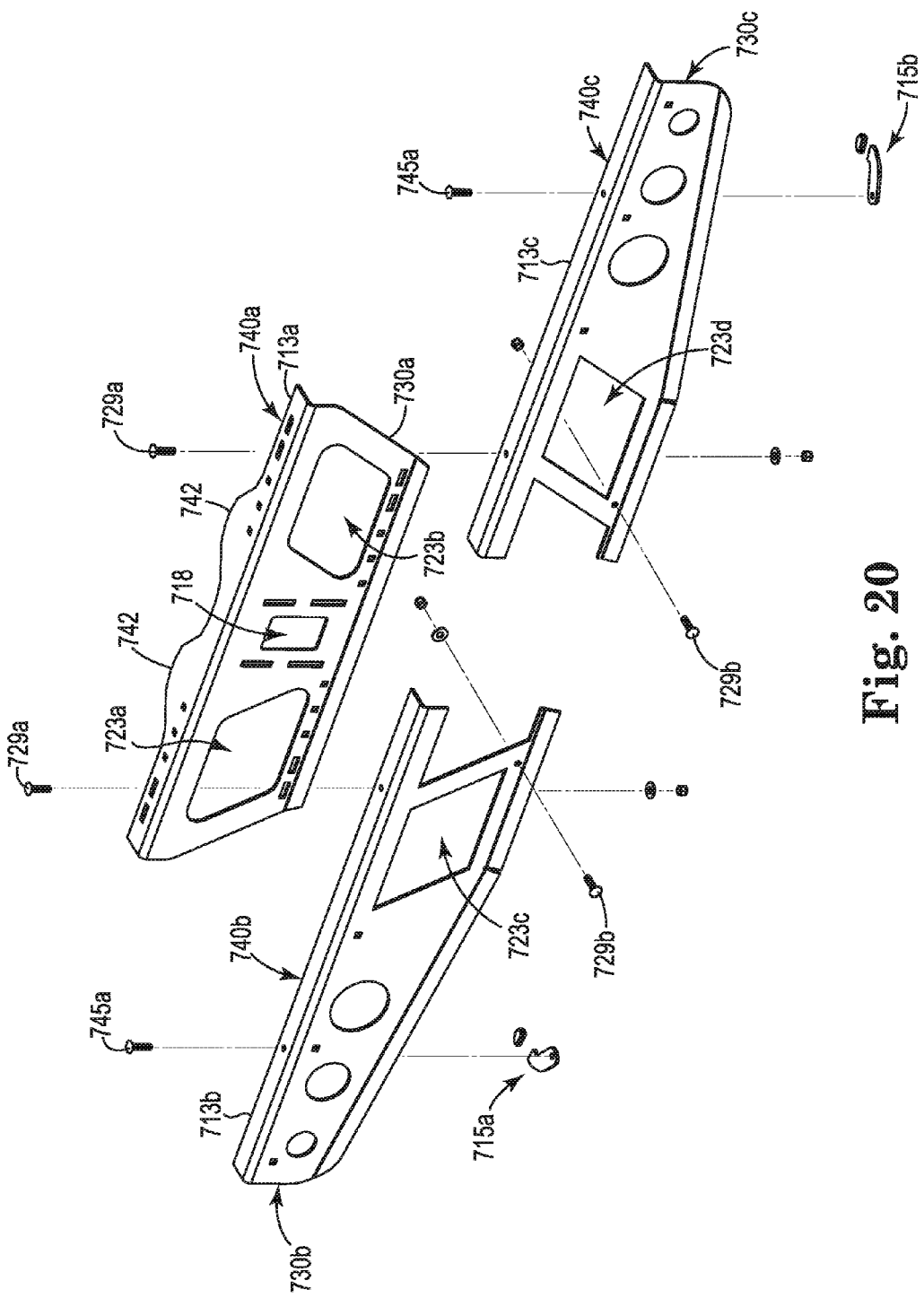
FIG. 20 is an exploded, rear perspective view of the alternate multi-piece frame 712 shown in FIG. 19; but showing all of the respective parts separated from one another, with the exception of the nuts and washers (not shown; see in FIG. 15D) for the bolts 745a that are needed to secure the respective stop assemblies 715a, 715b to the respective side portions 713b, 713c of the multi-piece frame 712.
Figure 21:
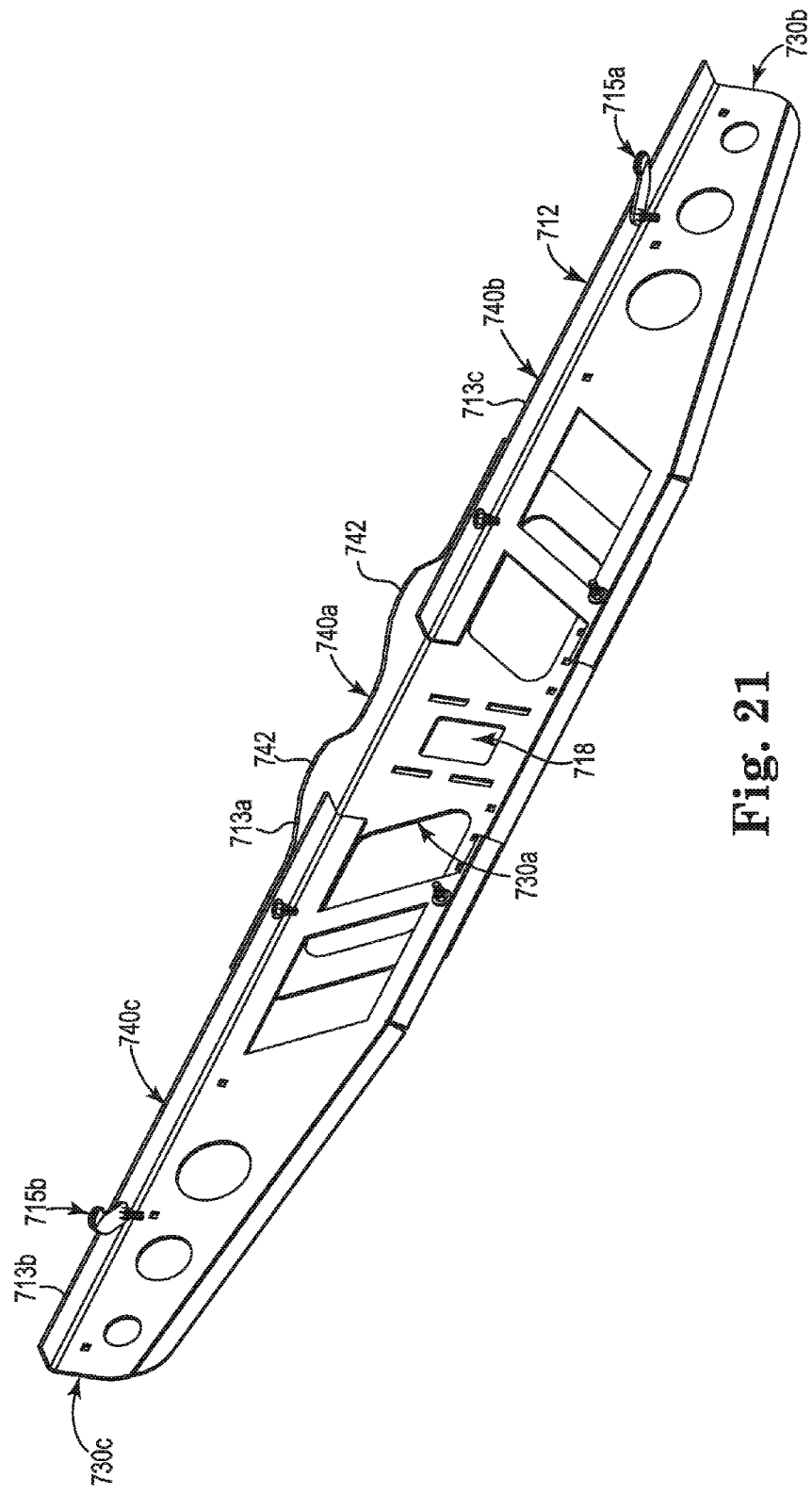
FIG. 21 is a front perspective view of the alternate multi-piece frame 712 shown in FIGS. 18D and 19, as seen from below and in front of the frame 712.

Referring now also to FIGS. 19, 20 and 21; as noted above, the multi-piece frame 712 has three main parts, a center portion 713a and two side portions 713b, 713c that can be secured together in relation to one another in a series of different configurations, as both shown and discussed. Fasteners 729a can pass through corresponding apertures 741a, 741b, 741c in the respective top plates 740a, 740b and 740c of the respective center and side portions 713a, 713b, 713c, respectively, so that each of two different fasteners 729a that secure the top plate 740a of the center portion 713a to each of the top plates 740b, 740c of the respective side portions 713b, 713c, passes through an aperture 741a in the top plate 740a of the center portion 713a and also through one of the apertures 741b, 741c in one of the respective top plates 740b, 740c of the respective side portions 713b, 713c, so that each of two different fasteners 729a secures one of the respective side portions 713b, 713c to the center portion 713a in each of the five possible configurations, each of which has a different length.

The center portion 713a and two side portions 613b, 613c of the multi-piece frame 712 can also be secured together in relation to one another in this series of different configurations, by a plurality of fasteners 729b that pass through corresponding apertures 743a, 743b, 743c in the respective rear plates 730a, 730b and 730c of the respective center and side portions 713a, 713b, 713c so that each of two different fasteners 729b that secure the rear plate 730a of the center portion 713a to each of the rear plates 730b, 730c of the respective side portions 713b, 713c, passes through an aperture 743a in the rear plate 740a of the center portion 713a and also through one of the apertures 743b, 743c in one of the respective rear plates 730b, 730c of the respective side portions 713b, 713c, so that each of two different fasteners 729b secures one of the respective side portions 713b, 713c to the center portion 713a in each of the five possible configurations, each of which has a different length.

Figure 22:
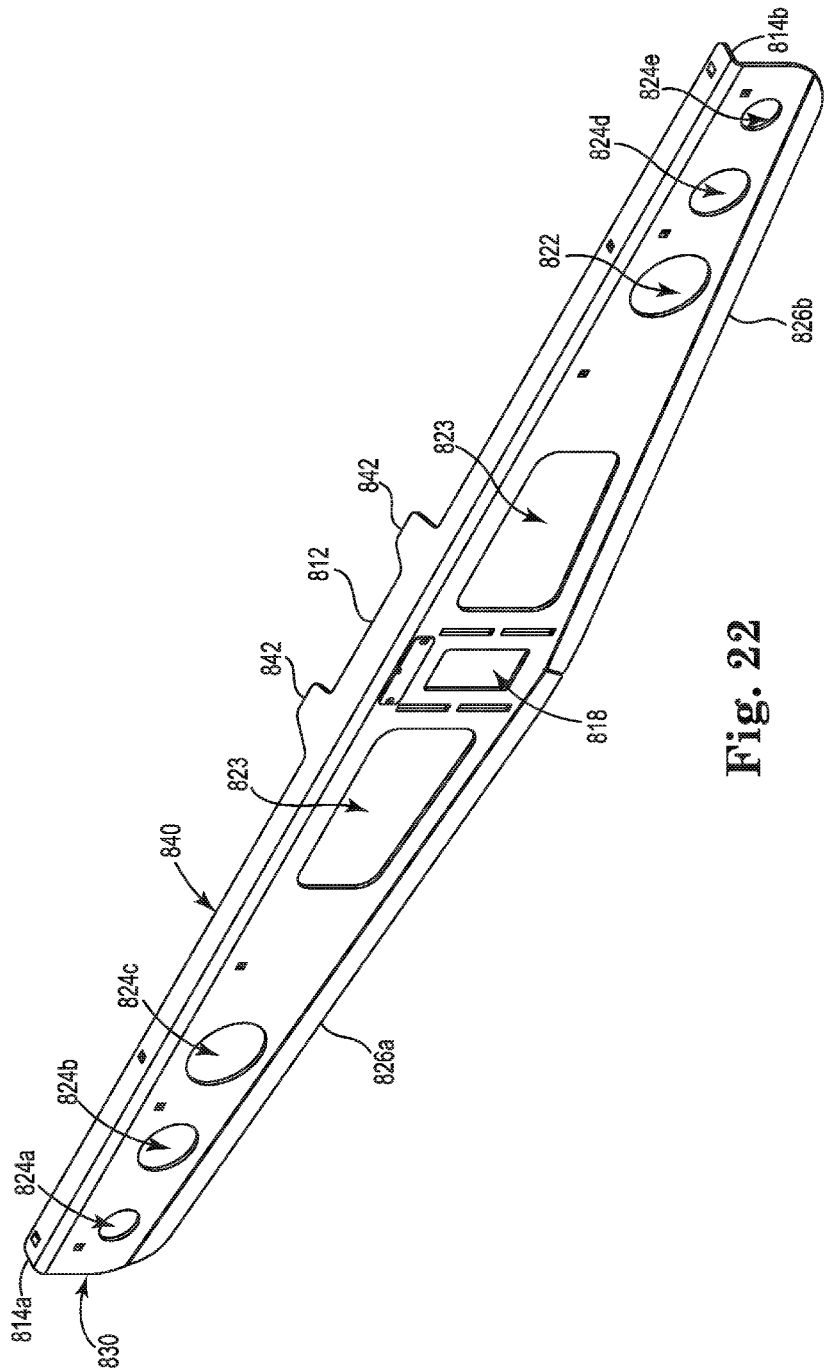
FIG. 22 is a rear perspective view of a further alternate frame 812.
Figure 23A:
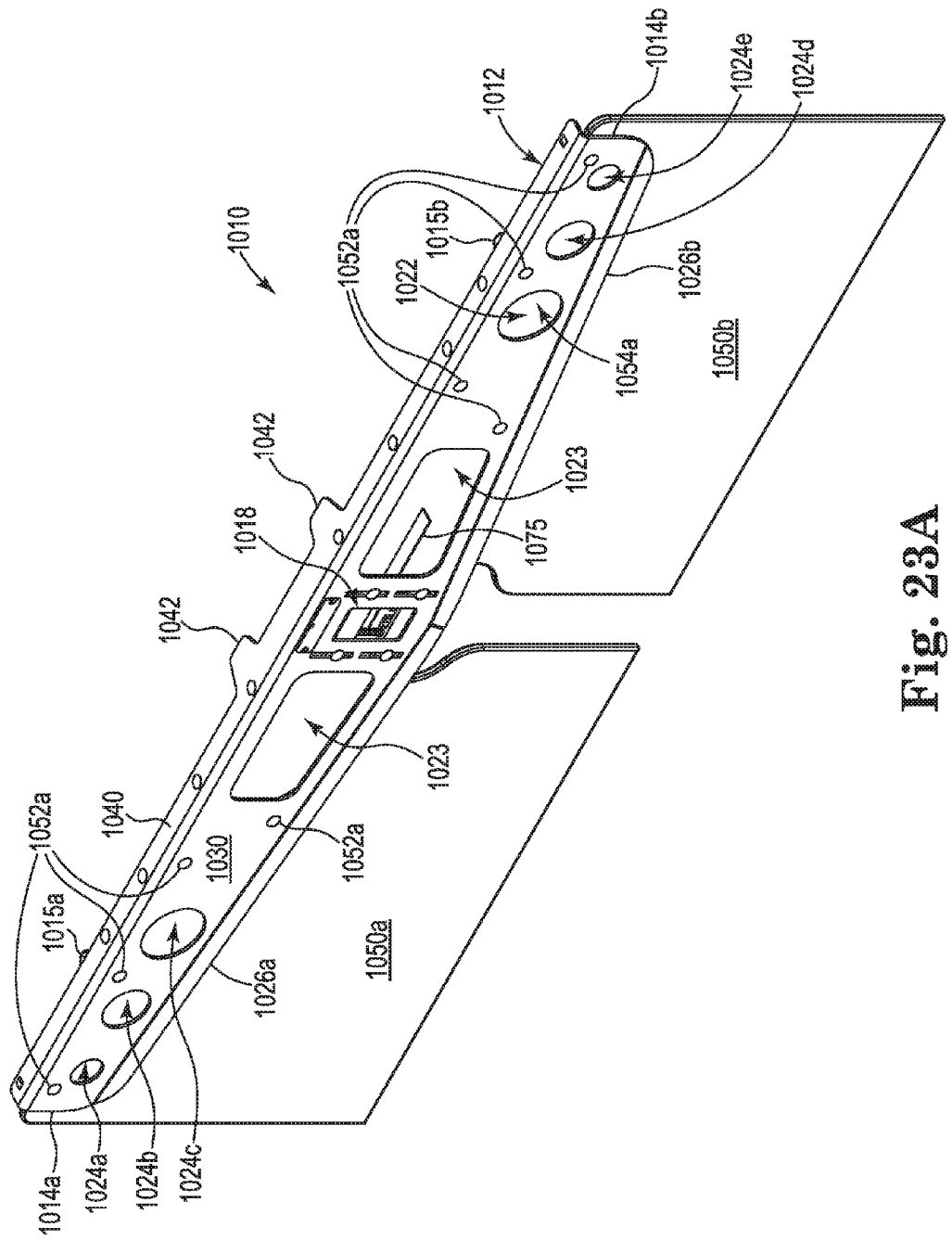
FIG. 23A is a rear perspective view of an alternate mud flap assembly 1010 including a frame 1012 similar to the frame 812 of FIG. 22, and having two enlarged flap panels 1050a, 1050b secured to and extending downwardly from the frame 1012, the mud flap assembly 1010 being securable to a vehicle (not shown) similar to the manner shown in FIGS. 3A, 4 and 5, and showing a protective strip 1075 that is exploded away from the frame 1012.
Figure 23B:
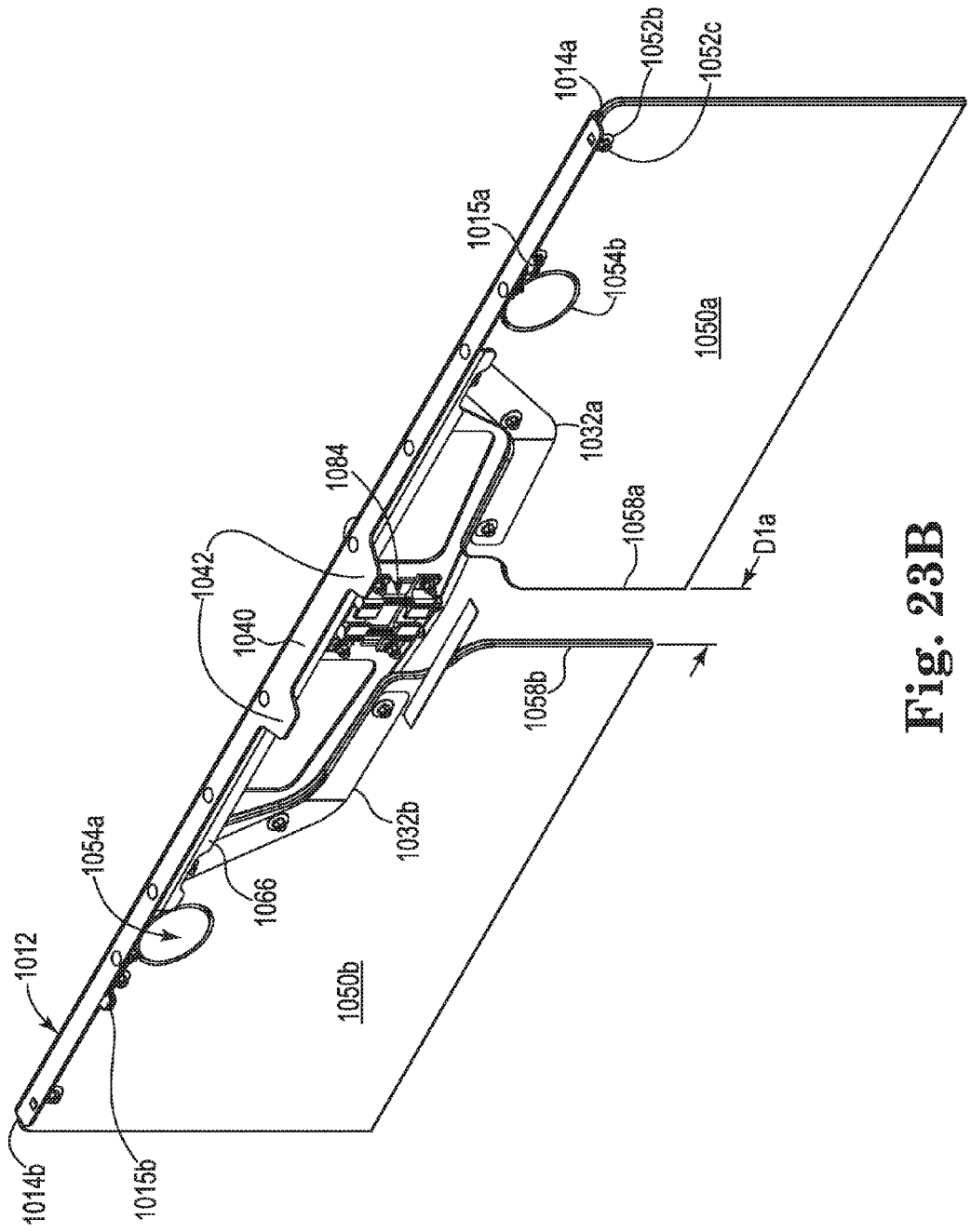
FIG. 23B is a front perspective view of the mud flap assembly 1010 of FIG. 23A, further showing a pair of inner mud flap support members 1032a, 1032b, and showing the protective strip 1075 that is exploded away from the frame 1012.
Figure 23C:
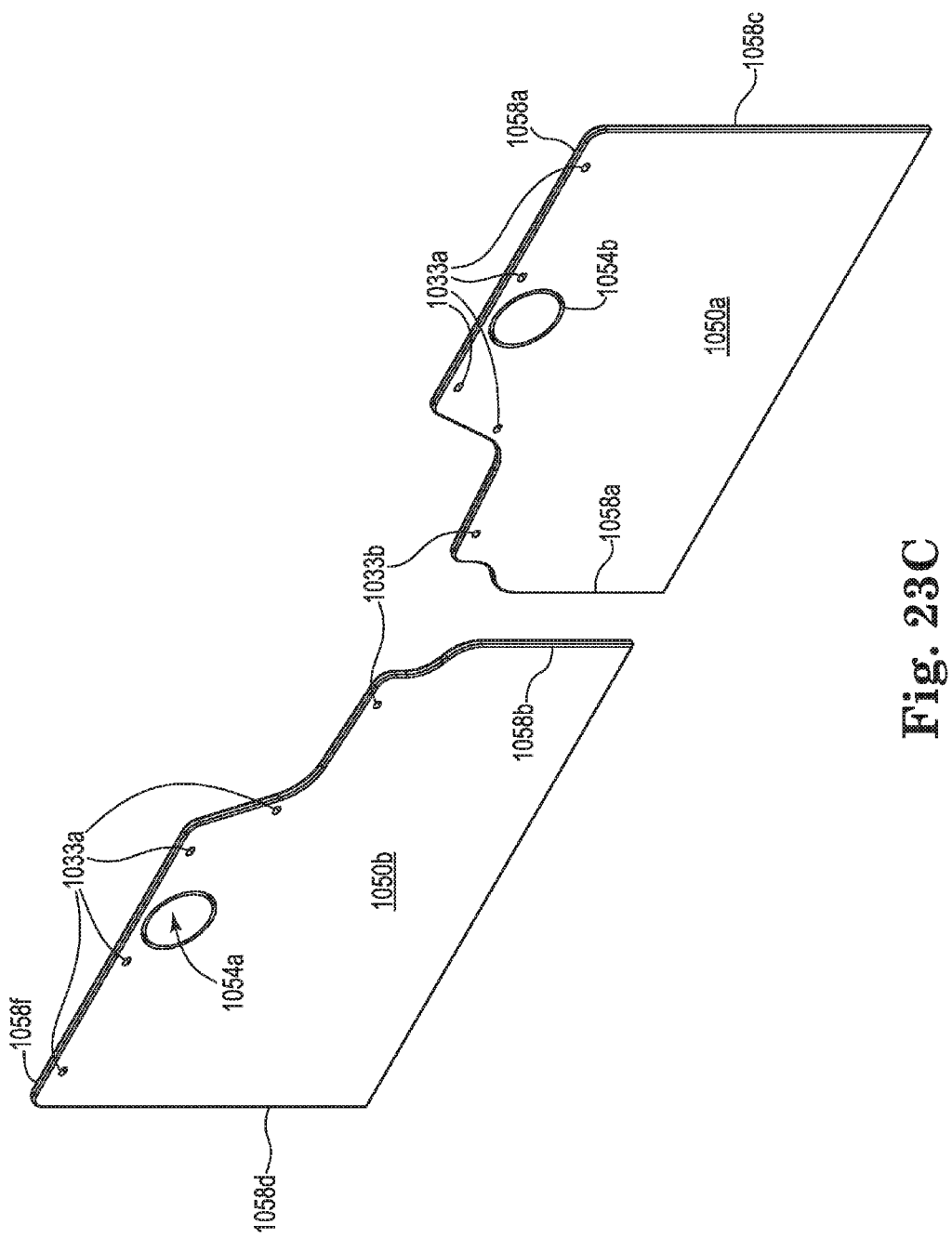
FIG. 23C is a front perspective view of the enlarged flap panels 1050a, 1050b of FIGS. 23A and 23B.

Referring now also to FIG. 22, various preferred embodiments can include a frame 812 having somewhat differently configured support flanges 842 and apertures on the top plate 840 that will accommodate the addition of adjustable stop assemblies 416a, 416b, as shown and described in relation to FIGS. 15D, 15E and flap panels 50a, 50b, 150a, 150b, 250a, 250b, 450a, 450b, 550a, 550b, 1050a, 1050b, 1150a, 1150b, 1250a, 1250b as shown in the Figures and described herein with respect to other mud flap assembly embodiments.

One preferred method of installing the mud flap assemblies 10, 210, 410, 510, 1010, 1110, 1210 includes first inserting the long carriage bolts 88a, 288a, 488a, 588a through the openings in respective clamp halves 86a, 86b, 286a, 286b, 486a, 486b, 586a, 586b. The long carriage bolts 88a, 288a, 488a, 588a are preferably secured to the clamp halves 86a, 86b, 286a, 286b, 486a, 486b, 586a, 586b with flat washers 88c, 288c, 488c, 588c, and preferably lock washers 245d in certain embodiments, and nuts 88b, 288b, 488b, 588b. Next, the flat surface formed by the securing assembly 84, 284, 484, 584, 1084 is aligned with the frame 12, 212, 412, 512, 1012 so the nuts 88b, 288b, 488b, 588b on the long carriage bolts 88a, 288a, 488a, 588a are facing the ground. The clamp halves 86a, 86b, 286a, 286b, 486a, 486b, 586a, 586b are then loosely attached to the frame 12, 212, 412, 512, 1012 preferably with short carriage bolts 94a, 294a, 494a, 594a, flat washers 94c, 294c, 494c, 594c, lock washers 494d, 594d and nuts 94b, 294b, 494b, 594b so that the nuts are facing the front of the frame 12, 212, 412, 512, 1012 and the vehicle V. The short carriage bolts 94a, 294a, 494a, 594a are preferably left somewhat loose at this stage of installation. Then, the hitch tongue 72 of the hitch assembly 70 is threaded through the hitch opening 18, 118, 218, 318, 418, 518a, 618, 718, 818 in the respective frame 12, 112, 212, 312, 412, 612, 712, 812, 1012 or mounting plate 519 and the clamp opening 90, 290, 490, 590 between the two clamp halves 86a, 86b, 286a, 286b, 486a, 486b, 586a, 586b. The combination mud flap assembly 10, 210, 410, 510, 1010, 1110, 1210 and hitch assembly 70 is then lifted up so as to enable the hitch tongue 72 to be inserted into the hitch receiver opening 77. At this stage, all of the nuts are engaged with the respective carriage bolts, but they are only finger tightened so that the shaft 72 is moveable or repositionable with respect to the securing assembly and the securing assembly is moveable or repositionable with respect to the respective frame. The shaft or hitch tongue 72 is then inserted into and secured within the hitch receiver opening 77 of the hitch receiver 76 that is attached to the vehicle V. The hitch tongue 72 is secured within the hitch receiver 76 with a hitch pin 79a that is inserted into a hitch receiver aperture 78 in the hitch receiver 76 when the aperture 78 is aligned with a hitch tongue aperture 74 in the hitch tongue 72 and the hitch pin 79a is then secured within the hitch tongue aperture 74 by a cotter pin 79b that is inserted into a cotter pin aperture 79c at the distal end 79d of the hitch pin 79a when the hitch pin 79a has passed through the hitch receiver aperture 78 on the near side of hitch receiver 76, the hitch tongue aperture 74 and through a second hitch receiver aperture (not shown) on the opposite side of the hitch receiver 76. When the hitch pin 79a secures the hitch tongue 72 within the hitch receiver 76, the cotter pin aperture 79c will reside outside of the receiver opening 77 so as to be accessible for the insertion of the cotter pin 79b.

In preferred embodiments, the support flange(s) 42, 142, 242a, 242b, 442a, 442b, 1042 are positioned on the bumper step or shelf portion S of the bumper B and the frame 12, 112, 212, 412, 1012 is pushed tightly against the rear surface of the bumper B until both of the stops 16a, 16b or bumper caps 17a, 17b, 217a, 217b, 417a, 417b, 617a, 617b, 717a, 717b, 1017a, 1017b are against the rear surface R of the bumper B. The securing assembly 84, 284, 484, 584, 1084 is then tightened around the hitch tongue 72, by tightening the nuts 88b, 288b, 488b, 588b to the long carriage bolts 88a, 288a, 488a, 588a. Downward pressure is then placed upon the top plate 40, 140, 240, 340, 440, 540, 640a, 740a, 840, 1040 proximate the support flanges 42, 142, 242a, 242b, 442a, 442b, 642, 1042 so that the short carriage bolts can move downward within the respective slots, so that the securing assembly, which is secured to the hitch tongue 72, can also adjust downward with respect to the respective frame and thereby allowing the respective support flanges 42, 142, 242a, 242b, 442a, 442b, 642. 1042 to engage with the top of the bumper B. The next step is to tighten the nuts 94b, 294b, 494b, 594b to the respective short carriage bolts 94a, 294a, 494a, 594a of the securing assembly 84. Then, the nuts on all four short carriage bolts 94a, 294a, 494a, 594a are torqued to about 32 ft. lbs.

Figure 2A:
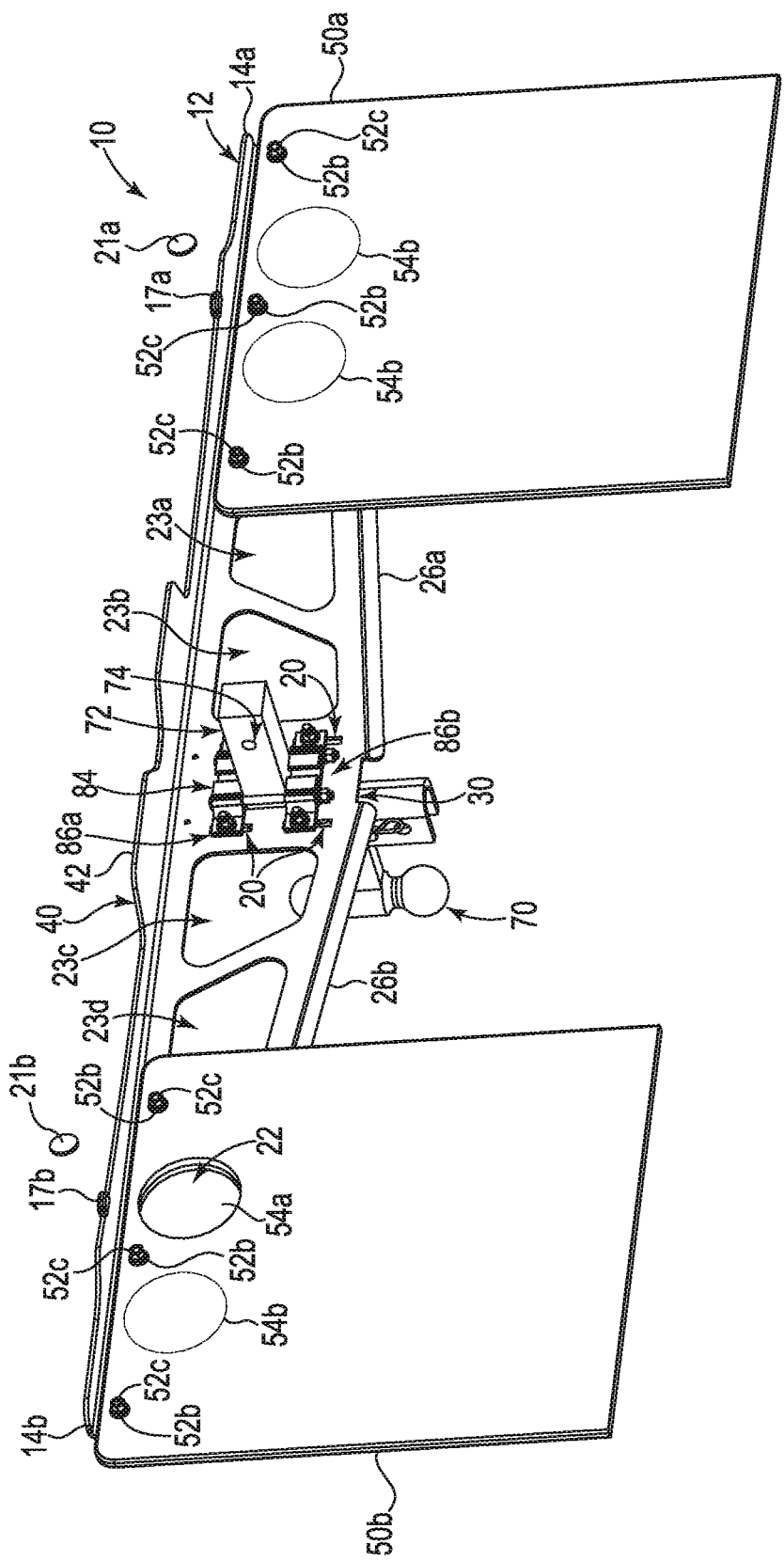
FIG. 2A is a front perspective view of the mud flap assembly 10 of FIG. 1 showing the securing assembly 84 that secures the frame 12 to the hitch assembly 70 and the protective pieces 21a, 21b shown in FIG. 1.
Figure 2B:
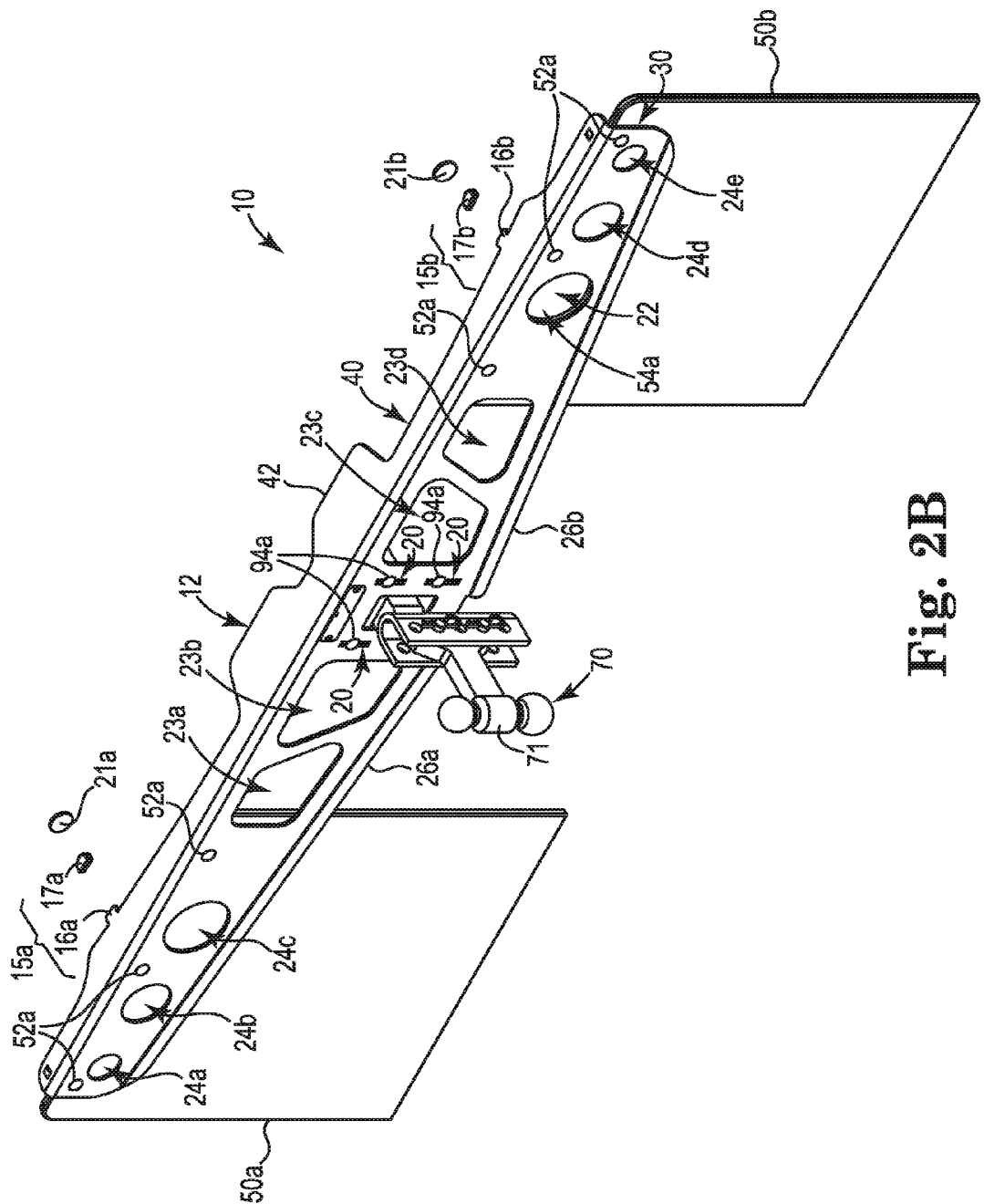
FIG. 2B is rear perspective view similar to FIG. 1, but showing a partially, exploded perspective view of the mud flap assembly 10 of FIGS. 1-2A in which the respective bumper caps 17a, 17b of the respective stop assemblies 15a, 15b are exploded away from the respective stops 16a, 16b.
Figure 2C:
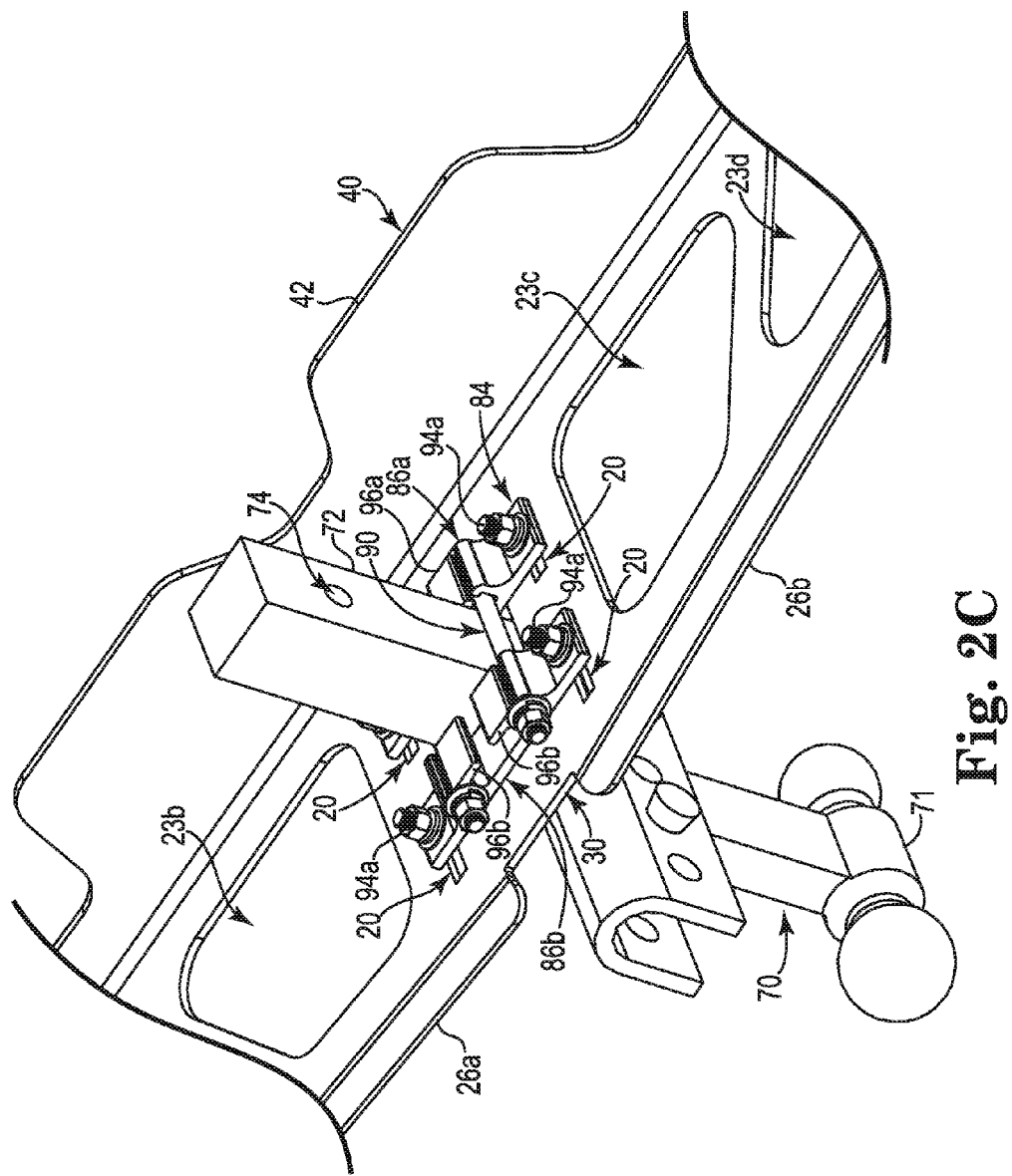
FIG. 2C is an enlarged, partial perspective view of the mud flap assembly 10 of FIGS. 1-2B as shown from in front and below the mud flap assembly 10, showing a portion of the securing assembly 84 securing the hitch assembly 70 to the frame 12.
Figure 2D:
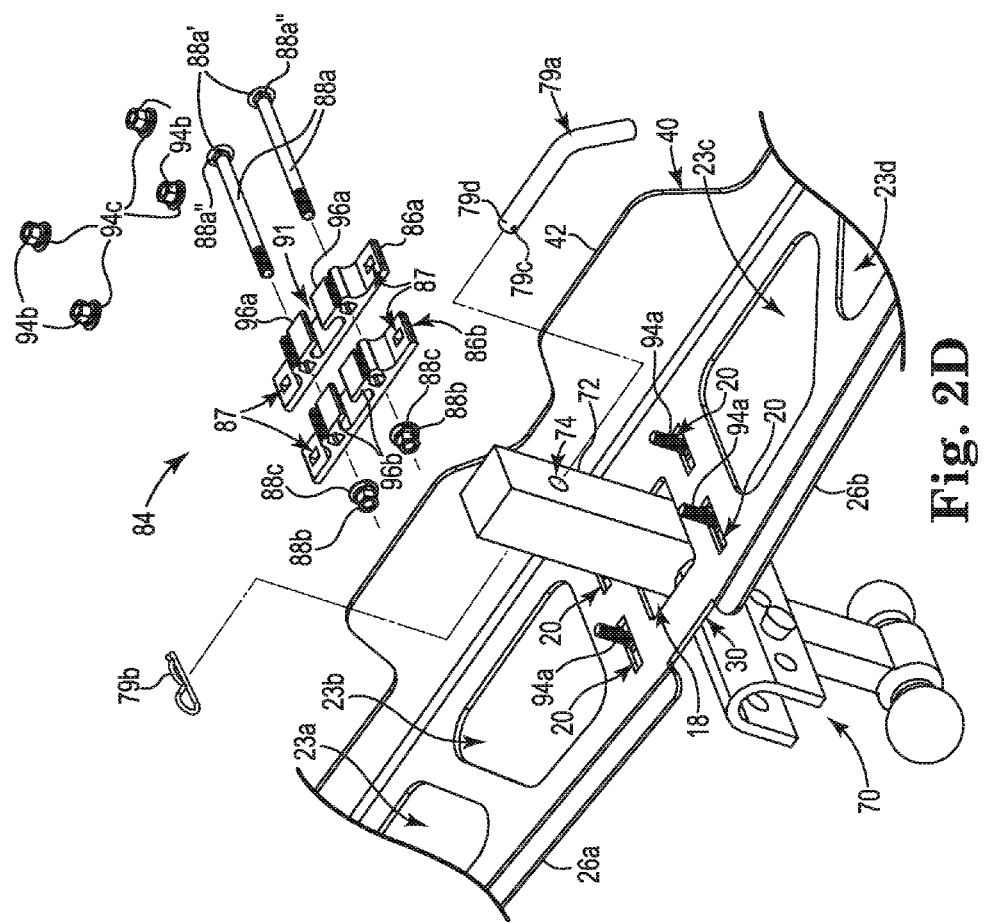
FIG. 2D is an exploded perspective view similar to that of FIG. 2C, but showing the securing assembly 84 of FIGS. 1-2C at least partially exploded away from the frame 12 and the hitch assembly 70 and the hitch pin 79a and the cotter pin 79b exploded away from the shaft or hitch tongue 72.

The flap panels 50a, 50b, 150a, 150b, 250a, 250b, 450a, 450b, 550a, 550b, 1050a, 1050b, 1150a, 1150b, 1250a, 1250b can be secured to the respective frame 12, 112, 212, 412, 512, 1012 by bolting the flap panels to the respective frame 12, 112, 212, 412, 512, 1012 with bolts 52a, 152a, 252a, 452a, 552a, flat washers 52b, 252b, 452b, 552b, optionally lock washers, and nuts 52c, 252c, 452c, 552c (see also, for example, FIGS. 2C-2D and related disclosure). Preferably, the nuts 52c, 252c, 452c, 552c are tightened until the flat washers 52b, 252b, 452b, 552b and/or lock washers start to compress into the composite material of the respective flap panel 50a, 50b, 150a, 150b, 250a, 250b, 450a, 450b, 550a, 550b, 1050a, 1050b, 1150a, 1150b, 1250a, 1250b.

It will be understood that alternate embodiments of the present mud flap assemblies and variants thereof, for example, those utilizing frames 312, 612, 712, 812, 1012, as discussed and illustrated herein, can be installed in a similar manner and have similar securing assemblies and adjustable stops.

Installation of embodiments that are more adjustable, or customizable, as shown in FIGS. 12-16D, for example, generally include the following steps. Please also see FIGS. 1-2D for illustrations of the hitch assembly 70. First, the securing assembly 284 can be assembled by securing the long carriage bolts 288a to the camp halves 286a, 286b with respective flat washers 288c and/or lock washers and nuts 288b. Then the flat surfaces of each clamp half 286a, 286b is oriented against the backside of frame 212 so the nuts 288b on the long carriage bolts 288a face down toward the ground. The securing assembly 284 can be loosely attached to frame 212 with the short carriage bolts 294a, flat washers 294c and/or lock washers so that the nuts 294b are closest to the front of the frame 212 and the vehicle V. As will be appreciated, it is preferred to leave all bolts 288a, 294a somewhat loose at this stage. Next, slide the ball mount and the shaft 72 of the hitch assembly 70 through frame 212 and hitch opening 218 of the frame 212 and the open space between the respective clamp halves of the securing assembly. Then the frame 212, with the hitch assembly 70 loosely engaged within the hitch opening 218 and the space between the clamp halves 286a, 286b can be lifted to enable the shaft or hitch tongue 72 of the hitch assembly 70 to be inserted into the hitch receiver opening 77. Then, the hitch assembly 70 is secured within the hitch receiver 76 with a hitch pin 79a that is inserted into both the hitch receiver aperture 78 and the hitch tongue aperture 74 when they are aligned and clip or a cotter pin 79b or the like is then inserted into a hitch pin aperture 79c at the distal end 79d or the hitch pin 79a to secure a hitch pin 79a in this position. If the receiver aperture 78 and the hitch tongue aperture 74 do not align to allow the hitch pin 79a to be inserted or if frame 212 cannot be positioned to hang straight and plumb, a hitch assembly with a longer hitch tongue may be needed before proceeding. Next, secure the support flanges 242a, 242b to the top plate 240 of the frame 212 such that they will extend over and rest upon the step S of the bumper B of the vehicle V (see also, FIG. 3A). It is preferred that the support flanges 242a, 242b are installed symmetrically with respect to the frame 212 and that they are positioned as close to the ends 214a, 214b of the frame 212 as possible. Next ensure the frame 212 is approximately level with bumper B and push down on the top plate 240 or the support flange(s) 242a, 242b in order to press them against the top surface S of the bumper B. The rear plate 230 of the frame 212 will preferably be plumb and the stop assemblies 216a, 216b will preferably be resting against the rear surface R, so that the short carriage bolts 294a can then be tightened in their respective top slots 220, but only in the top slots 220 and equally on both sides. This will leave the lower clamp half 286b loose, while the upper clamp half 286a will preferably be tightly secured. Next tighten both long carriage bolts 288 to secure the lower clamp half 286b against the ball mount 71 and the hitch tongue 72 and the frame 212 to hitch assembly 70. Finally, tighten the remaining short carriage bolts 294a to further secure the lower clamp half 286b to the frame 112. It is preferred that all of the long carriage bolts 288a and the short carriage bolts 286b are tightened and/or torqued to about 32 ft. lbs.

In preferred embodiments, the stops 16b, 316a, 316b or the bumper caps 17b, 117a, 117b, 217a, 217b, 417a, 417b are tensioned against the rear surface R of the bumper B by placing force against the rear plate 30, 130, 230, 330, 430 of the frame 12, 112, 212, 312, 412 on both sides of the hitch assembly opening 18, 118, 218, 318, 418 when the hitch tongue 72 is secured to the hitch receiver 76 by the hitch pin 79a, but before the securing assembly 84, 184, 284, 384, 484 is tightened around the hitch assembly 70, in order to press the frame 12, 112, 212, 312, 412 and the stops 16b, 316a, 316b or bumper caps 17b, 117a, 117b, 217a, 217b, 417a, 417b against the rear surface R of the bumper B and bend the frame 12, 112, 212, 312, 412 slightly and to create this tension. The support flange(s) 42, 142, 242a, 242b, 442a, 442b are also preferably tensioned against the top surface S of the bumper B by placing downward force upon the top surface S of the bumper B when the shaft 72 is secured to the hitch receiver 76 by the hitch pin 79a, but before the securing assembly 84, 184, 284, 384, 484 is tightened around the hitch assembly 70, in order to press the top plate 40, 140, 240, 340, 440 and the support flange(s) 42, 142, 242a, 242b, 442a, 442b against the top surface S of the bumper B and bend the frame 12, 112, 212, 312, 412 slightly and to create this tension.

Figure 16A:
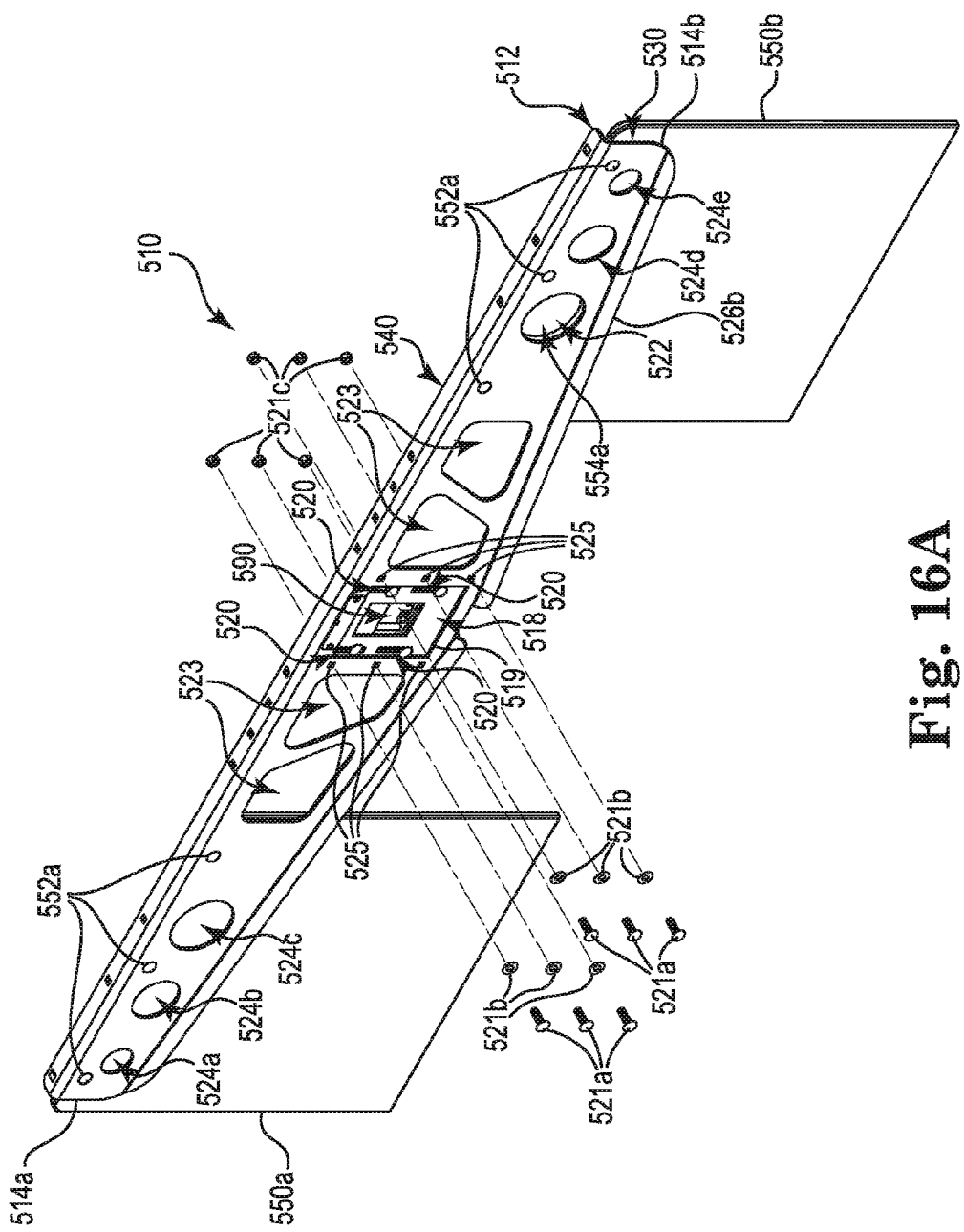
FIG. 16A is a rear perspective view of a further alternate mud flap assembly 510 having a mounting plate 519 to which the securing assembly 584 is attached; wherein the mounting plate 519 includes a hitch opening 518a so that when the mounting plate 519 is secured to the frame 512, the mounting plate 519 will at least partially cover an enlarged opening 518 in the frame 512 so as to provide a hitch opening 518a for receiving a hitch tongue (not shown), which at least partially overlaps with a central clamp opening 590, through which a hitch tongue (not shown) of a hitch assembly (not shown, see also FIGS. 2A-2D and related disclosure) can be threaded; and wherein the fastener elements 521a, 521b, 521c that secure the mounting plate 519 to the frame 512 are shown in exploded view.
Figure 16B:
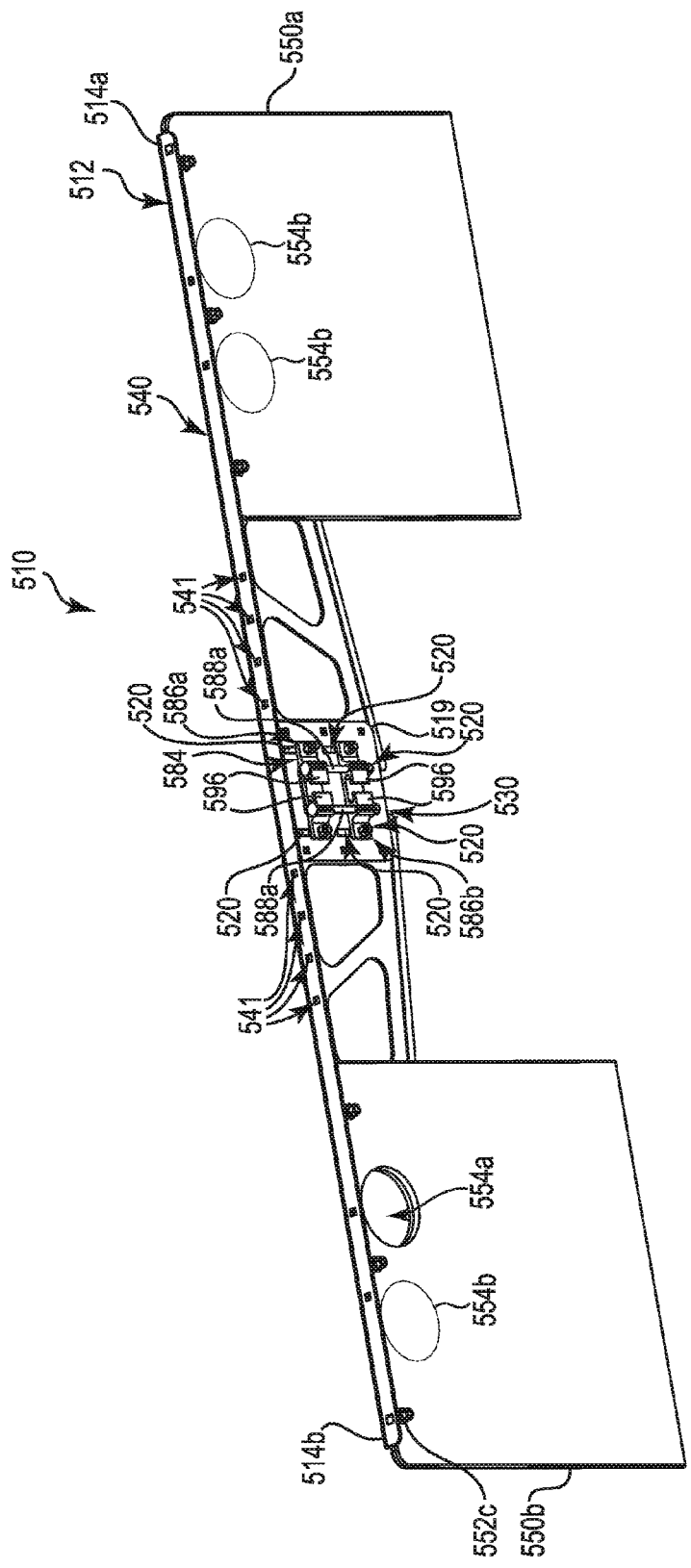
FIG. 16B is a front view of the alternate mud flap assembly 510 of FIG. 16A in which the fasteners for securing the mounting plate 519 to the frame 512 have been removed for clarity, but showing the securing assembly 584 secured to the mounting plate 519.
Figure 16D:
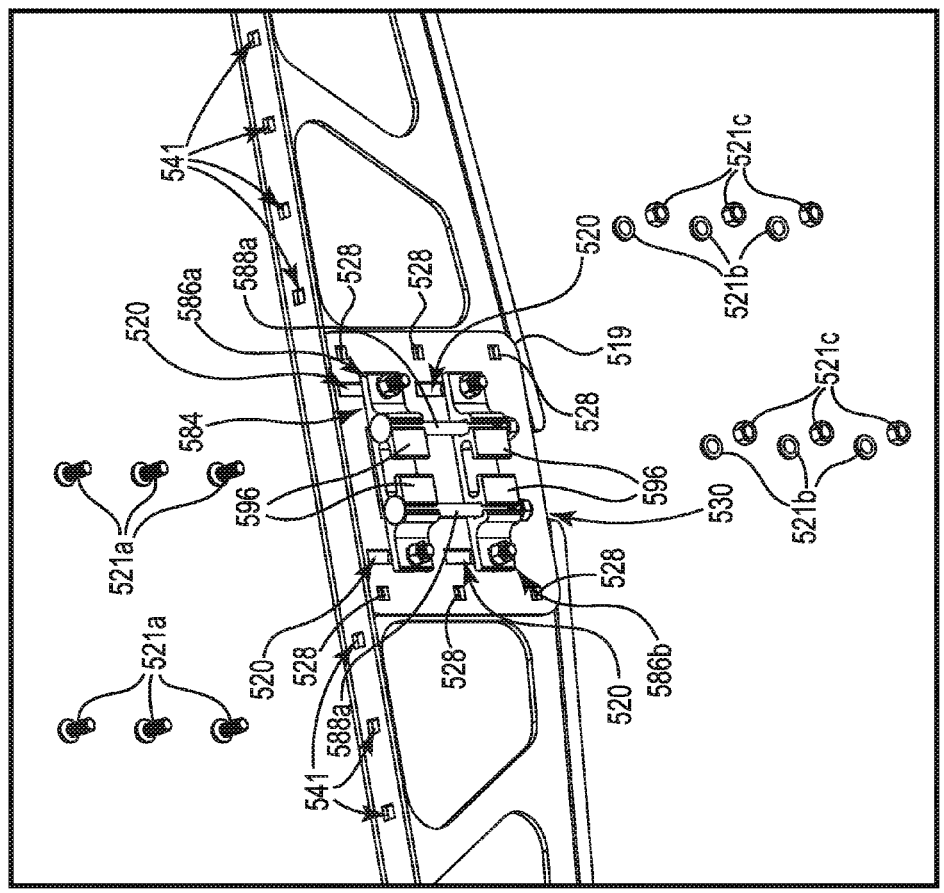
FIG. 16D is a partially exploded, enlarged, partial perspective view of the front of the alternate mud flap assembly 510 of FIGS. 16A-16C, similar to that shown in FIG. 16b, but showing the fastener elements 521a, 521b, 521c that are used to secure the mounting plate 519 to the frame 512 when the respective bolts 521a pass through respective corresponding apertures 525, 528, in the mounting plate 519 and the frame 512, respectively, so that the respective nuts 521c can be threaded onto the respective bolts 521a to secure the mounting plate 519 to the frame 512.

The flap panels 50a, 50b, 150a, 150b, 250a, 250b, 450a, 450b, 550a, 550b, 1050a, 1050b, 1150a, 1150b, 1250a, 1250b are then positioned as generally illustrated indicated in FIGS. 16A-16B, for example, and secured to the frame 12, 112, 212, 312, 412, 512, 612, 712, 812, 1012 with bolts, flat washers, lock washers and nuts. It is preferred to tighten the nuts until the lock washers are fully compressed.

In various embodiments, for example those mud flap assemblies specifically designed for dual exhaust vehicles, preferred methods will further include cutting out a hole or exhaust aperture 54a, 154a, 254a, 454a, 554a in at least one flap panel 50a, 50b, 150a, 150b, 250a, 250b, 450a, 450b, 550a, 550b, 1050a, 1050b, 1150a, 1150b, 1250a, 1250b proximate the vehicle's V exhaust pipe P. Preferably, the flap panels 50a, 50b, 150a, 150b, 250a, 250b, 450a, 450b, 550a, 550b, 1050a, 1050b, 1150a, 1150b, 1250a, 1250b include one or more outlines 54b, 154b, 254b, 454b, 554b, as discussed above, for proper alignment of potential exhaust aperture(s) to the corresponding frame apertures 22, 122, 222, 322, 422, 522, 622, 722, 822, 1022.

Installation for embodiments including a frame 712 that is adjustable in length as illustrated in FIGS. 17-21 generally include the same steps as indicated above with the addition of first selecting the desired length L1-L5 of the frame 712 and then also securing bolts 729b within apertures 743a, 743b, 743c to secure side portions 713b and 713c to the center portion 713a.

Now referring also to FIGS. 23A-28, which illustrate further preferred mud flap assemblies 1010, 1110 and 1210, which are largely similar to mud flap assemblies 10, 110, 210, 410, 510 disclosed herein in reference to FIGS. 1-15E, the mud flap assembly 1010, 1110, 1210 includes a frame 1012 similar to the frame 812 shown in FIG. 22, which generally spans a bumper B of a vehicle V (not shown) in the manner shown in FIGS. 3A-6 (see for example, FIG. 3A). The frame 1012 preferably includes a rear plate 1030 and a top plate 1040. The mud flap assemblies 1010, 1110, and 1210 of the present invention are characterized in that the include enlarged flap panels 1050a, 1050b, 1150a, 1150b, 1250a, 1250b that preferably extend either beyond the respective ends of the respective frames 1012 or above the respective frame 1012 to provide greater protection from rocks and debris churned up from the rear wheels of a vehicle to which the respective mud flap assembly is secured, for trailers, boats or other equipment being pulled behind the vehicle.

The frame 1012 preferably includes a hitch opening 1018. Slots are incorporated into the frame 1012 in a manner similar to the slots illustrated in frames 12, 112, 212, 312 and 412 shown in FIGS. 1-15E or incorporated into a separate mounting plate 519 (FIG. 16A), similar to the arrangements illustrated in FIG. 16A or incorporated into one piece of a multi-piece frame such as the center portion 613a, 713a in the arrangement illustrated in FIGS. 16A, 17. The slots are proximate the hitch opening 1018 in the same way that slots are provided in frames 12, 112, 212, 312 and 412 shown in FIGS. 1-15E and the securing assembly 1084, which is the same as that provide in the previously referenced embodiments, can be secured to the frame 1012 and can engage the hitch assembly 70, securing it to the frame 1012 in the same manner as described and shown with respect to the previously referenced embodiments. As previously disclosed, the hitch tongue or a shaft 72 of a hitch assembly 70, similar to that shown in FIG. 1, can be received (see also, FIG. 2D and related disclosure) and secured by a securing assembly such as securing assembly 84 of FIG. 2D. In the case of a separate mounting plate 19 such as the mounting plate 519 of FIG. 16A, the mounting plate 19 functions as a part of the frame 12, providing the slots 20 adjacent to the hitch opening 18 as previously described, where a securing assembly 84 similar to that shown in FIGS. 2C and 2D, can be secured.

As with prior embodiments, the securing assembly 584 (FIG. 16B, 16D) can be used to secure a hitch tongue assembly (not shown) to the frame 512 in a manner similar to that discussed above and shown in FIGS. 1, 2B-2D. As in the previous disclosed embodiments, the preferred securing assemblies 584 include two clamp halves 586a, 586b interconnected with long carriage bolts 588a, nuts 588b and washers 588c that can be secured to clamp a hitch tongue (not shown) of a hitch assembly (not shown) within the plate opening 590 of the mounting plate 519 to secure the hitch assembly (not shown) to the frame 512 when the mounting plate 519 is secured to the frame 512. Each clamp half 586a, 586b preferably includes at least one support flange 592a, 592b to contact the hitch tongue (not shown). The clamp halves 586a, 586b are secured to the mounting plate 519 with short carriage bolts 594a located within the slots 520. The short carriage bolts 594a can be secured within apertures 587 in the clamp halves 586a, 586b (see also, for example, FIGS. 1, 2A-2D) with nuts 594b, flat washers 594c and lock washers 594d.

The frame 1012 can also include at least one aperture or exhaust opening 1022 that is aligned with a corresponding aperture in the respective flap panel 1050b, 1150b, 1250b as illustrated in the embodiment of FIGS. 16A-16C and in other figures and embodiments described herein. Each flap panel 1050a, 1050b, 1150a, 1150b, 1250a, 1250b may include one or more outlines for a user to trace and cut additional exhaust openings in the flap panels if desired, as previously described. In alternate embodiments, the outlines can be scored, perforated or the like, to make it easier for the user to remove the outlined material to make a suitable aperture to correspond with the aperture or exhaust opening 1022 in the frame 1012. The at least one exhaust opening 1022 in the frame 1012 and respective flap panel 1050b, 1150b, 1250b is preferably generally aligned proximate the vehicle exhaust pipe P so that the mud flap assembly 1010, 1110, 1210 ventilates hot exhaust away from the vehicle V similar to the arrangement illustrated in FIG. 3B and described herein. The frame 1012 may also include decorative apertures 1024a, 1024b, 1024c, 1024d and 1024e as desired, which compliment the decorative aspects of the exhaust opening 1022. For some vehicle models, a second exhaust opening (not shown) can be preferably provided, preferably constructed and arranged to align with an additional exhaust pipe location in a similar manner, typically opposite the first exhaust opening 1022. The exhaust opening can have any shape, but the decorative shape of a circle is preferred in order to provide continuity with the decorative shape of the proximate decorative apertures 1024a, 1024b, 1024c, 1024d, and 1024e in the frame 1012.

As in other embodiments describe herein, frame 1012 preferably has bent lips 1026a, 1026b proximate the flap panels 1050a, 1050b, 1150a, 1150b, 1250a, 1250b which allows the respective flap panels 1050a, 1050b, 1150a, 1150b, 1250a, 1250b to flex upwardly as the vehicle moves forward and air resistance pushes the bottoms of the respective flap panels away from the vehicle when the mud flap assembly 1010 is secured to a vehicle. The bent lips 1026a, 1026b also provide greater strength to the respective rear plates 1030a, 1030b to resist horizontal deformation.

At first and second ends 1014a, 1014b of the frame 1012, proximate the tires (not shown) of the vehicle V (not shown), the flap panels 1050a, 1050b, 1150a, 1150b, 1250a, 1250b are secured to and extend downwardly from the frame 1012. The flap panels 1050a, 1050b, 1150a, 1150b, 1250a, 1250b generally block dirt, debris or rocks that may be kicked up by the tires from damaging the trailer and apparatus (not shown) being towed by the vehicle via the hitch assembly (see also, hitch assembly 70 and related disclosure). As with previous embodiments, flap panels 1050a, 1050b, 1150a, 1150b,

1250a, 1250b are preferably made of flexible material such as masticated rubber or the like. Preferably, the flap panels 1050a, 1050b, 1150a, 1150b, 1250a, 1250b are secured to the frame 1012 with nuts, bolts and washers as previously described herein.

The frame 1012 includes a top plate 1040 including one or more apertures for the optional securing of a support flange piece or pieces (not shown), similar to the support flange piece 242a, 242b shown in FIGS. 12, 13A, 13B, or the support flange pieces 442a, 442b, shown in FIGS. 15A-15C to sit upon a step S of a bumper B of a vehicle (not shown) similar to that shown in FIGS. 3A-6. For example, see apertures 541 in FIG. 16D, as well as corresponding apertures 241 and support flanges 242a, 242b shown in FIG. 13A and the related disclosure. Also note the corresponding disclosure of support flanges 442a, 442b secured to the universal frame 412 by bolts 445a that pass through apertures 441, as shown in FIG. 15A-15C, and as noted in the related disclosure. An optional protective strip 1075 can be attached to the underside of the top plate 1040; protective strip 1075 is shown exploded away from the frame 1012 in FIGS. 23A, 23B for clarity. Preferably, the protective strip 1075 has an adhesive surface and can be adhered to the underside of the top plate 1040 by a user as needed to protect the bumper of a vehicle (not shown). Although not shown in FIGS. 25A, 25B, 27A, 27B, mud flap assemblies 1110 and 1210 may similarly include a protective strip 1075.

The frame 1012 can also have stops (not shown) that are provided by stop assemblies (not shown) of the type that can be secured to the top plate 1040 through apertures in the manner in which stop assemblies 415a, 415b are secured to the universal frame 412 as shown in FIGS. 15A-15E. A gusset member 1066 can be attached to the frame 1012 below the top plate 1040 to strengthen the frame 1012 as previously described. Although not shown in FIGS. 25B, 27B, the frame 1012 of mud flap assemblies 1110, 1210 may similarly include a gusset member 1066. Further preferred mud flap assemblies 1010, 1110, and 1210 of the present invention, shown in FIGS. 23A-28 each preferably include a pair of adjustable stop assemblies 1015a, 1015b secured to each of the frames 1012 that are the same as adjustable stop assemblies 415a, 415b secured to the frame 412 of the mud flap assembly 410 shown FIGS. 15A-15E. Each of the stop assemblies 1015a, 1015b include a stop, a bumper cap and, in further preferred embodiments, a protective piece (not shown) placed on the vehicle bumper B proximate a place where the owner projects the bumper cap covering the stop will engage the bumper B when the stop and the bumper cap are pressed up against the bumper when the mud flap assembly is secured to the vehicle V in order to protect the bumper from abrasion at the point of contact, just as it is for preferred embodiments shown in FIGS. 15A-15E.

The flap panel 1050a has an inner edge 1058a, an outer edge 1058c, and an upper edge 1058e; likewise, the panel 1050b has an inner edge 1058b, an outer edge 1058d, and an upper edge 1058f. Similarly, the flap panel 1150a has an inner edge 1158a, an outer edge 1158c, and an upper edge 1158e; the panel 1150b has an inner edge 1158b, an outer edge 1158d, and an upper edge 1158f; flap panel 1250a has an inner edge 1258a, an outer edge 1258c, and an upper edge 1258e; the panel 1250b has an inner edge 1258b, an outer edge 1258d, and an upper edge 1258f. The other flap panels illustrated herein also have corresponding inner, outer, and upper edges.

In many of the embodiments described herein, there is a generous distance between the inner edges of the flap panels. Although the drawings are not to be taken to scale, one can see the much greater distance illustrated between the respective inner edges of panels 50a and 50b of FIGS. 1, 150a and 150b of FIGS. 9, 250a and 250b of FIGS. 12, 450a and 450b of FIG. 15A, and 550a and 550b of FIG. 16A, when compared to the inner edges 1058a, 1058b of flap panels 1050a and 1050b of FIG. 23A, inner edges 1150a, 1158b of flap panels 1150a and 1150b of FIG. 25A, and inner edges 1258a, 1258b of flap panels 1250a and 1250b of FIG. 27A. In some situations, such as when a dual-wheel type of vehicle is used, additional protection at the inner portion may be desired in order to prevent damage to trailer, equipment, or other apparatus being towed, for example. The embodiments of mud flap assemblies such as 1010, 1110, 1210, illustrated in FIGS. 23A-28, provide improved protection against such damage, by providing a reduced distance D1a, D1b, D1c between the inner edges 1058a and 1058b, 1158a and 1158b, 1258a and 1258b, of flap panels 1050a and 1050b, 1150a and 1150b, and 1250a and 1250b, respectively, as illustrated in FIGS. 23A, 23B, 25A, 25B, 27A and 27B. The distances D1a, D1b, D1c between the inner edges 1058a and 1058b, 1158a and 1158b, 1258a and 1258b of flap panels 1050a and 1050b, 1150a and 1150b, 1250a and 1250b, respectively, are chosen so that it is large enough to allow access to the hitch tongue 72 and safety chains (not shown), yet small enough to provide the desired amount of protection from rocks or debris that may be kicked up by the tires. In preferred embodiments, the distance D1a, D1b, D1c preferably ranges from about 3 inches to about 5 inches, preferably about 4 inches, although this distance can be varied somewhat from this range depending on the amount of protection desired.

As in other embodiments described herein, the flap panels 1050a, 1050b, 1150a, 1150b, 1250a, 1250b preferably are secured to and extend downwardly from the frame 1012. A variety of fasteners such as bolts 1052a, washers 1052b, and nuts 1052c can be utilized to secure the flap panels 1050a, 1050b, 1150a, 1150b, 1250a, 1250b to the frame 1012. The fasteners, and the various holes and apertures through which the fasteners attach, are preferably located toward the longitudinal ends 1014a, 1014b of the frame 1012, so as to avoid interference with additional structures such as the securing assembly, the hitch assembly or related components, and the like, as previously illustrated.

In many of the above embodiments, such an arrangement is sufficient. However, for extended flap panels such as the flap panels 1050a, 1050b, 1150a, 1150b, 1250a, 1250b, which extend inwardly so that the inner edges 1058a and 1058b, 1158a and 1158b, 1258a and 1258b of the flap panels 1050a and 1050b, 1150a and 1150b, 1250a and 1250b, respectively, are a shorter distance D1a, D1b, D1c apart, the securement arrangement, such as shown in FIGS. 1A-22 and described in the corresponding text, can leave the flap panels 1050a, 1050b, 1150a, 1150b, 1250a, 1250b with insufficient support toward their respective inner edges 1058a, 1058b, 1158a, 1158b, 1258a, 1258b. Flap panel support members 1032a, 1032b are secured to the frame 1012 as shown, and provide additional support for the extended flap panels 1050a, 1050b, 1150a, 1150b, 1250a, 1250b toward their respective inner edges 1058a, 1058b, 1158a, 1158b, 1258a, 1258b.

Preferably, panel support members 1032a, 1032b are not planar, but are bent so that the included angle is 90 degrees plus angle A2 as illustrated in FIG. 14B. Preferably, the panel support member 1032a, flap panel 1050a, 1150a, 1250a, and frame 1012 are secured with fasteners such as bolts 1052a, washers 1052b, and nuts 1052c located at apertures 1033a, 1133a, 1233a, so that the flap panel 1050a, 1150a, 1250a is sandwiched between the support member 1032a, and the frame 1012 as shown. Similarly, flap panel 1050b, 1150b, 1250*b* is preferably sandwiched between the support member 1032*b* and the other end of the frame 1012 as shown. This arrangement provides superior support for the flap panels 1050*a*, 1050*b*, 1150*a*, 1150*b*, 1250*a*, 1250*b*.

Figures 24A, 24B:
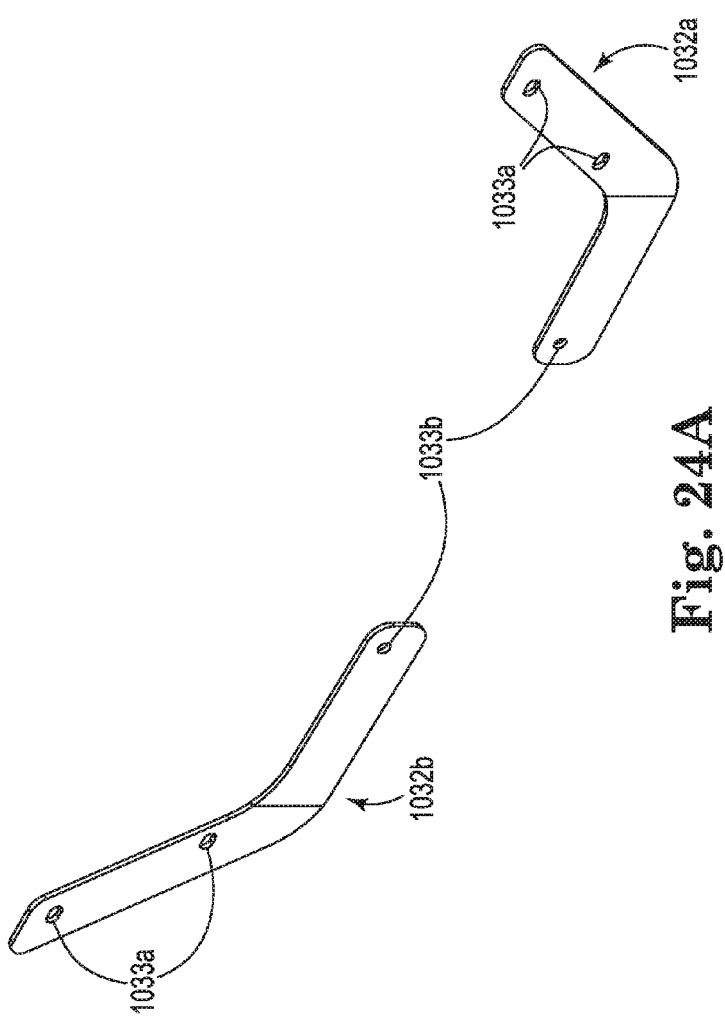
FIG. 24A is a front perspective view of the inner mud flap support members 1032a, 1032b of FIG. 23B.
FIG. 24B is a top view of the inner mud flap support members 1032a, 1032b of FIGS. 23B, 23C, and 24A, showing a bend in each of the inner mud flap support members 1032a, 1032b.

Preferably, support members 1032*a*, 1032*b* have a slight bend to an inside surface 1032*a'*, 1032*b'*, as illustrated in FIG. 24B, with angle A2 preferably being from about 85 to about 89 degrees, preferably about 88 degrees, so that the surface of one end of each support member 1032*a*, 1032*b* is preferably from about 5 to about 1 degree out of plane with respect to the surface of the other (opposite) end, more preferably about 2 degrees out of plane with respect to the surface of the other (opposite) end. While not always required, this slight bend on the inside surface 1032*a'*, 1032*b'* of the support member 1032*a*, 1032*b* can "pre-stress" the assembly to help keep the ends of each support member 1032*a*, 1032*b* well apposed to the flap panel 1050*a*, 1050*b*, 1150*a*, 1150*b*, 1250*a*, 1250*b* and the frame 1012, and thereby minimizing any gaps which could otherwise exist in the assembled structure. The angle A2 is chosen to provide the desired degree of support for the flap panels 1050*a*, 1050*b*, 1150*a*, 1150*b*, 1250*a*, 1250*b*. In preferred embodiments, angle A2 ranges from about 85 to about 89 degrees; more preferably, angle A2 is about 88 degrees. In other words, the total included angle (90 degrees+A2) between opposing ends 1034*a*, 1035*a* and 1034*b*, 1035*b* of the inside surface 1032*a'*, 1032*b'* of the support member 1032*a*, 1032*b* will preferably range from about 175 to about 179 degrees, and more preferably be about 178 degrees.

The assembly is preferably held together by fasteners as described above. The flap panels 1050*a*, 1050*b*, 1150*a*, 1150*b*, 1250*a*, 1250*b*, support members 1032*a*, 1032*b*, and frame 1012 have apertures 1033*a*, 1033*b*, 1133*a*, 1133*b*, 1233*a*, 1233*b* through which bolts 1052*a* can pass. At apertures 1033*a*, 1133*a*, 1233*a* the bolts 1052*a* preferably pass through the support members 1032*a*, 1032*b* and the flap panels 1050*a*, 1050*b*, 1150*a*, 1150*b*, 1250*a*, 1250*b*, and the frame 1012, with washers 1052*b* and nuts 1052*c* applied. At apertures 1033*b*, 1133*b*, 1233*b*, however, the bolts 1052*a* preferably pass through the support members 1032*a*, 1032*b* and the flap panels 1050*a*, 1050*b*, 1150*a*, 1150*b*, 1250*a*, 1250*b*, but not the frame 1012. In some embodiments, the bent lips 1026*a*, 1026*b* may align with apertures 1033*b*, and having corresponding apertures in the frame at that location could be problematic; by configuring the bolts 1052*a* at these locations to pass through the support members 1032*a*, 1032*b* and the flap panels 1050*a*, 1050*b*, 1150*a*, 1150*b*, 1250*a*, 1250*b*, but not the frame 1012, the support members 1032*a*, 1032*b* can provide support for flap panels 1050*a*, 1050*b*, 1150*a*, 1150*b*, 1250*a*, 1250*b* in the vicinity of apertures 1033*b*, 1133*b*, 1233*b* without interference from the bent lips 1026*a*, 1026*b* to the fastener components such as washers 1052*b* and nuts 1052*c*. The support members 1032*a*, 1032*b* are then attached to the frame at apertures 1033*a*, 1133*a*, 1233*a*, but cantilever as they extend to the vicinity of apertures 1033*b*, 1133*b*, 1233*b*. The slight bend in the support members 1032*a*, 1032*b* as described above can aid in stabilizing the assembled structure in vicinity of apertures 1033*b*, 1133*b*, 1233*b*.

Figure 25A:
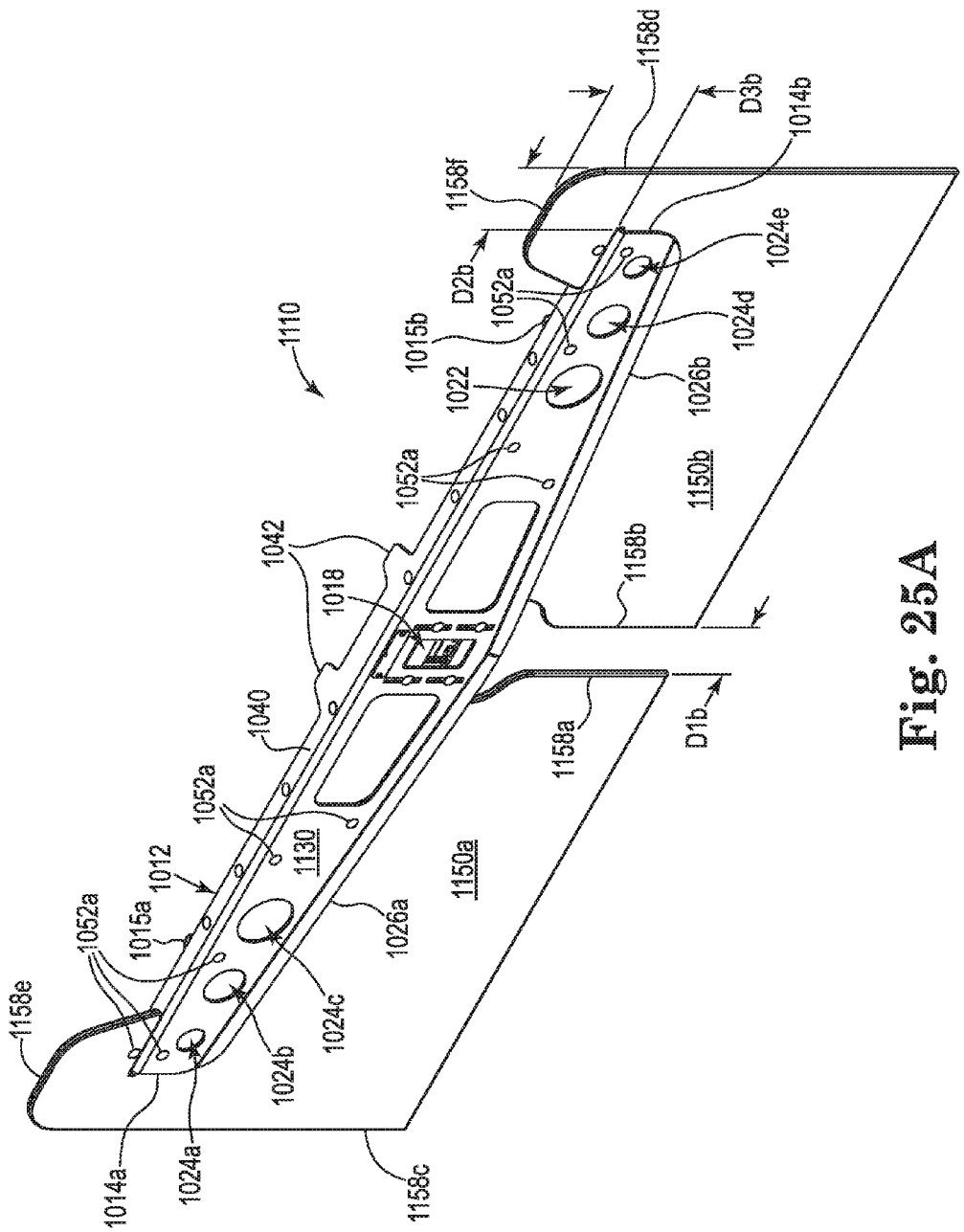
FIG. 25A is a rear perspective view of a another alternate mud flap assembly 1110 including frame 1012, which is the same as frame 1012 of FIGS. 23A and 23B, but having two further enlarged flap panels 1150a, 1150b secured to and extending downwardly from the frame 1012; the mud flap assembly 1110 being securable to a vehicle (not shown) in the manner disclosed in the specification in relation to the discussion regarding FIG. 3A through FIG. 6.
Figure 25B:
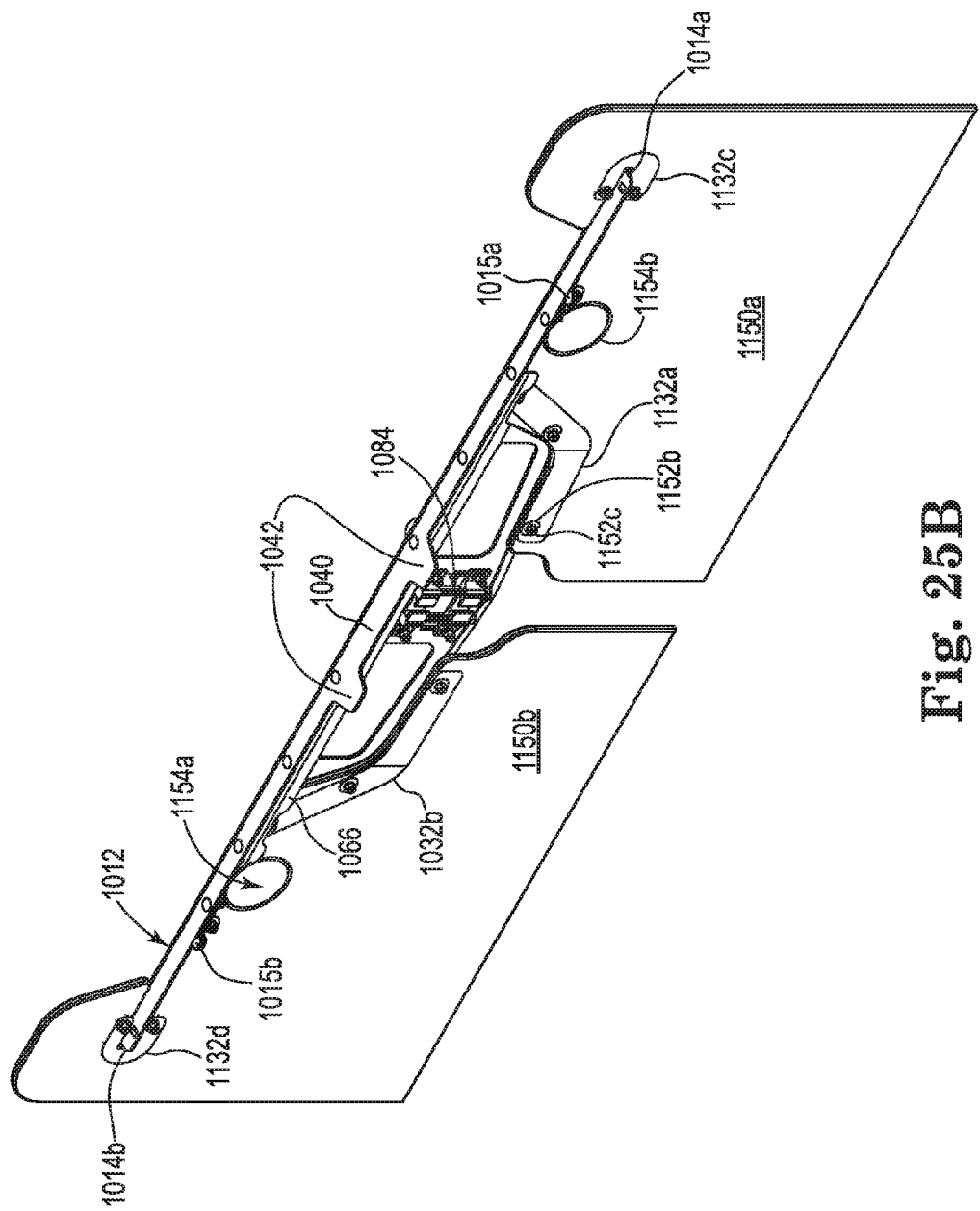
FIG. 25B is a front perspective view of the alternate mud flap assembly 1110 of FIG. 25A, further showing a pair of inner mud flap support members 1032a, 1032b and a pair of outer mud flap support members 1132c, 1132d.
Figure 25C:
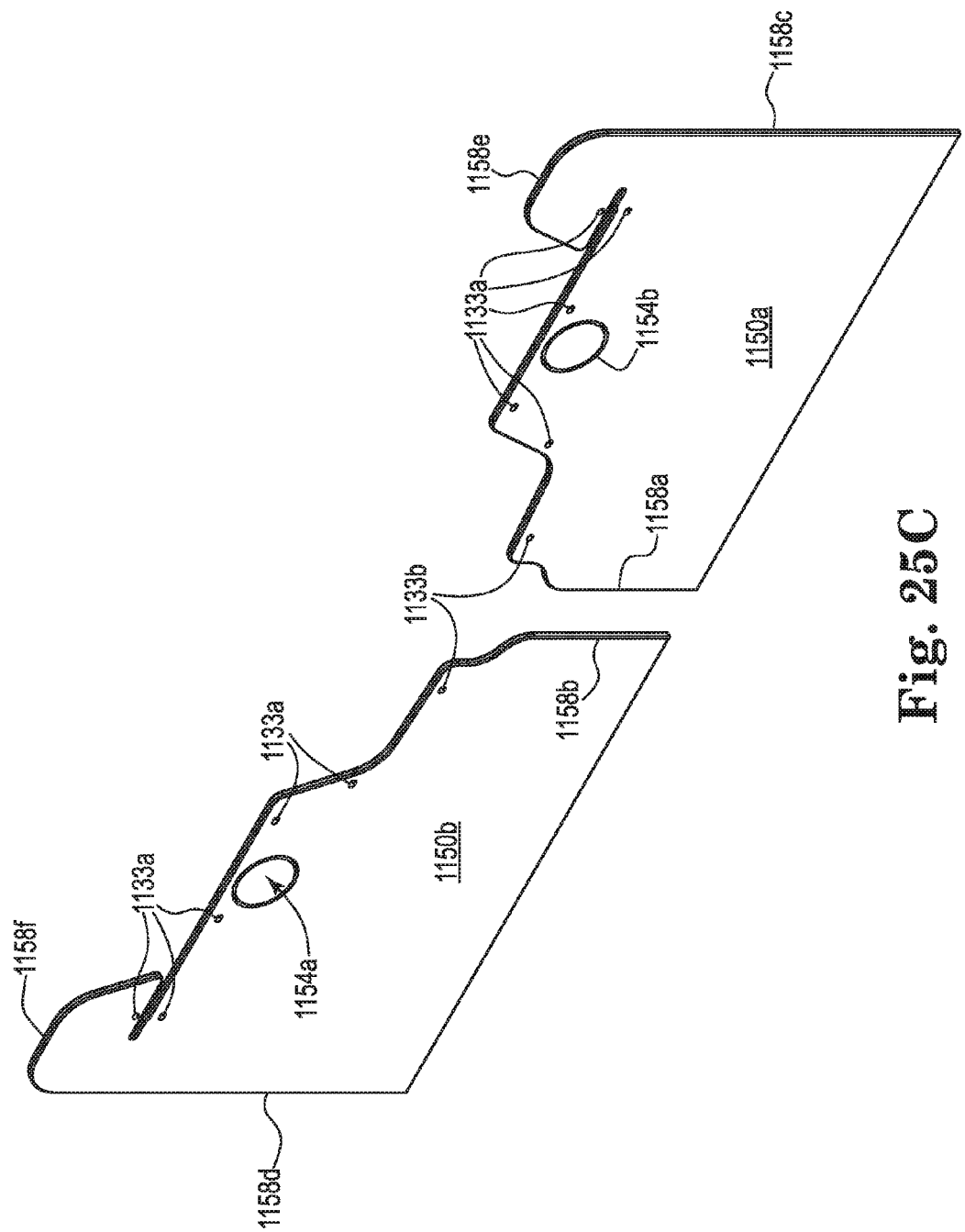
FIG. 25C is a front perspective view of the further enlarged flap panels 1150a, 1150b of FIGS. 25A and 25B.
Figure 26:
FIG. 26 is a front perspective view of the outer mud flap support members 1132c, 1132d of FIG. 25B.

Now referring to mud flap assembly 1110 illustrated in FIGS. 25A-26, the flap panels 1150*a*, 1150*b* are extended inward, similar to flap panels 1050*a*, 1050*b*, 1250*a*, 1250*b*. However, the flap panels 1150*a*, 1150*b* are also extended a distance D2*b* past the longitudinal ends 1014*a*, 1014*b* of frame 1012. In other words, the outer edge of the flap panel 1150*a* is a distance D2*b* past the longitudinal end 1014*a* of frame 1012, and the outer edge of the flap panel 1150*b* is a distance D2*b* past the longitudinal end 1014*b* of frame 1012, respectively. Further, the flap panels 1150*a*, 1150*b* are also extended a distance D3*b* above the top plate 1040 in the vicinity of the longitudinal ends 1014*a*, 1014*b* of frame 1012, so that the upper edge of flap panels 1150*a* and 1150*b* are a distance D3*b* above top plate 1040 of frame 1012. As best seen in FIG. 25B, mud flap assembly 1110 further comprises panel support members 1132*c*, 1132*d* which provide additional support for the extended flap panels 1150*a*, 1150*b*. Preferably, the panel support member 1132*c*, flap panel 1150*a*, and frame 1012 are secured with fasteners such as bolts 1052*a*, washers 1052*b*, and nuts 1052*c* located at apertures 1133*a*, so that the flap panel 1150*a* is sandwiched between the support member 1132*c* and the frame 1012 as shown. Similarly, flap panel 1150*b* is preferably sandwiched between the support member 1132*d* and the other end of the frame 1012 as shown. This arrangement provides superior support for the flap panels 1150*a*, 1150*b*. The distances D2*b*, D3*b* between the end of the frame 1012 or the top of the frame 1012, respectively, and the outer edge 1158*c*, 1158*d*, respectively, or the upper edge 1158*e*, 1158*f*, respectively, of flap panel 1150*a*, 1150*b*, respectively, are arranged to provide the desired amount of protection for anything towed behind the flap panels 1150*a*, 1150*b* from rocks or debris that may be kicked up by the tires, while still providing the desired fit on the vehicle V. In preferred embodiments, distance D2*b* is preferably from about 2 to about 12 inches, preferably about 5 inches. In preferred embodiments, distance D3*b* is preferably from about 2 inches to about 12 inches, preferably from about 4 inches to about 8 inches, and more preferably about 6.5 inches.

Figure 27B:
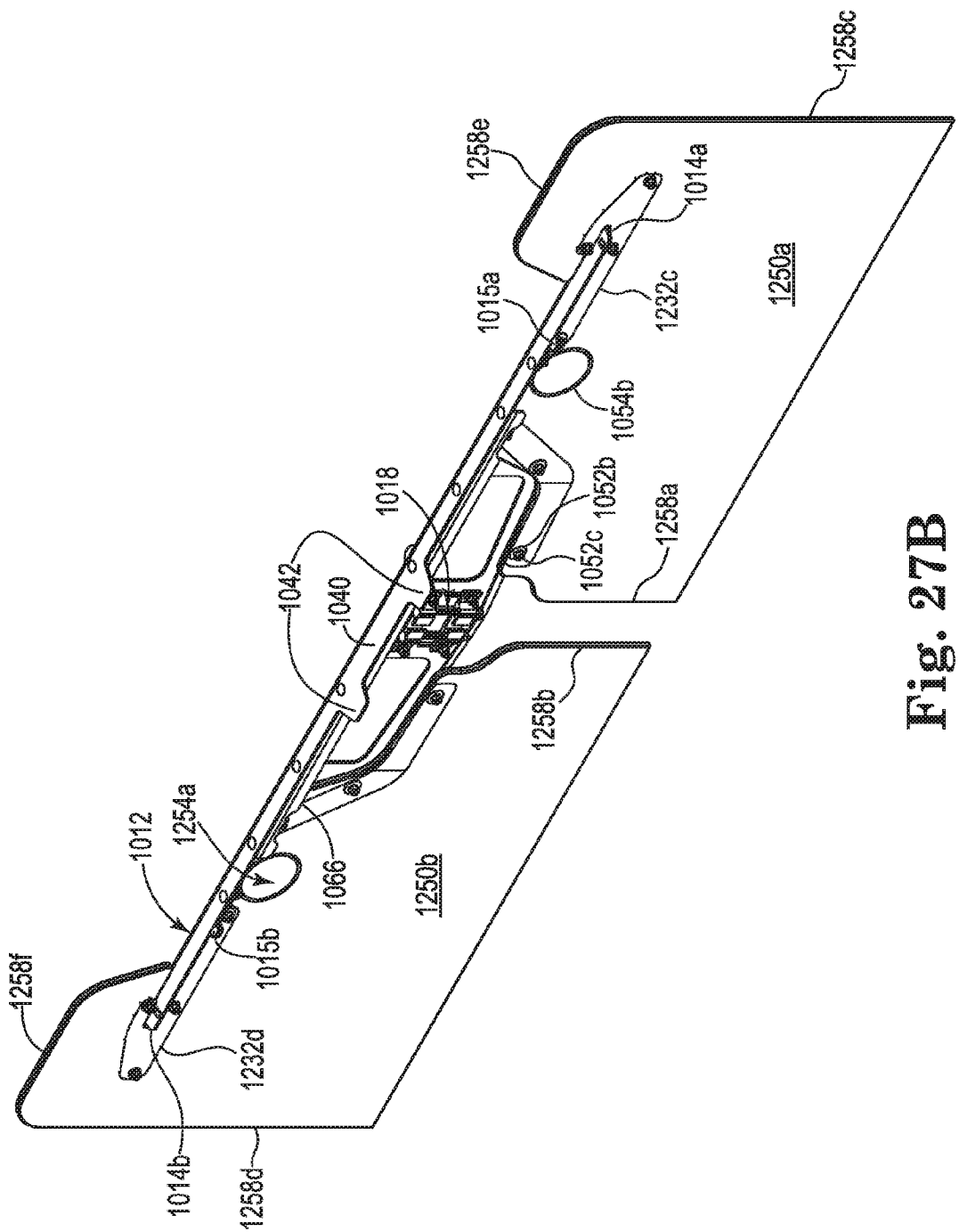
FIG. 27B is a front perspective view of the mud flap assembly 1210 of FIG. 27A, further showing a pair of inner mud flap support members 1032a, 1032b and a pair of enlarged outer mud flap support members 1232c, 1232d.
Figure 27C:
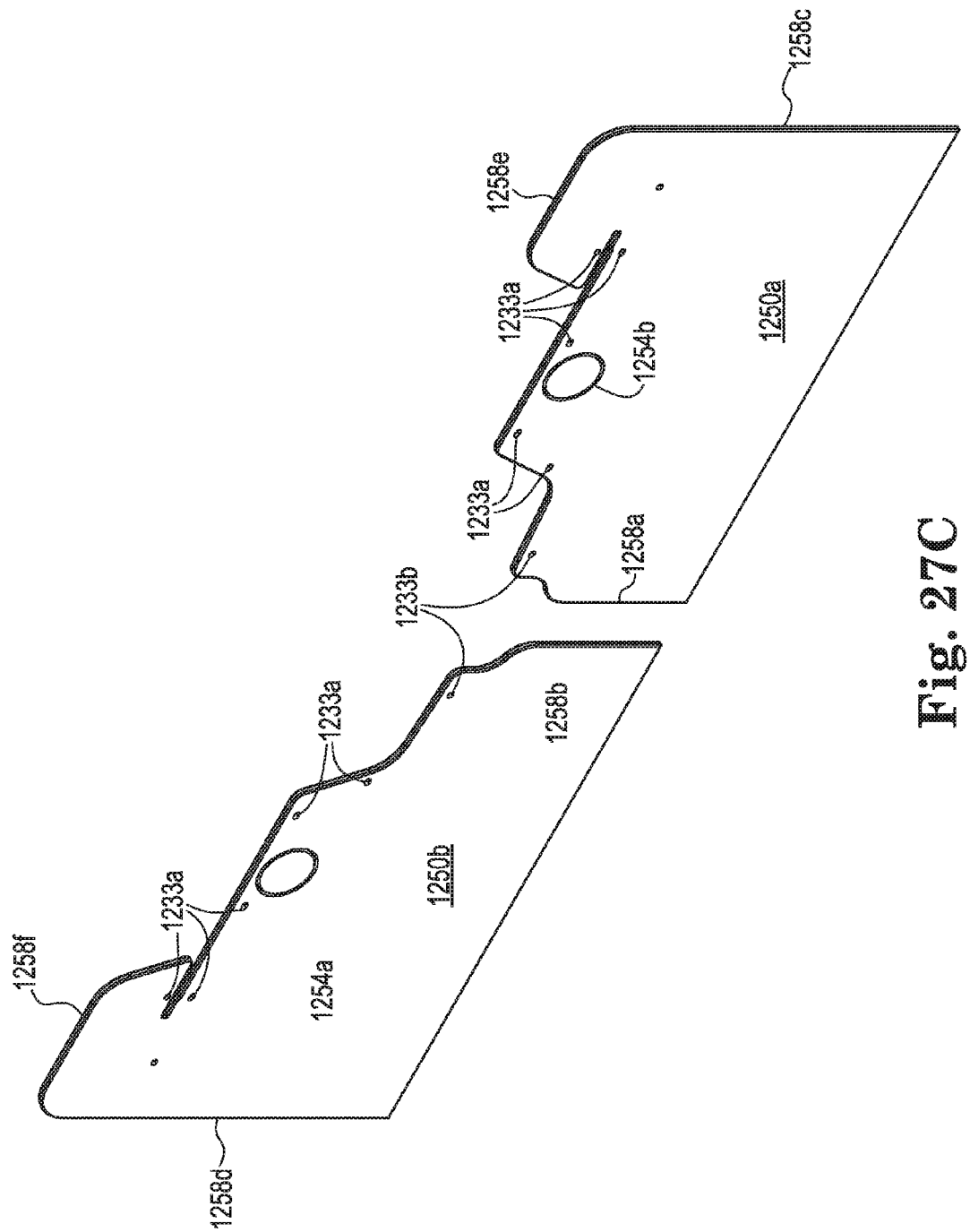
FIG. 27C is a front perspective view of the flap panels 1250a, 1250b of FIGS. 27A and 27B.

Now referring to mud flap assembly 1210 illustrated in FIGS. 27A-28, the flap panels 1250*a*, 1250*b* are extended inward, similar to flap panels 1050*a*, 1050*b*, 1150*a*, 1150*b*. However, the flap panels 1250*a*, 1250*b* are extended a larger distance D2*c* past the longitudinal ends 1014*a*, 1014*b* of frame 1012. In other words, the outer edge of the flap panel 1250*a* is a distance D2*c* past the longitudinal end 1014*a* of frame 1012, and the outer edge of the flap panel 1250*b* is a distance D2*c* past the longitudinal end 1014*b* of frame 1012, respectively. The flap panels 1250*a*, 1250*b* are also extended a distance D3*c* above the top plate 1040 in the vicinity of the longitudinal ends 1014*a*, 1014*b* of frame 1012, so that the upper edge of flap panels 1250*a* and 1250*b* are a distance D3*c* above top plate 1040 of frame 1212. As best seen in FIG. 27B, mud flap assembly 1210 further comprises panel support members 1232*c*, 1232*d* which provide additional support for the extended flap panels 1250*a*, 1250*b*. Preferably, the panel support member 1232*c*, flap panel 1250*a*, and frame 1012 are secured with fasteners such as bolts 1052*a*, washers 1052*b*, and nuts 1052*c* located at apertures 1233*a*, so that the flap panel 1250*a* is sandwiched between the support member 1232*c* and the frame 1012 as shown. Similarly, flap panel 1250*b* is preferably sandwiched between the support member 1232*d* and the other end of the frame 1012 as shown. This arrangement provides superior support for the flap panels 1250*a*, 1250*b* The distances D2*c*, D3*c* between the end of the frame 1012 or the top of the frame 1012, respectively, and the outer edge 1258*c*, 1258*d*, respectively, or the upper edge 1258*e*, 1258*f*, respectively, of flap panel 1250*a*, 1250*b*, respectively, are arranged to provide the desired amount of protection for anything towed behind the flap panels 1250*a*, 1250*b* from rocks or debris that may be kicked up by the tires, while still providing the desired fit on the vehicle V. In preferred embodiments, distance D2*c* is preferably from about 5 to about 15 inches, preferably about 10 inches. In preferred embodiments, distance D3*c* is preferably from about 2 inches to about 12 inches, preferably from about 4 inches to about 8 inches, and more preferably about 6.5 inches.

Mud flap assemblies 1010, 1110, 1210 provide for increased area of protection from damage to towed equipment by mud, gravel and other debris that can be kicked up by the rear tires of a vehicle. In particular, mud flap assemblies 1010, 1110, 1210 provide improved protection in the inner or central region near the hitch. Mud flap assembly 1110 also provides for increased protection near the sides of the vehicle, particularly useful for vehicles having dual wheels or a wide wheel base, which could otherwise kick up debris farther out to the side than other vehicles. Mud flap assembly 1210 provides for further protection for even a larger area near the sides of the vehicle. Panel support members, such as the example panel support members 1032a, 1032b, 1132c, 1132d, 1232c, 1232d disclosed herein can facilitate the improved protection in mud flap assemblies 1010, 1110, 1210 over a larger area compared with other mud flap assemblies described herein.

In preferred embodiments, the ground clearance for the flap panels 50a, 50b is about 4 to about 7 inches above the ground. The flap panels 50a, 50b may be trimmed after installation to achieve this preferred ground clearance, if necessary.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. A mud flap assembly for attachment to a hitch assembly, the hitch assembly being attachable to a hitch receiver attached to a vehicle proximate a bumper of the vehicle; the bumper having a rear surface and the hitch assembly having a shaft for engagement with the hitch receiver; the mud flap assembly comprising:
a frame, a securing assembly and two mud flap panels; the frame having two longitudinal ends and a rear plate; wherein the rear plate includes a hitch opening, spaced between the respective longitudinal ends, for receiving the shaft of the hitch assembly; the securing assembly including two elongated members that can be secured to the frame with adjustable fasteners and secured to one another with adjustable fasteners to engage the shaft and thereby secure the hitch assembly to the frame; wherein each the respective mud flap panels is secured to the frame proximate opposite longitudinal ends of the frame and extends at least about two inches beyond the respective longitudinal end.

2. The mud flap assembly of claim 1, the frame including a pair of stops, one of which is located proximate each of the respective longitudinal ends of the frame; wherein the respective stops extend away from the frame, toward the bumper, such that the respective stops can engage the rear surface of the bumper when the mud flap assembly is operatively secured to the vehicle.

3. The mud flap assembly of claim 2, wherein the frame includes a pair of stop assemblies and each of the respective stops are a part of one of the respective stop assemblies; each of the stop assemblies further including a protective cap that is engageable with the respective stop such that the respective protective cap will come into contact with the bumper when the mud flap assembly is operatively secured to the vehicle.

4. The mud flap assembly of claim 3, further comprising a protective piece secured to the bumper; wherein the protective piece can be positioned on the bumper such that one of the respective stop assemblies will contact the protective piece when the mud flap assembly is operatively secured to the vehicle such that the protective piece can minimize abrasions to the bumper caused by the respective stop assembly.

5. The mud flap assembly of claim 1, wherein the mud flap assembly includes a pair of adjustable stop assemblies; each of the respective stop assemblies including a stop that extends away from adjacent parts of the frame toward the bumper, such that the respective stops can engage the rear surface of the bumper when the mud flap assembly is operatively secured to the vehicle.

6. The mud flap assembly of claim 1, wherein the mud flap assembly further includes a pair of mud flap support members; wherein each of the respective mud flap panels are secured to the frame, sandwiched between the frame and one of the respective mud flap support members.

7. The mud flap assembly of claim 6, wherein at least one of the mud flap support members is bent so that an included angle between opposing ends of an inside surface of the mud flap support member, which engages the respective mud flap, is from about 175 to about 179 degrees.

8. The mud flap assembly of claim 1, wherein the bumper has a top surface and the frame includes a top plate having a support flange; wherein the top plate is generally perpendicular to the rear plate and the top plate includes a support flange; wherein the securing assembly allows the hitch assembly to be adjustably secured to the frame so that when the hitch assembly is secured to the frame and to the vehicle to provide a first point of contact between the mud flap assembly and the vehicle, the support flange can be engaged with the top surface of the bumper to provide a second point of contact between the mud flap assembly and the vehicle.

9. The mud flap assembly of claim 1, wherein the hitch opening has a configuration selected from the group consisting of: a generally U-shaped opening partially surrounded by adjacent elements of the frame; and an fully surrounded opening completely surrounded by adjacent elements of the frame; wherein the frame further includes a plurality of frame attachment openings proximate the hitch opening; wherein connectors can adjustably connect the pair of elongated members of the securing assembly to the frame and to one another to secure the shaft of the hitch assembly to the frame.

10. The mud flap assembly of claim 9, wherein the hitch opening is the primary hitch opening and the mud flap assembly further includes a removable adjustment plate defining a secondary hitch opening for attachment to the frame proximate the primary hitch opening; wherein the adjustment plate includes a plurality of plate openings to enhance the adjustment capabilities of the securing assembly.

11. The mud flap assembly of claim 1, wherein the securing assembly includes a first plurality of nuts and bolts that can secure the respective elongated members to the frame and a second plurality of nuts and bolts that can secure the respective elongated members to one another so as to secure the shaft of the hitch assembly to the frame.

12. The mud flap assembly of claim 9, wherein the plurality of frame attachment openings include a plurality of slots located proximate the hitch opening and the securing assembly includes a first plurality of nuts and bolts that can secure the respective elongated members to the frame proximate the hitch opening and a second plurality of nuts and bolts that can secure the respective elongated members to one another so as to secure the shaft of the hitch assembly to the frame.

13. The mud flap assembly of claim 1, wherein the frame has a structure that is selected from the group consisting of: a unitary structure; and a multi-part structure in which a plurality of parts are interconnected to form a frame assembly.

14. The mud flap assembly of claim 1, wherein the two elongated members can be separately, adjustably secured to the frame and separately, adjustably secured to one another to engage the shaft and thereby secure the hitch assembly to the frame.

15. The mud flap assembly of claim 1, wherein a distance that separates the respective mud flap panels from one another is from about 3 to about 5 inches.

16. The mud flap assembly of claim 1, wherein the frame has a top plate and each of the respective mud flap panels extends above the top plate proximate respective longitudinal ends of the frame at least about two inches.

17. A mud flap assembly for attachment to a hitch assembly, the hitch assembly being attachable to a hitch receiver attached to a vehicle proximate a bumper of the vehicle; the bumper having a top surface and a rear surface and the hitch assembly having a shaft for engagement with the hitch receiver; the mud flap assembly comprising:
   a frame, a securing assembly and two mud flap panels; the frame having two longitudinal ends, a rear plate and a top plate, wherein the top plate is generally perpendicular to the rear plate and the top plate includes a support flange; and wherein each of the respective mud flap panels can be separately secured to the frame proximate one of the respective longitudinal ends; and wherein the hitch assembly can be adjustably secured to the frame by the securing assembly such that when the shaft of the hitch assembly is engaged with the hitch receiver so as to provide a first point of contact between the mud flap assembly and the vehicle, the support flange of the top plate can be engaged with the top surface of the bumper to give the mud flap assembly a second point of contact with the vehicle; wherein each of the respective mud flap panels extends above the top plate proximate respective longitudinal ends of the frame at least about two inches.

18. The mud flap assembly of claim 17, wherein each of the respective mud flap panels is secured to the frame proximate opposite longitudinal ends of the frame and extends at least about two inches beyond the end of the respective longitudinal end.

19. The mud flap assembly of claim 17, wherein a distance that separates the respective mud flap panels from one another is from about 3 to about 5 inches.

20. The mud flap assembly of claim 17, the frame including a pair of stops, one of which is located proximate each of the respective longitudinal ends of the frame; wherein the respective stops extend away from adjacent parts of the frame toward the bumper, such that the respective stops will engage with the rear surface of the bumper when the mud flap assembly is operatively secured to the vehicle.

21. The mud flap assembly of claim 20, wherein the frame includes a pair of stop assemblies and each of the respective stops are a part of one of the respective stop assemblies; each of the stop assemblies further including a protective cap engaged with the respective stop such that the respective protective cap will come into contact with the bumper when the mud flap assembly is operatively secured to the vehicle.

22. The mud flap assembly of claim 21, further comprising a protective piece secured to the bumper; wherein the protective piece can be positioned on the bumper such that one of the respective stop assemblies will contact the protective piece when the mud flap assembly is operatively secured to the vehicle such that the protective piece minimizes abrasions to the bumper caused by the respective stop assembly.

23. The mud flap assembly of claim 17, wherein the mud flap assembly further includes a pair of mud flap support members; wherein each of the respective mud flap panels are secured to the frame, sandwiched between the frame and one of the respective mud flap support members.

24. The mud flap assembly of claim 23, wherein at least one of the mud flap support members is bent so that an included angle between opposing ends of an inside surface of the mud flap support member, which engages the respective mud flap, is from about 175 to about 179 degrees.

25. The mud flap assembly of claim 17, wherein the mud flap assembly further includes a pair of mud flap support members; wherein each of the respective mud flap panels are secured to the frame, sandwiched between the frame and one of the respective mud flap support members.

26. The mud flap assembly of claim 17, wherein the securing assembly allows the hitch assembly to be adjustably secured to the frame so that when the hitch assembly is secured to the frame and to the vehicle, the support flange can be engaged with the top surface of the bumper.

27. The mud flap assembly of claim 25, wherein the frame further includes a plurality of openings including a primary hitch opening having a configuration selected from the group consisting of: a generally U-shaped opening partially surrounded by adjacent elements of the frame; and wherein the securing assembly includes a pair of elongated members that can be secured to the frame and secured to one another to secure the hitch assembly to the frame; and an opening completely surrounded by adjacent elements of the frame; the plurality of openings further including a plurality of frame attachment openings proximate the primary hitch opening; wherein connectors can adjustably connect the pair of elongated members of the securing assembly to the frame and to one another to secure the shaft of the hitch assembly to the frame.

28. The mud flap assembly of claim 27, wherein the mud flap assembly further includes a removable adjustment plate defining a secondary hitch opening for attachment to the frame proximate the primary hitch opening; wherein the adjustment plate includes a plurality of plate openings to enhance the adjustment capabilities of the securing assembly.

29. The mud flap assembly of claim 27, wherein the securing assembly includes a first plurality of nuts and bolts that can secure the respective elongated members to the frame and a second plurality of nuts and bolts that can secure the respective elongated members to one another so as to secure the shaft of the hitch assembly to the frame.

30. The mud flap assembly of claim 27, wherein the frame attachment openings are slots located proximate the primary hitch opening, such bolts can be used to adjustably secure the respective elongated members to the frame proximate the primary hitch opening.

31. The mud flap assembly of claim 17, wherein the frame has a structure that is selected from the group consisting of: a unitary structure; and a multi-part structure in which a plurality of parts are interconnected to form a frame assembly.

32. A mud flap assembly for attachment to a hitch assembly having a ball mount and a vehicle having a rear bumper and a hitch receiver proximate the rear bumper; the rear bumper having a top surface and a rear surface and the hitch assembly having a shaft interconnected to the ball mount for engagement with the receiver; the mud flap assembly comprising:
   a frame, a securing assembly and a pair of mud flap panels;
      the frame having two longitudinal ends, a rear plate and a top plate, the top plate having an upper surface that is generally perpendicular to a rear surface on the rear plate; the top plate further including a support flange; the rear plate further including a hitch opening; wherein the securing assembly can be adjustably secured to the frame proximate the hitch opening such that the hitch assembly can be adjustably secured to the frame; wherein the shaft can be positioned at least partially within the hitch opening such that the support flange can be engaged with the top surface of the bumper when the shaft is secured to the frame and engaged within the hitch receiver to provide a first point of contact between the mud flap assembly and the vehicle; wherein the flap panels can be separately secured to the frame proximate each of the respective longitudinal ends of the frame; and wherein, when the mud flap assembly is operatively secured to the vehicle, the support flange can be engaged with the top surface of the bumper to provide a second point of contact between the mud flap assembly and the vehicle when the mud flap assembly is operatively engaged with the vehicle; wherein each of the respective mud flap panels extends above the top plate proximate respective longitudinal ends of the frame at least about two inches.

33. The mud flap assembly of claim 32, wherein each of the respective mud flap panels is secured to the frame proximate opposite longitudinal ends of the frame and extends at least about two inches beyond the end of the respective longitudinal end.

34. The mud flap assembly of claim 32, wherein a distance that separates the respective mud flap panels from one another is from about 3 to about 5 inches.

35. The mud flap assembly of claim 32, the frame including a pair of stop assemblies, one of which is located proximate each of the respective longitudinal ends of the frame; wherein, when the mud flap assembly is operatively secured to the vehicle, the respective stop assemblies can be engaged with the rear surface of the bumper to provide third and fourth points of contact with the vehicle and stabilized the connection between the mud flap assembly and the vehicle.

36. The mud flap assembly of claim 35, further comprising a protective piece secured to the bumper; wherein the protective piece can be positioned such that one of the respective stop assemblies will contact the protective piece when the mud flap assembly is operatively secured to the vehicle such that the protective piece minimizes abrasions to the bumper caused by the respective stop assembly.

37. The mud flap assembly of claim 32, wherein the mud flap assembly further includes a pair of mud flap support members; wherein each of the respective mud flap panels are secured to the frame, sandwiched between the frame and one of the respective mud flap support members.

38. The mud flap assembly of claim 6, wherein at least one of the mud flap support members is bent so that an included angle between opposing ends of an inside surface of the mud flap support member, which engages the respective mud flap, is from about 175 to about 179 degrees.

* * * * *